United States Patent
Leong et al.

(10) Patent No.: US 10,707,765 B2
(45) Date of Patent: Jul. 7, 2020

(54) POWER SUPPLY SYSTEMS AND FEEDBACK THROUGH A TRANSFORMER

(71) Applicant: Infineon Technologies Austria AG, Villach (AT)

(72) Inventors: Kenneth K. Leong, Villach (AT); Arash Pake Talei, Villach (AT); Gerald Deboy, Klagenfurt (AT); Giuseppe Bernacchia, Villach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/190,637

(22) Filed: Jun. 23, 2016

(65) Prior Publication Data

US 2017/0244332 A1 Aug. 24, 2017

Related U.S. Application Data

(60) Provisional application No. 62/299,146, filed on Feb. 24, 2016.

(51) Int. Cl.
H02M 3/335 (2006.01)

(52) U.S. Cl.
CPC ... H02M 3/33592 (2013.01); H02M 3/33523 (2013.01); *Y02B 70/1475* (2013.01)

(58) Field of Classification Search
CPC ............... H02M 3/33592; H02M 1/32; H02M 3/33507; H02M 3/33523; H02M 5/451;
(Continued)

(56) References Cited

U.S. PATENT DOCUMENTS

| 4,958,268 | A |   | 9/1990 | Nagagata et al. |
| 5,747,982 | A | * | 5/1998 | Dromgoole ........... H01L 25/162 |
|   |   |   |   | 257/E25.03 |

(Continued)

FOREIGN PATENT DOCUMENTS

| CN | 103490648 A | 1/2014 |
| EP | 0464246 B1 | 3/1995 |

OTHER PUBLICATIONS

Bell, B., Two-Switch Topology Benefits Forward and Flyback Power Converters, 3 pages, Sep. 1, 2000. Downloaded on Aug. 11, 2016 from EDN.com, URL: http://www.edn.com/design/power-management/4359366/Two-switch-topology-benefits-forward-and-flyback-power-converters.

(Continued)

*Primary Examiner* — Nguyen Tran
*Assistant Examiner* — Demetries A Gibson
(74) *Attorney, Agent, or Firm* — Armis IP Law, LLC

(57) ABSTRACT

A power converter circuit includes a transformer. The transformer includes a primary winding and a secondary winding. A primary circuit is coupled to the primary winding. A secondary circuit is coupled to the secondary winding. The primary circuit and the secondary circuit are referenced to different ground voltage potentials that may vary with respect to each other. During operation, the primary circuit controls input of energy to the primary winding of the transformer. The secondary circuit receives the energy through the secondary winding and uses it to produce an output voltage to power a load. The secondary circuit receives and/or generates state information at one of multiple different levels. The secondary circuit controls a flow of current through the secondary winding to convey the state information as feedback to the primary circuit. The primary (Continued)

circuit analyzes a voltage at a node of the primary winding to receive the feedback.

31 Claims, 28 Drawing Sheets

(58) Field of Classification Search
CPC ........... H02M 2001/007; H02M 7/525; H02M 7/517; H02M 7/523; H02M 7/539; H02M 7/5375; H02M 7/5387; H02M 7/758; H02H 7/12; H02H 9/025; Y02B 70/1475
See application file for complete search history.

(56) References Cited

U.S. PATENT DOCUMENTS

| | | | |
|---|---|---|---|
| 5,973,945 A * | 10/1999 | Balakrishnan | H02M 3/33576 363/80 |
| 6,552,917 B1 * | 4/2003 | Bourdillon | H02M 3/33561 363/21.12 |
| 6,606,257 B2 | 8/2003 | Bourdillon | |
| 7,161,333 B2 | 1/2007 | Soch | |
| 7,330,362 B2 | 2/2008 | Hesener | |
| 7,339,358 B2 | 3/2008 | Hesener | |
| 7,764,518 B2 | 7/2010 | Jitaru | |
| 8,054,655 B2 | 11/2011 | Moyer et al. | |
| 9,787,190 B2 * | 10/2017 | Takeshima | H02M 3/33507 |
| 2002/0097589 A1 | 7/2002 | Jansen et al. | |
| 2004/0243329 A1 * | 12/2004 | Seki | G01R 19/2506 702/75 |
| 2005/0052164 A1 * | 3/2005 | Sakai | H02J 9/06 323/222 |
| 2007/0228833 A1 * | 10/2007 | Stevens | H02J 5/005 307/45 |
| 2008/0042588 A1 * | 2/2008 | Chan | H05B 41/2827 315/224 |
| 2008/0130334 A1 | 6/2008 | Halberstadt | |
| 2008/0278975 A1 * | 11/2008 | Degen | H02M 3/33523 363/21.18 |
| 2009/0279326 A1 * | 11/2009 | Hyuugaji | H02M 3/33592 363/21.06 |
| 2010/0110732 A1 | 5/2010 | Moyer et al. | |
| 2011/0096573 A1 | 4/2011 | Zhu et al. | |
| 2012/0243272 A1 * | 9/2012 | Shimada | H02M 3/33507 363/21.15 |
| 2013/0148385 A1 | 6/2013 | Zhang | |
| 2013/0154598 A1 | 6/2013 | Yu et al. | |
| 2013/0173980 A1 | 7/2013 | Xi | |
| 2013/0235620 A1 * | 9/2013 | Morris | H02M 3/335 363/21.12 |
| 2014/0098578 A1 | 4/2014 | Halberstadt | |
| 2014/0204619 A1 * | 7/2014 | Telefus | H02M 3/33576 363/21.01 |
| 2014/0268919 A1 | 9/2014 | Yao et al. | |
| 2015/0029762 A1 * | 1/2015 | Lu | H02M 3/33523 363/21.17 |
| 2015/0062981 A1 * | 3/2015 | Fang | H02M 3/33507 363/21.17 |
| 2015/0103569 A1 | 4/2015 | Zhang et al. | |
| 2016/0087540 A1 | 3/2016 | Yee et al. | |
| 2016/0172962 A1 * | 6/2016 | Chen | H02M 3/33592 363/21.14 |
| 2016/0190947 A1 * | 6/2016 | Shein | H02M 3/33592 363/21.14 |
| 2016/0301314 A1 * | 10/2016 | Polivka | H02M 3/33507 |
| 2016/0373016 A1 * | 12/2016 | Vilhunen | H01F 27/28 |
| 2017/0047849 A1 * | 2/2017 | Malinin | H02M 1/36 |
| 2017/0141690 A1 * | 5/2017 | Sakurai | H02M 3/33569 |

OTHER PUBLICATIONS

Office action, Application No. 10 2017 103 762.4, dated May 10, 2018, pp. 4.

* cited by examiner

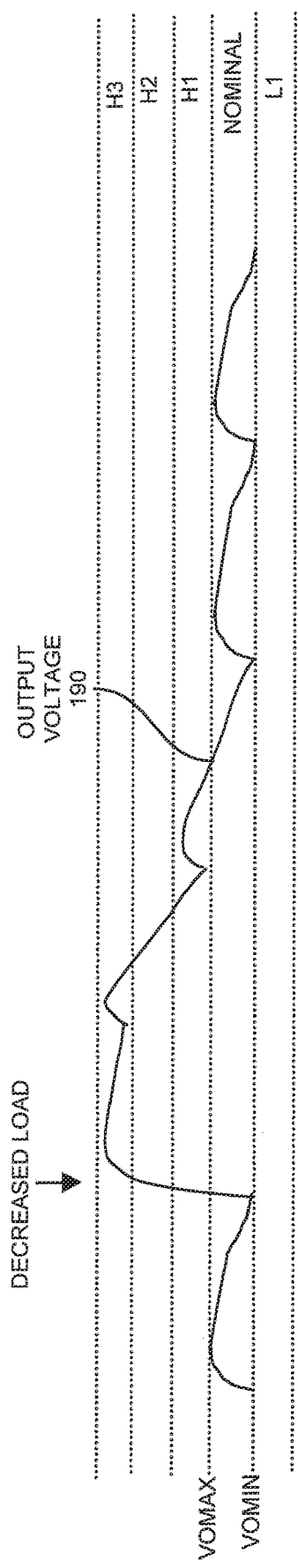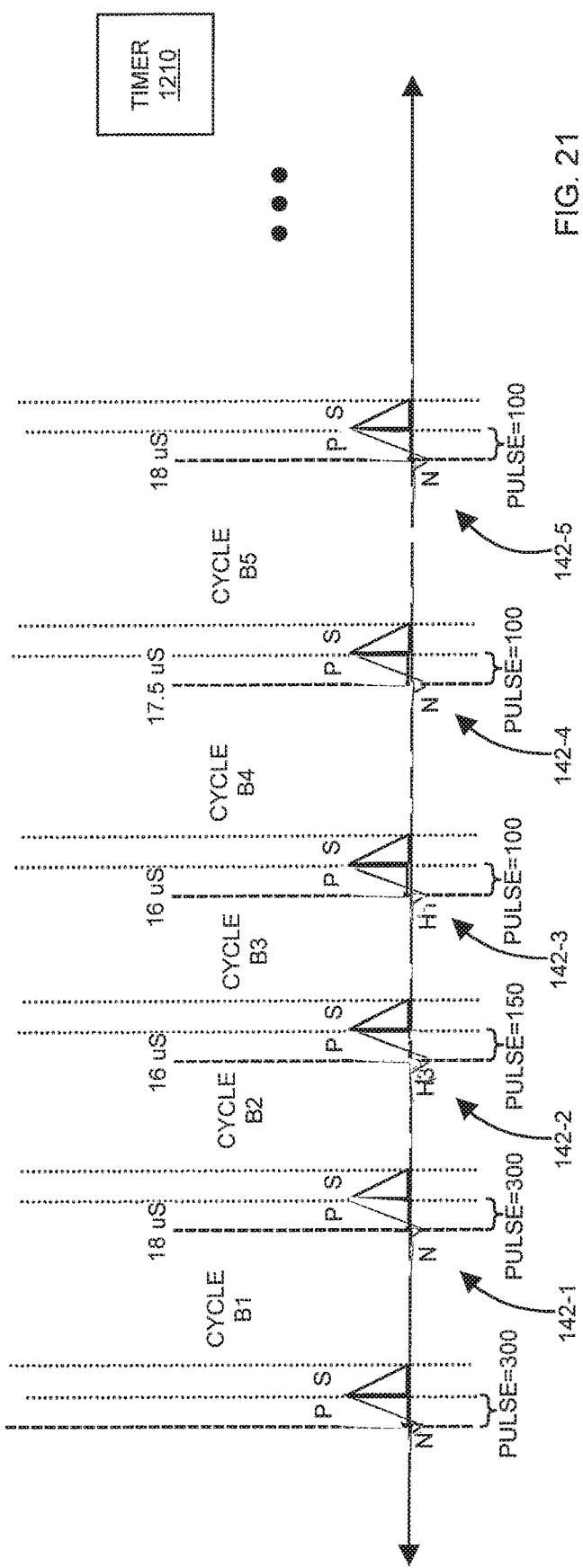
FIG. 21

POWER SUPPLY SYSTEMS AND FEEDBACK THROUGH A TRANSFORMER

RELATED APPLICATIONS

This application is related to and claims the benefit of earlier filed U.S. Provisional Patent Application Ser. No. 62/299,146 entitled "POWER SUPPLY SYSTEMS AND FEEDBACK THROUGH A TRANSFORMER," filed on Feb. 24, 2016, the entire teachings of which are incorporated herein by this reference.

BACKGROUND

A typical flyback converter includes a primary side circuit, a transformer, and a secondary side circuit. The primary side circuit is connected to a power source and includes at least one switching element that controls the amount of energy transferred to the secondary side via the transformer. The transformer serves as an electrically isolated channel to transfer energy from the primary side circuit to the secondary side circuit. The secondary side circuit is coupled to a load to be powered.

In a traditional flyback converter, at least one diode coupled in a current path of a secondary side winding of the transformer is included to block current (e.g., from flowing from the transformer to the secondary side circuit when the primary side transistor is turned on or from flowing from an output capacitor on the secondary side to the secondary side winding and back to the primary side). One disadvantage of using a diode in the secondary side circuit is that, when the primary side switching element is turned off and energy is transferred from the transformer to the secondary side circuit (and the load), energy is lost due to a voltage drop (RDS-ON) over the diode. To improve efficiency, some flyback converters may be configured such that the traditional diode is replaced by, or put in parallel with, an active element (e.g., one or more transistors), which may be referred to as a secondary side switching element. Such a secondary side switching element may be operated to switch in synchronization with switching behavior of the primary side switching element, which may increase efficiency compared to the using a diode as described above. Operation of the secondary side switching element in synchronization with switching behavior of the primary side switching element may be referred to as synchronous rectification. Generally, there are two ways to implement synchronous rectification: the first way is referred to as "control-driven" synchronous rectification, and the second way is known as "self-driven" synchronous rectification.

In a control-driven scheme, the secondary side switching element is driven by gate-drive signals that are derived from the gate-drive signal of the primary side switching element. In other words, the control-driven scheme generally requires information to pass, via one or more additional electrically isolated signal paths or communication links other than the transformer, from a primary side circuit of the flyback to a secondary side circuit of the flyback. Using the information received via the additional electrically isolated signal paths, sent from the primary side, a secondary side controller can determine the state of the gate-drive signals controlling the primary side switching element. Based on the state of the gate-drive signals controlling the primary side switching element, the secondary side circuit can determine when to cause the secondary side switching element to turn-on or turn-off in synchronization with the primary side switching element. Since a control-driven synchronous rectification control scheme uses an additional, communication link, control-driven synchronous rectification may increase size, cost, and/or complexity of the flyback power converter.

Self-driven synchronous rectification may be more attractive for some flyback applications since self-driven control is simpler and requires fewer components than the control driven scheme. In a self-driven scheme, a secondary side controller may forgo the information about the state of the gate-drive signals controlling the primary side switching element, received from the primary side circuit via the additional, communication link, and instead may simply monitor energy (e.g., a current and/or voltage of energy) being transmitted to the secondary side circuit via the transformer. Based on the monitored energy, the secondary side controller can control the secondary side switching element to switch in-synchronization with the operations of the primary side switching element. Although the reliance on a self-driven synchronous rectification control scheme may decrease size, cost, and/or complexity as compared to a control-driven scheme, self-driven synchronous rectification may sacrifice accuracy and quality of a flyback converter by producing a lower quality and less efficient power output.

BRIEF DESCRIPTION

Multi-Bit Feedback Through Transformer

Embodiments herein include novel ways of communicating data (state information) through a transformer circuit.

More specifically, embodiments herein include a transformer including a primary winding and a secondary winding. A primary circuit is coupled to the primary winding. A secondary circuit is coupled to the secondary winding. During operation, the primary circuit controls input of energy to the primary winding of the transformer. In one non-limiting example embodiment, the secondary circuit receives the energy and uses it to produce an output voltage to power a load.

To input energy to the transformer, the primary circuit controls a primary switch (in the primary circuit) to control a flow of current through the primary winding of the transformer. The flow of current through the primary winding stores a quantum of energy in the transformer.

Subsequent to storage, the secondary circuit receives the energy stored in the transformer through the secondary winding of the transformer. For example, in one embodiment, the secondary circuit operates a secondary switch in the secondary circuit to control a flow of current through the secondary winding of the transformer to receive the energy and produce an output voltage to power load.

In furtherance of maintaining the magnitude of the output voltage within a desired output voltage range, the secondary circuit compares a magnitude of the output voltage to a reference voltage. The difference between the magnitude of the output voltage and the reference voltage represents an error signal. The secondary circuit produces feedback based on the error signal to facilitate control of inputting subsequent energy to the primary winding.

In one embodiment, the secondary circuit communicates the feedback through the secondary winding to the primary winding. In this example embodiment, the feedback indicates a particular state selected amongst multiple possible states (i.e., any suitable type of information such as commands, messages, error information, etc.) associated with deriving the output voltage from the energy received through the secondary winding. Thus, different states of feedback can be conveyed through the secondary winding to the primary winding.

In accordance with further embodiments, to convey the feedback through the second winding to the primary winding, the secondary circuit controls a secondary switch (in the secondary circuit) to control a flow of current through the secondary winding to communicate the feedback through the transformer to the primary winding. In one embodiment, the secondary circuit controls conveyance of the feedback through the transformer at a time when the primary circuit is in an inactive state (i.e., when the primary circuit no longer inputs energy into the transformer through the primary winding).

In one embodiment, the secondary circuit controls a duration of conveying current through the secondary winding to indicate a state of the feedback, which may be one of multiple different states.

To receive the feedback, the primary circuit monitors a magnitude of a voltage at the node of the primary winding. The input of the feedback (current) through the secondary winding causes a perturbation in magnitude of the voltage at the node of the primary winding. In one embodiment, the perturbation of the magnitude of the voltage at the node of the primary winding is a peak transition or valley transition that occurs within a monitored window of time. A range in which the peak or valley transition falls indicates a respective state of the feedback information conveyed from the secondary circuit through the secondary winding to the primary winding.

As previously discussed, and as further described herein, the feedback represents a signal encoded at any of one or more different levels. That is, each of the different selectable levels represents a different possible state.

In further embodiments, in response to receiving the feedback, and selected state information from the multiple possible states, the primary circuit uses the feedback to control subsequent input of a quantum of energy to the primary winding.

In this manner, feedback from a secondary circuit can be encoded to convey any of multiple different states of state information through a secondary winding to a primary winding of a transformer. The received state information can be used for any suitable purpose such as i) controlling delivery of subsequent energy through the primary winding through the transformer to the secondary winding, ii) conveying general status information or messages from the secondary circuit to the primary circuit, iii) controlling commands from the secondary circuit to the primary circuit, etc.

Embodiments herein provide advantages over conventional techniques. For example, it is widely known that data can be transferred through a communication path outside of the transformer, such as via use of an extra opto-coupler circuit or a second high frequency transformer to convey communications. Embodiments herein would require no additional communication components, which increases power density and reduce power consumption, especially in the case of stand power requirements.

These and other more specific embodiments are disclosed in more detail below.

The embodiments as described herein are advantageous over conventional techniques. For example, the embodiments as discussed herein are applicable to transformer circuitry and corresponding power converter circuits. The concepts disclosed herein, however, are applicable to any other suitable topologies as well general applications of conveying state information form one circuit to another.

Note that embodiments herein can include a controller configuration of computer processor hardware to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, ... ) including computer program logic encoded thereon that, when performed in a computerized device having a processor and corresponding memory, programs the processor to perform any of the operations disclosed herein. Such arrangements are typically provided as software, code and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be installed onto a controller to cause the controller to perform the techniques explained herein.

Accordingly, one particular embodiment of the present disclosure is directed to a computer program product that includes a computer readable medium having instructions stored thereon for supporting operations such as controlling phases in a power supply. For example, in one embodiment, the instructions, when carried out by a computer processor hardware, causes the computer processor hardware to: input energy to a primary winding of a transformer; receive the energy through a secondary winding of the transformer; derive an output voltage from the energy received through the secondary winding; and communicate feedback through the secondary winding to the primary winding, the communicated feedback representing state information, the state information indicating a particular state selected amongst multiple possible states.

The ordering of the steps has been added for clarity sake. These steps can be performed in any suitable order.

It is to be understood that the system, method, device, apparatus, etc., as discussed herein can be embodied strictly as hardware, as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION

Multi-Modal Operation

Embodiments herein include novel ways of utilizing feedback received through a transformer circuit to produce an output voltage.

More specifically, embodiments herein include a transformer including a primary winding and a secondary winding. A primary circuit is coupled to the primary winding. A secondary circuit is coupled to the secondary winding.

During operation in each cycle of multiple cycles, the primary circuit controls input of energy to the primary winding of the transformer. In one non-limiting example embodiment, the secondary circuit receives the energy and uses it to produce an output voltage to power a load. To input energy to the transformer, the primary circuit controls a primary switch (in the primary circuit) to control a flow of current through the primary winding of the transformer. The flow of current through the primary winding stores a quantum of energy in the transformer. Subsequent to storage, the secondary circuit receives the energy stored in the transformer through the secondary winding of the transformer. For example, in one embodiment, the secondary circuit operates a secondary switch in the secondary circuit to control a flow of current through the secondary winding of the transformer to receive the energy and produce an output voltage to power load.

In furtherance of maintaining the magnitude of the output voltage within a desired output voltage range, during each cycle, the secondary circuit compares a magnitude of the output voltage to a reference voltage. The difference between the magnitude of the output voltage and the reference voltage represents an error signal. When the error signal indicates that the magnitude of the output voltage has reached a threshold value, the secondary circuit responds by producing feedback through the secondary winding to the primary winding of the need for more energy to produce the output voltage.

Over multiple cycles, the timing of receiving the feedback will vary depending on power consumption by the load. For example, when the load consumes a relatively large amount of current, the time in which the secondary circuit transmits feedback for more energy is relatively short. Conversely, when the load consumes a relatively small amount of current, the time in which the secondary circuit transmits feedback for more energy is relatively long.

The secondary circuit monitors a timing of receiving the feedback in a respective cycle to control subsequent energizing of the primary winding and respective operation of the power converter circuit in one of two modes.

For example, the power converter circuit operates in a first mode (such as fixed frequency, variable pulse width of energizing the primary winding) when the load consumes relatively little energy. Conversely, the power converter circuit operates in a second mode (such as variable frequency, fixed pulse width of energizing the primary winding) when the load consumes relatively high energy.

Switching the power converter circuit between operational modes is useful for multiple reasons. For example, in the first mode, a lowest frequency of operating the power converter circuit can be maintained well above the range of human hearing. Additionally, in the first mode, adjusting the pulse width of energizing the primary winding to be relatively short during low load conditions reduces a magnitude of ripple voltage on the output voltage. The shortened pulse widths supported by the first mode also prevents loss of excess energy in the transformer because the inputted quantum of energy is used to power the load as opposed to be lost in the transformer.

These and other more specific embodiments are disclosed in more detail below.

The embodiments as described herein are advantageous over conventional techniques. For example, the embodiments as discussed herein are applicable to transformer circuitry and corresponding power converter circuits. The concepts disclosed herein, however, are applicable to any other suitable topologies as well general applications of conveying state information form one circuit to another.

Note that embodiments herein can include a controller configuration of computer processor hardware to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, . . . ) including computer program logic encoded thereon that, when performed in a computerized device having a processor and corresponding memory, programs the processor to perform any of the operations disclosed herein. Such arrangements are typically provided as software, code and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be installed onto a controller to cause the controller to perform the techniques explained herein.

Accordingly, one particular embodiment of the present disclosure is directed to a computer program product that includes a computer readable medium having instructions stored thereon for supporting operations such as controlling phases in a power supply. For example, in one embodiment, the instructions, when carried out by a computer processor hardware, causes the computer processor hardware to: operate a power converter circuit to input energy to a primary winding of a transformer and subsequently receive the energy through a secondary winding of the transformer over each of multiple cycles, the power converter circuit producing an output voltage using the energy received through the secondary winding; over a range of different magnitudes of power delivered by the output voltage to a dynamic load, switch modal operation of the power converter circuit between a first mode and a second mode based on a timing of feedback (indicating a request for more energy) conveyed from the secondary winding to the primary winding over each of the multiple cycles.

Another particular embodiment of the present disclosure is directed to a computer program product that includes a computer readable medium having instructions stored thereon for supporting operations such as controlling phases in a power supply. For example, in one embodiment, the instructions, when carried out by a computer processor hardware, causes the computer processor hardware to: control operation of a power converter circuit to input energy to a primary winding of a transformer and receive the energy through a secondary winding of the transformer; produce an output voltage using the energy received through the secondary winding; and vary a timing of conveying feedback (with respect to receiving energy through the secondary winding) to the primary circuit over multiple cycles to maintain a magnitude of the output voltage within a desired range.

The ordering of the steps has been added for clarity sake. These steps can be performed in any suitable order.

It is to be understood that the system, method, device, apparatus, etc., as discussed herein can be embodied strictly as hardware, as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIGS. 20-22 are example timing diagrams illustrating use of multi-level feedback to control a magnitude of an output voltage according to embodiments herein.

DETAILED DESCRIPTION

Figure 1:
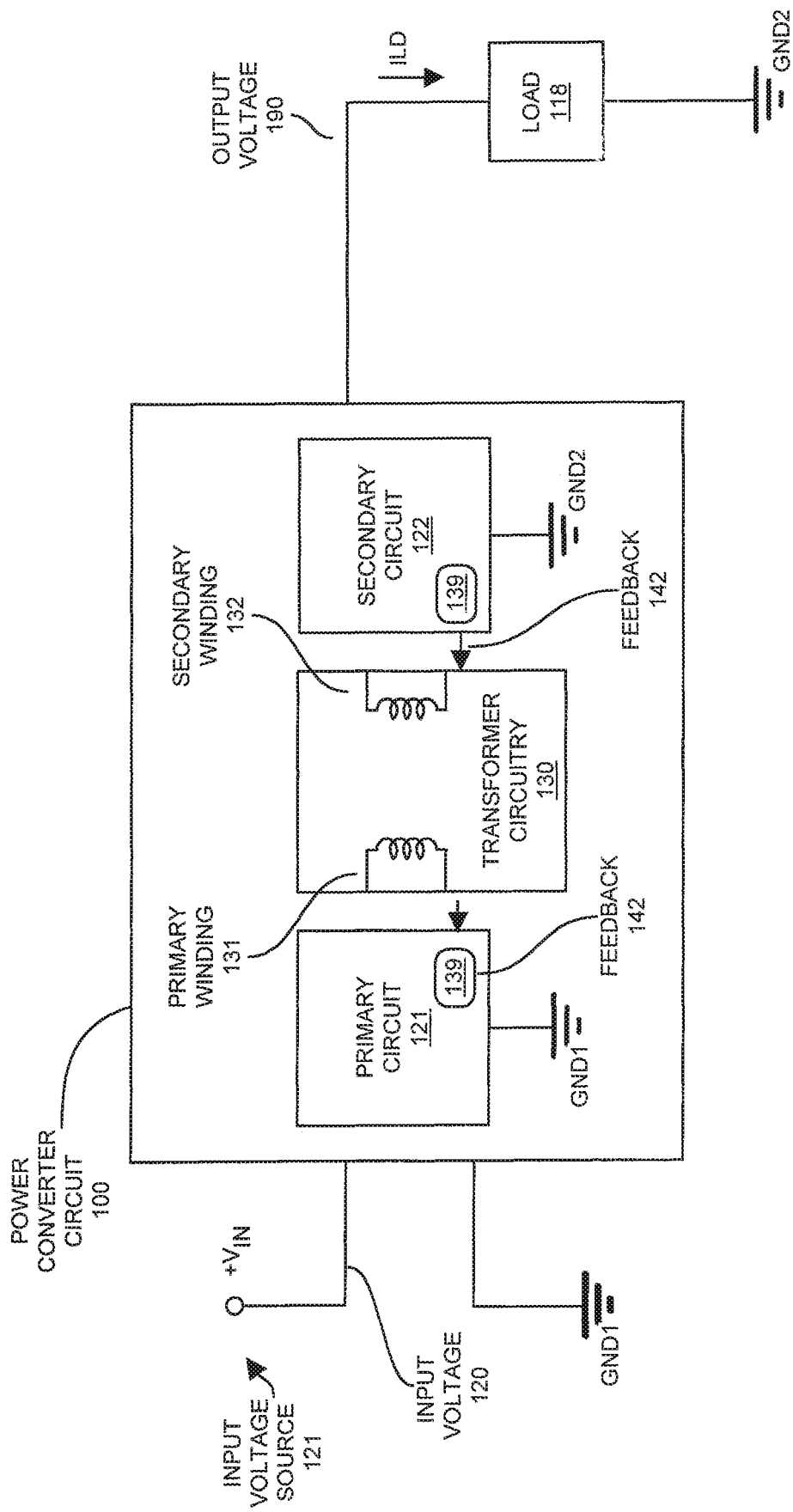
FIG. 1 is an example general diagram of a power converter circuit according to embodiments herein.

Now, more specifically, FIG. 1 is an example diagram of a power converter circuit according to embodiments herein.

As shown, the power converter circuit 100 includes primary (side) circuit 121, transformer circuitry 130, secondary (side) circuit 122. Transformer circuitry 130 includes primary winding 131 and secondary winding 132.

In one embodiment, transformer circuitry 130 is a so-called air gap transformer in which the transformer circuitry 130 stores energy received through the primary winding 131 for subsequent conveyance through the secondary winding 132.

In accordance with further embodiments, during operation, power converter circuit 120 receives input voltage 120 from input voltage source 119. As its name suggests, the power converter circuit 120 converts the input voltage 120 into output voltage 190 to power dynamic load 118.

More specifically, to convert the input voltage 120 into the output voltage 190, the primary circuitry 121 of power converter circuit 100 inputs energy (from input voltage 120 and corresponding flow of current) through the primary winding 131 of transformer circuitry 130. The secondary circuit 122 receives the energy through the secondary winding 132 of the transformer circuitry 130.

As further shown, the secondary circuit 124 receives and/or generates state information 139 and conveys it as feedback 142 in a reverse direction to the primary circuit 122. The state information 139 can be any suitable type of information.

In one embodiment, the secondary circuit 122 selects the state information 139 in which to convey back to the primary circuit 121 as feedback 142. For example, via different feedback communications, the secondary circuit 122 is operable to select a first state (of state information) to notify the primary circuit 121 of a selected first state; the secondary circuit 122 is operable to select a second state (of state information) to notify the primary circuit 121 of the selected second state; the secondary circuit 122 is operable to select a third state (of state information) to notify the primary circuit 121 of the selected third state; and so on.

In one embodiment, as further described herein in greater detail, the communicated feedback 142 and corresponding state information 139 includes the selected state information 139. In this manner, the secondary circuit 122 is able to communicate different types of data (states) from the secondary circuit 122 to the primary circuit 122 without having to implement extra communication circuitry such as an opto-coupler or extra transformer between the primary circuit 121 and the secondary circuit 122. Accordingly, embodiments herein reduce the number of components needed to implement power converter circuit 100, reduces a corresponding circuit footprint of the power converter circuit 100, reduces costs of fabricating power converter circuit 100, etc. The secondary circuit 122 uses the energy received though the secondary winding 132 to produce the output voltage 190. By further way of non-limiting example, the state information 139 can include information indicating a current or previous state associated with the deriving the output voltage 190 from the energy received through the secondary winding 122.

More specifically, in one embodiment, the secondary circuit 122 monitors the magnitude of output voltage 190 and controls it to be within a desired voltage range. In such an instance, the primary circuit 121 uses the received feedback 142 to control subsequent input of energy to the transformer circuitry 130 through the primary winding 131. As discussed below, by way of non-limiting example embodiment, the feedback 142 can indicate a quantum of energy to input to the primary winding 131 on a subsequent control cycle to maintain the output voltage 190 within a desired range.

Note that each of the primary circuit 121 and secondary circuit 122 can include any suitable analog circuitry, digital circuitry, or a combination of both. Additionally, the each of the primary circuit 121 and secondary circuit 122 can be or include a computer, processor, micro-controller, digital signal processor, etc., configured to carry out and/or support any or all of the method operations disclosed herein.

Note further that embodiments herein can further include one or more software programs, executable code stored on a computer readable media to perform the steps and operations summarized above and disclosed in detail below. For example, one such embodiment comprises a computer program product that has a computer-storage medium (e.g., a non-transitory computer readable medium or media) including computer program logic (e.g., software, firmware, instructions, . . . ) encoded thereon that, when performed in the respective circuit having a processor and corresponding storage, programs the circuit to digitally perform the operations as disclosed herein. Such arrangements can be implemented as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be stored in or may be accessible to the respective circuits to perform the techniques explained herein.

Accordingly, in addition to hardware and/or firmware, embodiments of the present disclosure are directed to a computer program product that includes a non-transitory computer readable medium (e.g., memory, storage repository, optical disk, integrated circuit, etc.) to execute any of the operations as described herein.

Figure 2:
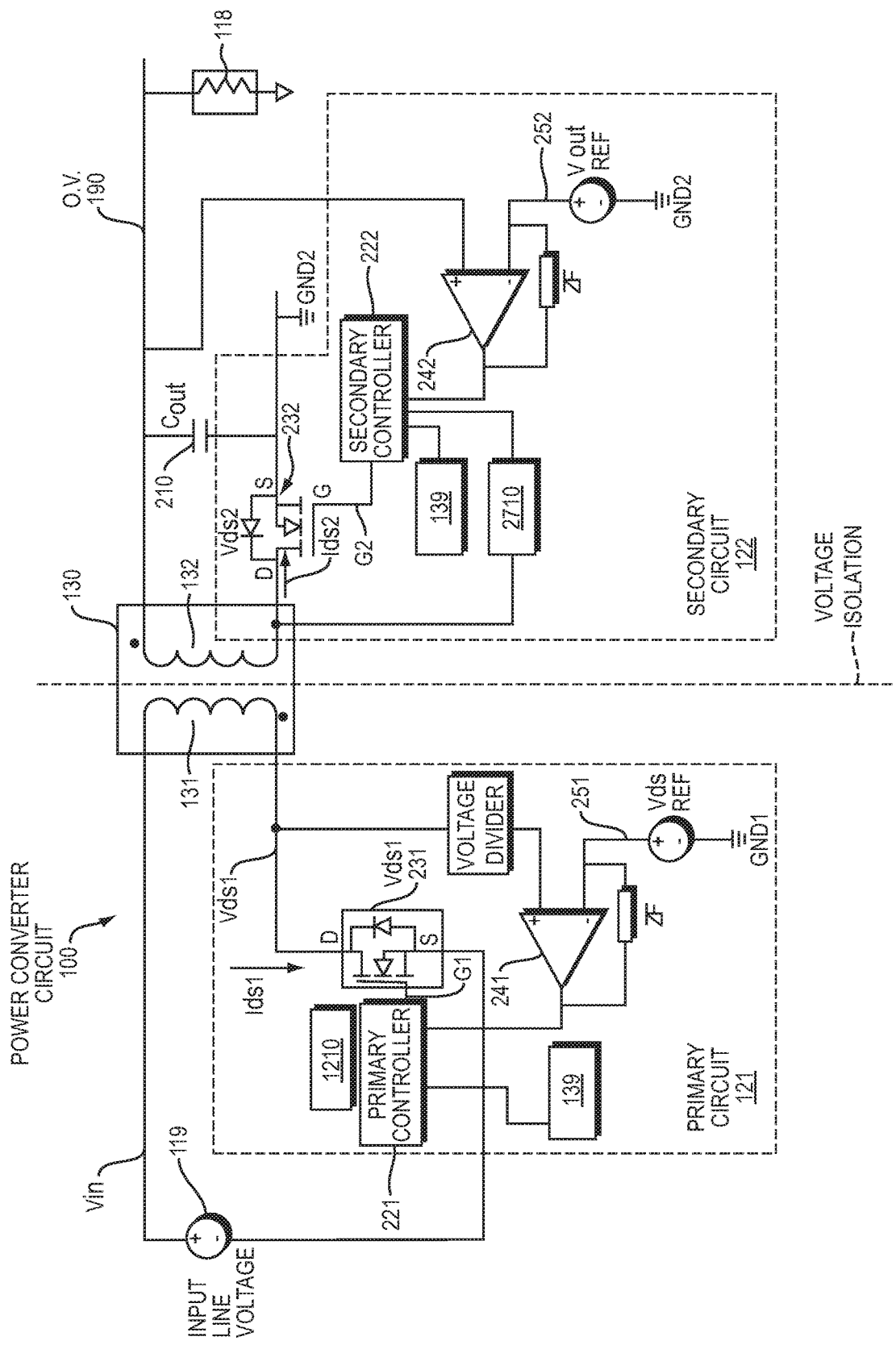
FIG. 2 is an example more detailed diagram illustrating a power converter circuit including a transformer and corresponding circuitry according to embodiments herein.

FIG. 2 is an example diagram illustrating more specific details of a power converter circuit including a transformer and corresponding circuitry according to embodiments herein.

As previously discussed, power converter circuit 100 includes transformer circuitry 130 including primary winding 131 and secondary winding 132. Power converter circuit 100 further includes primary circuit 121 and secondary circuit 122.

As further shown in this example embodiment, the primary circuit 121 includes primary control circuit 221 to control operation of switch circuitry 231. The switch circuitry 231 can be or include any suitable type of switch devices. In one embodiment, the switch circuitry 231 is a field effect transistor. However, note that the switch circuitry 231 can be any suitable device or combination of devices that control a flow of current through the primary winding 131.

Similarly, the switch circuitry 232 controlled by secondary control circuit 222 can be or include any suitable type of one or more switch devices to control a flow of current through the secondary winding. In one embodiment, the switch circuitry 232 is a field effect transistor. However, as mentioned, the switch circuitry 232 can include any suitable device to control current flow.

Activation of the switch circuitry 231 (that is, turning switch circuitry 231 to an ON state) causes current to flow through the primary winding 131 as received from voltage source 119. Accordingly, the voltage source 119 provides the energy to input into the primary winding 131.

Note that the input voltage 120 can be received from any suitable resource. In one embodiment, the input voltage 120 is a DC or AC voltage derived from full-wave rectification of an AC signal (such as an AC power signal from a wall receptacle). Accordingly, the input voltage 120 can be susceptible to having anywhere from minimal to substantial ripple voltage.

Note further in this example embodiment that the primary circuit 121 is connected to a first ground reference voltage, GND1. The secondary circuit 122 is connected to a second ground reference voltage, GND2. Transformer circuitry provides voltage isolation between the primary circuit 121 and the secondary circuit 122.

There may be substantial differences associated with ground reference voltage GND1 and ground reference voltage GND2 over time. In other words, one ground reference voltage may be floating with respect to the other ground reference voltage. The differences (and potentially varying differences) between the ground reference voltages can render it challenging to support communications between the secondary circuit 122 in the primary circuit 120, and vice versa.

As previously discussed, use of one or more opto-coupler devices is one option for supporting communications between circuits referenced to different ground potentials. However, use of such devices is undesirable because it increases the cost of the power converter circuit 100 as well as requires more circuit board space to fabricate the power converter circuit 100.

As further discussed below, embodiments herein include one or more novel embodiments of communicating state information in a reverse direction from the secondary winding through the transformer circuitry 132 the primary winding 131.

Subsequent to inputting a desired amount of energy into the primary winding 131 of the transformer circuitry 130 via activation of the switch circuitry 231, the primary control circuit 221 discontinues activation of the switch circuitry 231. That is, the power control circuitry 221 turns the switch circuitry 231 to an OFF state. The energy stored in the transformer circuitry 130 is now available to the secondary circuit 122 through secondary winding 132.

Subsequent to controlling the switch circuitry 231 to the OFF state, the secondary control circuit 222 controls switch circuitry 232 from an OFF state to an ON state to retrieve the energy stored in the transformer circuitry 130. This causes a flow of current through the secondary winding 132 to charge the output capacitor 210 and/or deliver current to the dynamic load 118. Accordingly, via activation of the switch circuitry 232, the secondary control circuit 222 initiates a transfer of the energy stored in the transformer circuitry 130 to power load and/or charge the output capacitor 210.

In certain instances, it is desirable to maintain a magnitude of the output voltage 190 within a predetermined voltage range. In furtherance of maintaining the magnitude of the output voltage 190 within a desired output voltage range, the monitor circuit 242 of secondary circuit 122 can be configured to compare a magnitude of the output voltage 190 to a reference voltage 252. The difference between the magnitude of the output voltage 190 and the reference voltage 252 represents an error signal inputted to the secondary control circuitry 222.

Based on the received error signal, the secondary control circuit 222 produces feedback 142 (such as a control signal or error signal) to facilitate control of inputting subsequent energy to the primary winding 131. This can include mapping the detected error to appropriate state information.

In one embodiment, the feedback 142 and corresponding state information 139 conveyed to the primary circuit 121 includes or is an error signal generated by the monitor circuit 242. Accordingly, the primary circuit 121 is apprised of how to control input of subsequent energy into the primary winding 131 to maintain the output voltage 190 within range.

As previously discussed, the input of energy into the primary winding 131 has a direct effect on the magnitude of producing the output voltage 190. The secondary control circuitry 222 can be configured to produce the state information 139 indicating how to adjust input of future energy into the primary winding 131 to maintain the output voltage 190 within a desired voltage range.

As its name suggests, the dynamic load 118 is susceptible to consuming a varying amount of current over time. As will be discussed later in the specification more detail, the feedback 142 including state information 139 can information indicating one of multiple levels of energy to inputted into the primary winding 131 to maintain the output voltage 190 within a desired range. During a condition in which the load 118 consumes more and more current over time, in which a magnitude of the output voltage may be dropping, the feedback 142 conveyed to the primary circuit 121 can indicate to the primary circuit 121 to input a greater amount of energy into the primary winding 131 during a next input cycle to account for the increase in current consumption.

Conversely, during a condition in which the load 118 consumes less current overtime, in which a magnitude output voltage may be increasing, the feedback 142 conveyed to the primary circuit 121 can indicate to the primary circuit 121 to input a lesser amount of energy into the primary winding 131 on one or more next input cycles to account for a decrease in current consumption.

Figure 3:
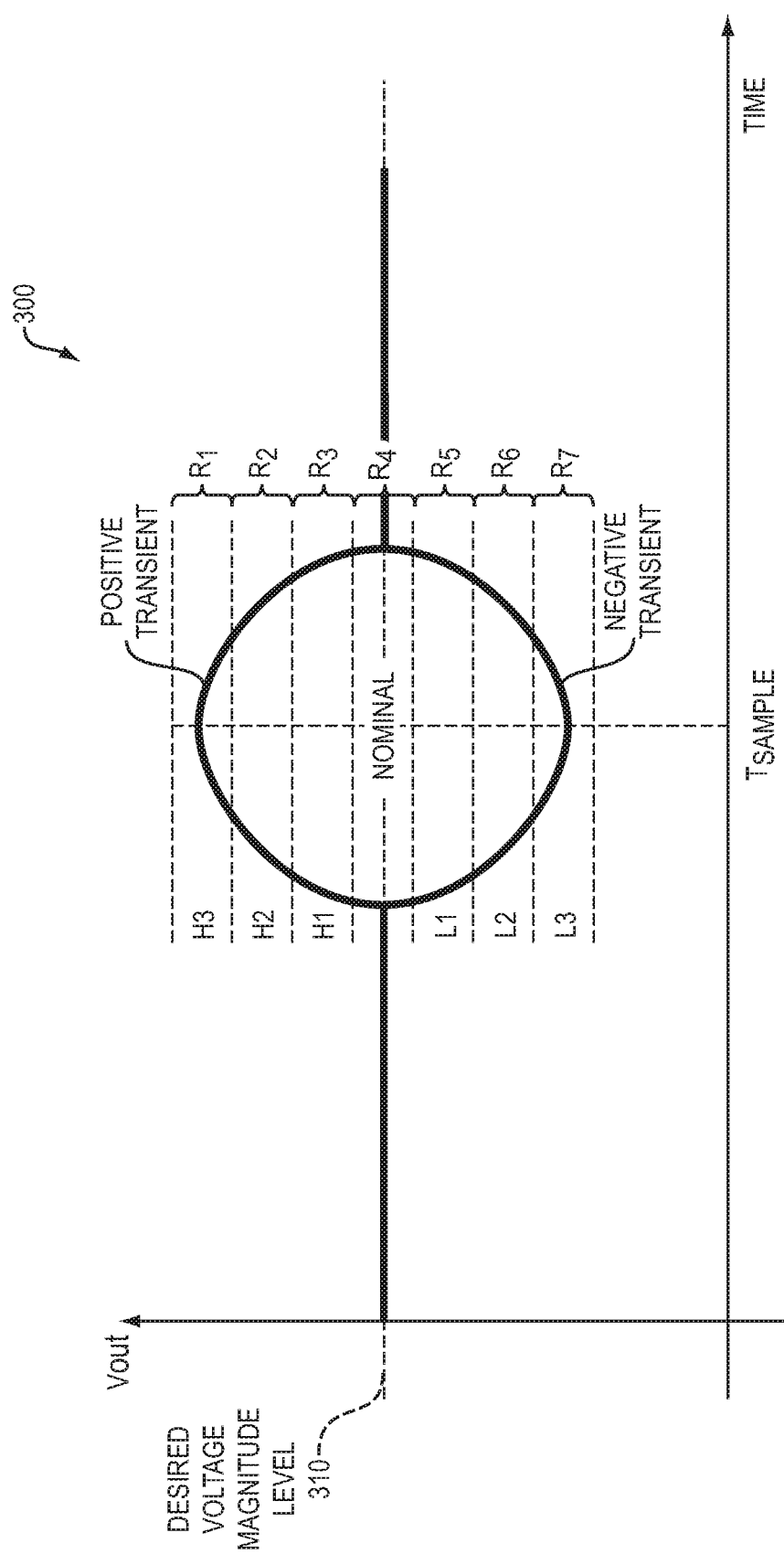
FIG. 3 is an example diagram illustrating different possible voltage variations of an output voltage according to embodiments herein.

FIG. 3 is an example diagram illustrating voltage variations of an output voltage according to embodiments herein.

As shown in timing diagram 300, and as previously discussed, the magnitude of the output voltage 190 as monitored by the monitor circuit 242 of the secondary control circuitry 222 can vary depending on current consumption by the dynamic load 118. For example, when the dynamic load 118 increases consumption of current supplied through output voltage 190, the magnitude of the output voltage 190 dips below the desired voltage magnitude level 310 by different amounts. As shown, a greater rate of increased current consumption occurring within a respective window of time causes the magnitude of the output voltage 190 to fall further (as a greater negative voltage transient) below the desired voltage magnitude 310.

Conversely, when the dynamic load 118 decreases consumption of current provided by the output voltage 190, the magnitude of the output voltage 190 jumps above the desired voltage magnitude level 310 because less current is consumed. As further shown, the greater a rate of decreased current consumption occurring within the window of time causes the magnitude of the output voltage 190 to increase further (as a greater positive voltage transient) above the desired voltage magnitude level 310.

In one embodiment, the secondary control circuitry 222 maps the different detected voltage levels to different state information depending on the amount of overshoot or undershoot detected at time Tsample.

For example, at time Tsample, if the monitor circuit 242 detects that the magnitude of the output voltage 190 falls within the voltage range R1, the secondary control circuitry 222 sets the state information 139 to level H3 (such as a first multi-bit value, first symbol, etc);

if the monitor circuit 242 detects that the magnitude of the output voltage 190 falls within the voltage range R2, the secondary control circuitry 222 sets the state information 139 to level H2 (such as a second multi-bit value, second symbol, etc);

if the monitor circuit 242 detects that the magnitude of the output voltage 190 falls within the voltage range R3, the secondary control circuitry 222 sets the state information 139 to level H1 (such as a third multi-bit value, third symbol, etc);

if the monitor circuit 242 detects that the magnitude of the output voltage 190 falls within the voltage range R4, the secondary control circuitry 222 sets the state information 139 to level NOMINAL (such as a fourth multi-bit value, fourth symbol, etc);

if the monitor circuit 242 detects that the magnitude of the output voltage 190 falls within the voltage range R5, the secondary control circuitry 222 sets the state information 139 to level L1 (such as a fifth multi-bit value, fifth symbol, etc);

if the monitor circuit 242 detects that the magnitude of the output voltage 190 falls within the voltage range R6, the secondary control circuitry 222 sets the state information 139 to level L2 (such as a sixth multi-bit value, sixth symbol, etc);

if the monitor circuit 242 detects that the magnitude of the output voltage 190 falls within the voltage range R7, the secondary control circuitry 222 sets the state information 139 to level L3 (such as a seventh multi-bit value, seventh symbol, etc); and so on.

Note that splitting of the possible transient conditions into 7 possible ranges (and corresponding states) is shown by way of non-limiting example only. The number of possible selectable states can vary depending on the embodiment.

Figure 4:
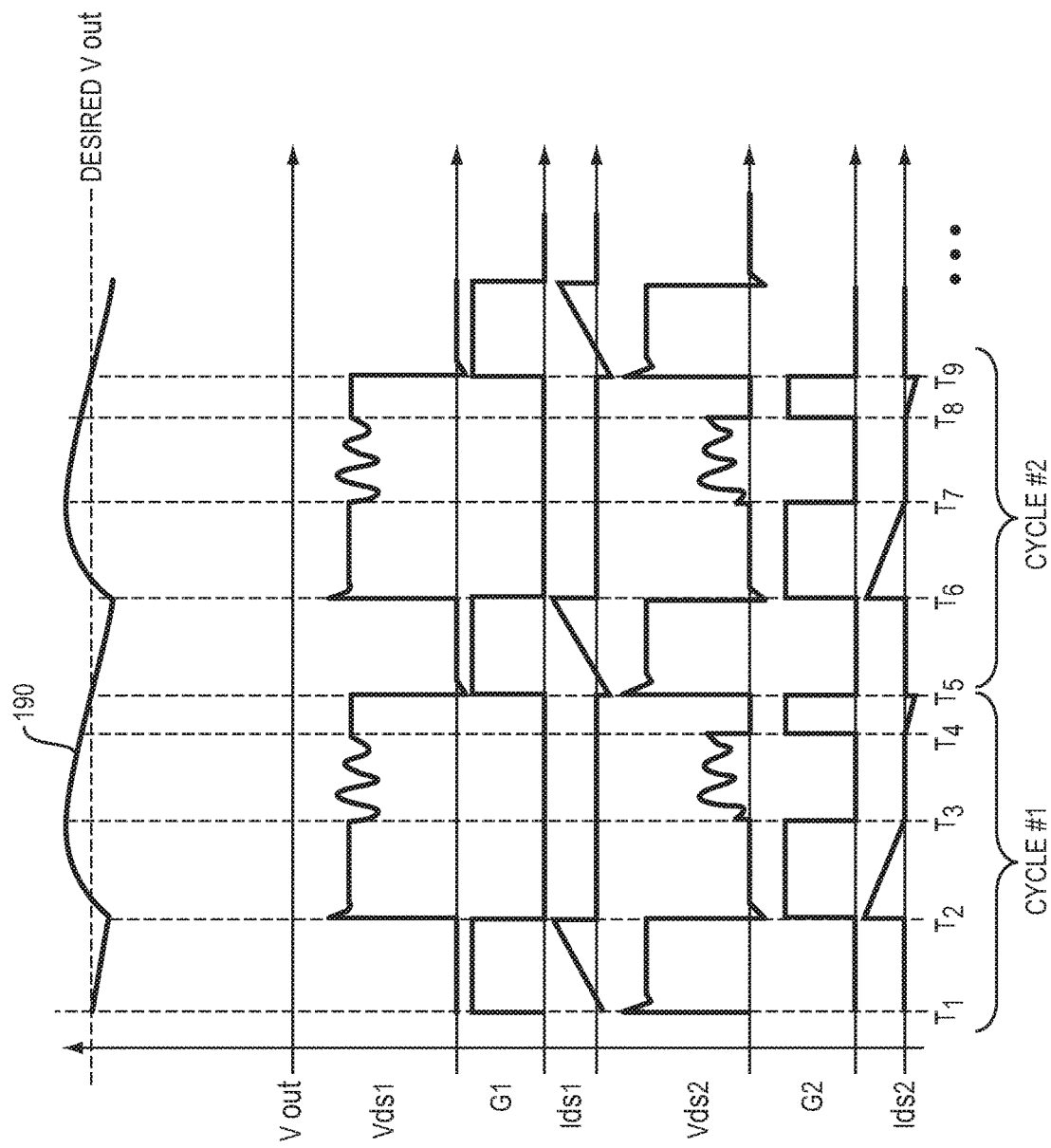
FIG. 4 is an example timing diagram illustrating input of feedback through a secondary winding and receipt of the feedback over a node of a primary winding according to embodiments herein.

FIG. 4 is an example timing diagram illustrating input of feedback through a secondary winding and receipt of the feedback on a primary winding according to embodiments herein.

As shown, the primary control circuitry 221 activates the switch circuitry 231 to an ON state (while switch circuitry 232 is set to an OFF state by secondary control circuitry 232) between time T1 and T2 of cycle #1. This causes the current IDS1 to flow through the primary winding 131, storing a corresponding quantum of energy in the transformer circuitry 130. Between time T2 and time T3, the primary control circuitry 221 controls the switch circuitry 231 to an OFF state. Between time T2 and T3, the secondary control circuitry 222 controls the switch circuitry 232 to an ON state. This causes the current IDS2 to flow through the secondary winding 131, conveying the energy in the transformer circuitry 132 to the output capacitor 210 and/or dynamic load 118.

In one embodiment, the secondary control circuitry 222 turns the switch circuitry 232 to a respective OFF state at time T3 in response to detecting that IDS2 is substantially 0 amps at time T3, corresponding to a condition in which the secondary winding 132 no longer delivers positive current to the output capacitor 210 and/or load 118.

As previously discussed, the monitor circuit 242 monitors the magnitude of the output voltage 190. In one embodiment, the monitor circuit 242 monitors the magnitude of the output voltage 190 (at any suitable time such as between time T3 and T4) to determine whether or not the magnitude of the output voltage 190 is within range (regulation). In a manner as previously discussed in FIG. 3, when monitoring the magnitude of the output voltage 190, the secondary control circuitry 222 produces the appropriate state information 139 to any of multiple possible states (such as state H3, H2, H1, NOMINAL, L1, L2, or L3).

Figure 5:
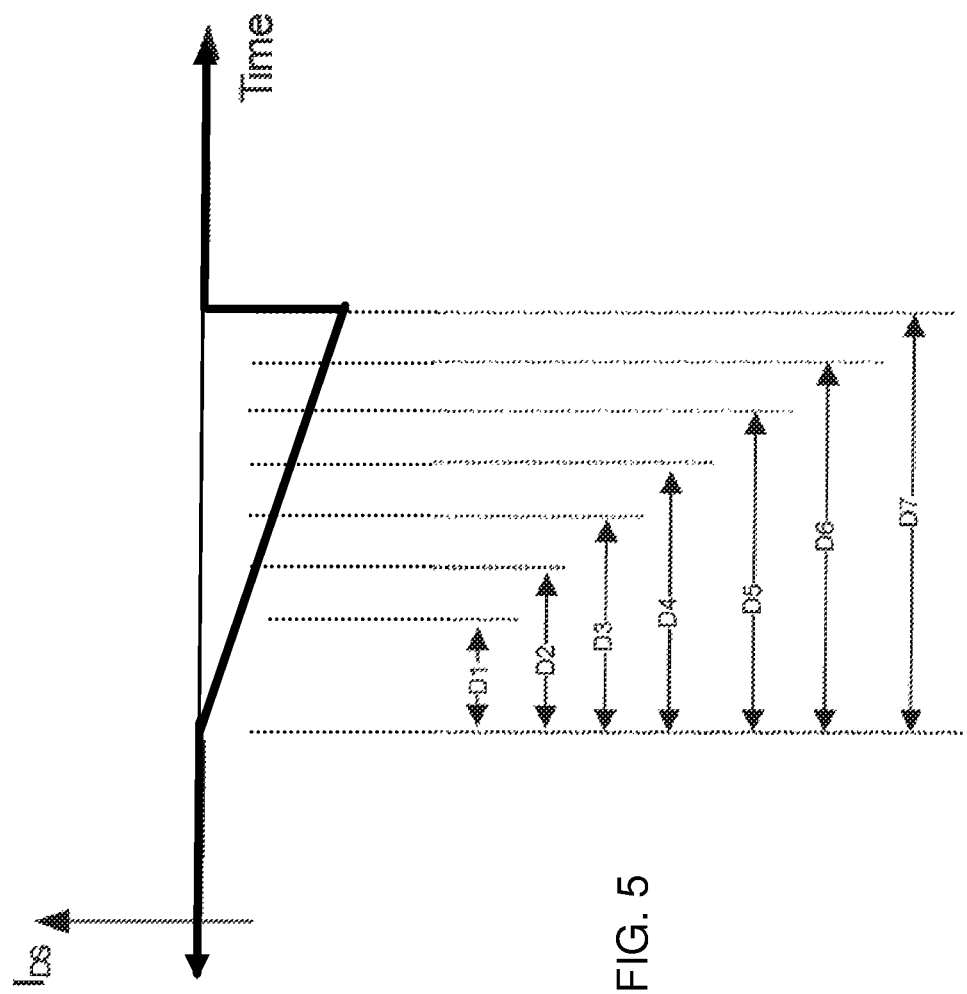
FIG. 5 is an example diagram illustrating control of current through a secondary winding to convey corresponding feedback to a primary winding according to embodiments herein.

Further in this example embodiment, the secondary control circuitry 222 initiates conveyance of the state information 139 as corresponding feedback 142 to the primary control circuitry 221 between time T4 and time T5 as shown in FIG. 5.

FIG. 5 is an example diagram illustrating control of current through a secondary winding to convey corresponding feedback to a primary winding according to embodiments herein.

As shown, at or around time T4, the secondary control circuitry 222 initiates activation of the secondary switch circuitry 232 to an ON state to transmit the state information 139 as feedback 142 through the transformer circuitry 130. Activation of the switch circuitry 232 causes depletion of at least a portion of energy stored in the output capacitor 210. Recall that the energy on output capacitor 210 was retrieved from the transformer 130 between time T2 and time T3. Thus, a portion of energy previously inputted through the primary winding is used to transmit feedback 142 through the transformer circuitry 130 to the primary circuit 121.

As further discussed below, the amount of depletion of charge on the output capacitor 210 (to transmit the feedback 142) varies depending upon the state information 139 selected by the secondary control circuit 222 to convey to the primary control circuitry 221.

For example, to convey state information 139 equal to state L3 over transformer circuitry 130 to the primary control circuitry 221, the secondary control circuitry 222 activates the switch circuitry 232 for a time duration D1, resulting in a first magnitude of negative ramp current through the secondary winding 132 as shown. As previously discussed, the output voltage 190 stored on output capacitor 210 provides the current to produce the negative ramp current. In such an instance, to convey state L3, at the corresponding time TL3 associated with state information L3, the secondary switch circuit 222 switches the switch circuitry 232 to an OFF state (corresponding to time T5 in the timing diagram of FIG. 4).

To convey state information 139 equal to state L2 over transformer circuitry 130 to the primary control circuitry 221, the secondary control circuitry 222 activates the switch circuitry 232 for a time duration D2, resulting in a second magnitude of negative ramp current through the secondary winding 132 as shown. In such an instance, at the corresponding time TL2 associated with state information L2, the secondary switch circuit 222 switches the switch circuitry 232 to an OFF state (corresponding to time T5 in the timing diagram of FIG. 4).

To convey state information 139 equal to state L1 over transformer circuitry 130 to the primary control circuitry 221, the secondary control circuitry 222 activates the switch circuitry 232 for a time duration D3, resulting in a third magnitude of negative ramp current through the secondary winding 132 as shown. In such an instance, at the corresponding time TL3 associated with state information L3, the secondary switch circuit 222 switches the switch circuitry 232 to an OFF state (corresponding to time T5 in the timing diagram of FIG. 4).

To convey state information 139 equal to state NOMINAL over transformer circuitry 130 to the primary control circuitry 221, the secondary control circuitry 222 activates the switch circuitry 232 for a time duration D4, resulting in a fourth magnitude of negative ramp current through the secondary winding 132 as shown. In such an instance, at the corresponding time TN associated with state information NOMINAL, the secondary switch circuit 222 switches the switch circuitry 232 to an OFF state (corresponding to time T5 in the timing diagram of FIG. 4).

To convey state information 139 equal to state H1 over transformer circuitry 130 to the primary control circuitry 221, the secondary control circuitry 222 activates the switch circuitry 232 for a time duration D5, resulting in a fifth magnitude of negative ramp current through the secondary winding 132 as shown. In such an instance, at the corresponding time TH1 associated with state information H1, the secondary switch circuit 222 switches the switch circuitry 232 to an OFF state (corresponding to time T5 in the timing diagram of FIG. 4).

To convey state information 139 equal to state H2 over transformer circuitry 130 to the primary control circuitry 221, the secondary control circuitry 222 activates the switch circuitry 232 for a time duration D6, resulting in a sixth magnitude of negative ramp current through the secondary winding 132 as shown. In such an instance, at the corresponding time TH2 associated with state information H2, the secondary switch circuit 222 switches the switch circuitry 232 to an OFF state (corresponding to time T5 in the timing diagram of FIG. 4).

To convey state information 139 equal to state H3 over transformer circuitry 130 to the primary control circuitry 221, the secondary control circuitry 222 activates the switch circuitry 232 for a time duration D7, resulting in a seventh magnitude of negative ramp current through the secondary winding 132 as shown. In such an instance, at the corresponding time TH3 associated with state information H3, the secondary switch circuit 222 switches the switch circuitry 232 to an OFF state (corresponding to time T5 in the timing diagram of FIG. 4).

In this manner, the secondary control circuit 222 can be configured to select one of multiple durations to convey different state information through the transformer circuitry 130 to the primary control circuit 221.

Note that activation of secondary switch circuitry 232 consumes energy stored in the output capacitor 210, reducing the magnitude of the output voltage 190, which is beneficial during overshoot voltage conditions on the output voltage 190. A successively higher amount of energy is consumed to transmit states H1, H2, and H3 as feedback 142, increasing a response time of maintaining the magnitude of the output voltage 190 within a desired range. That is, greater consumption of energy on the output capacitor 210 to transmit feedback 142 causes a greater drop in the magnitude of the output voltage 190.

Accordingly, as discussed above, the secondary control circuitry 222 can be configured to vary a time of activating the switch circuitry 232 to an ON state between time T4 and T5 by different amounts to convey different selected state information (such as any suitable type of information such as commands, messages, error information, etc.) through the secondary winding 132 and primary winding 131 of the transformer circuitry 130 to the primary control circuitry 221.

Note again that the state information 139 need not be related to generation of the output voltage 190 and maintaining it within a desired range. State information conveyed through the transformer circuitry 130 can be any type of data.

Figure 6:
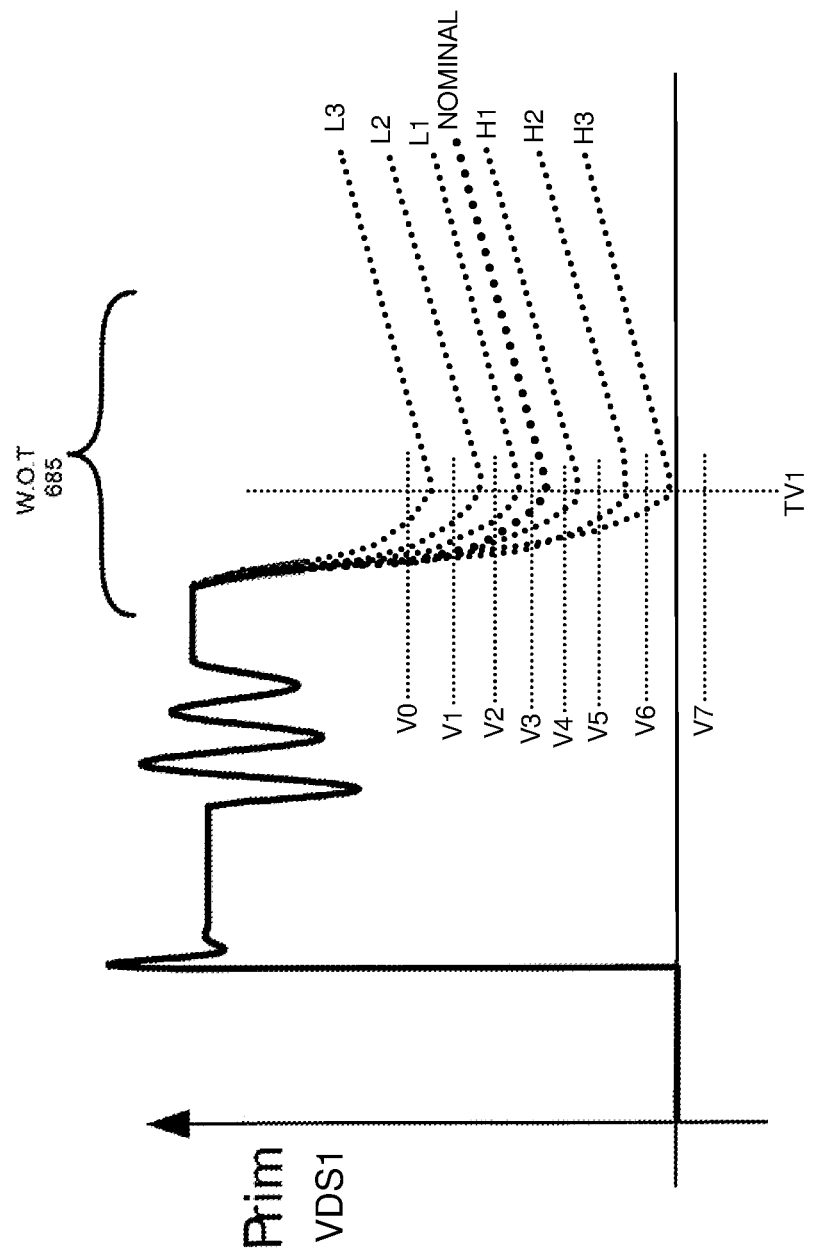
FIG. 6 is an example timing diagram illustrating monitoring of a voltage on a node of the primary winding to receive feedback according to embodiments herein.

FIG. 6 is an example timing diagram illustrating monitoring of a voltage on the primary winding to receive state information according to embodiments herein.

To receive the feedback 142, which is encoded to include corresponding state information 139, the monitor circuit 241 of the primary circuit 121 monitors a magnitude of a voltage at a respective node 294 of the primary winding 131. The input of the feedback 142 to the secondary winding 132 causes a perturbation in the magnitude of the voltage is VDS1 at the node 294 of the primary winding 131 at around time Tv. Monitor circuit 241 monitors the voltage VDS1 in window of time 685 for a voltage transition (peak or valley).

In one embodiment, the perturbation of the magnitude of the voltage at the node of the primary winding is a peak transition or valley transition of the VDS1 voltage at the node 294 occurring within a monitored window of time 685 (around time T5).

For example, if the detected valley voltage in the monitored window of time 685 falls in between voltage range defined by threshold values V0 and V1, then the received state information 139 in feedback 142 is L3;

if the detected valley voltage of VDS1 in the monitored window of time 685 falls in between voltage V1 and V2, then the received state information 139 in feedback 142 is L2;

if the detected valley voltage of VDS1 in the monitored window of time 685 falls in between voltage V2 and V3, then the received state information 139 in feedback 142 is L3;

if the detected valley voltage of VDS1 in the monitored window of time 685 falls in between voltage V3 and V4, then the received state information 139 in feedback 142 is NOMINAL;

if the detected valley voltage of VDS1 in the monitored window of time 685 falls in between voltage V4 and V5, then the received state information 139 in feedback 142 is H1;

if the detected valley voltage of VDS1 in the monitored window of time 685 falls in between voltage V5 and V6, then the received state information 139 in feedback 142 is H2; and if the detected valley voltage of VDS1 in the monitored window of time 685 falls in between voltage V6 and V7, then the received state information 139 in feedback 142 is H3.

As previously discussed, the feedback 142 is encoded to represent any of one or more different levels (such as H3, H2, H1, NOMINAL, L1, L2, or L3). That is, each of the different levels represents a different possible state.

In response to receiving the feedback 142, and selected state information 139, the primary circuit 121 uses the feedback to control subsequent input of a quantum of energy to the primary winding 131. Accordingly, the state information 139 can indicate error data associated with the generated output voltage 190 with respect to a reference voltage 252.

In one embodiment, the power converter circuit 221 uses the received state information 139 detected around time T5 to determine how much energy to input into the primary winding 131 on a subsequent cycle such as between time T6 and T7. For example, the secondary control circuitry 221 selectively adjusts a timing (i.e., pulse duration) of activating switch circuitry 231 depending on the received state information 139.

More specifically, if the received state information 139 indicates a state of NOMINAL, the power converter circuit 221 controls the switch circuitry 231 to an ON state between time T6 and time T7 to be the same as the duration of ON time between time T1 and time T2 to deliver a same quantum of energy to the primary winding 131 in cycle #2 as was inputted during cycle #1.

If the received state information 139 indicates a state of L1, the power converter circuit 221 controls a pulse duration of the switch circuitry 231 to an ON state between time T6 and time T7 to be greater (by a first amount) than the duration of ON time between time T1 and time T2 to deliver a greater quantum of energy to the primary winding 131 in cycle #2 as was inputted during cycle #1.

If the received state information 139 indicates a state of L2, the power converter circuit 221 controls the switch circuitry 231 to an ON state between time T6 and time T7 to be greater (by a second amount) than the duration of ON time between time T1 and time T2 to deliver a yet greater quantum of energy to the primary winding 131 in cycle #2 as was inputted during cycle #1.

If the received state information 139 indicates a state of L3, the power converter circuit 221 controls the switch circuitry 231 to an ON state between time T6 and time T7 to be greater than (by a third amount) the duration of ON time between time T1 and time T2 to deliver a still greater quantum of energy to the primary winding 131 in cycle #2 as was inputted during cycle #1.

If the received state information 139 indicates a state of H1, the power converter circuit 221 controls the switch circuitry 231 to an ON state between time T6 and time T7 to be less than (by a first amount) the duration of ON time between time T1 and time T2 to deliver a smaller quantum of energy to the primary winding 131 in cycle #2 as was inputted during cycle #1.

If the received state information 139 indicates a state of H2, the power converter circuit 221 controls the switch circuitry 231 to an ON state between time T6 and time T7 to be less than (by a second amount) the duration of ON time between time T1 and time T2 to deliver a yet smaller quantum of energy to the primary winding 131 in cycle #2 as was inputted during cycle #1.

If the received state information 139 indicates a state of H3, the power converter circuit 221 controls the switch circuitry 231 to an ON state between time T6 and time T7 to be greater (by a third amount) than the duration of ON time between time T1 and time T2 to deliver a still lesser quantum of energy to the primary winding 131 in cycle #2 as was inputted during cycle #1.

Thus, feedback 142 from the secondary circuit 222 can be used to regulate the magnitude of the output voltage 190, cycle after cycle, based on upon a degree to which the secondary control circuitry 222 indicates how to adjust subsequent input of energy into the primary winding 131 as specified by the subsequent cycles of receiving state information 139. In other words, the secondary circuit 122 transmits first state information during cycle #1 (such as NOMINAL), second state information (such as state L1) during cycle #2, third state information (such as state L2) during cycle #3, fourth state information (such as state L1) during cycle #4, fifth state information (such as state NOMINAL) during cycle #5, and so on.

In one embodiment, the adjustments to the delivery of a respective quantum of energy in each next successive cycle can depend on factors such as a size of output capacitor 210, desired magnitude of the output voltage 190, current consumption by dynamic load 118, magnitude of the input voltage 121, etc. Note that the power converter circuit 221 optionally maps the received state information 139 in feedback 142 to a corresponding positive, zero, or negative time adjustment value to adjust delivery of energy on a next cycle.

Thus, the feedback 142 received over multiple cycles can indicate to increase or decrease a rate of inputting energy into the primary winding 131. More specifically, to accommodate different levels of droop on the magnitude of the output voltage 190 below a desired setting, the primary control circuit 221 increases energy inputted to primary winding 131 on a next one or more cycles. To accommodate different levels of overshoot on the output voltage 190, the primary control circuit 221 decreases energy inputted to primary winding 131 on a next one or more cycles.

Figure 7:
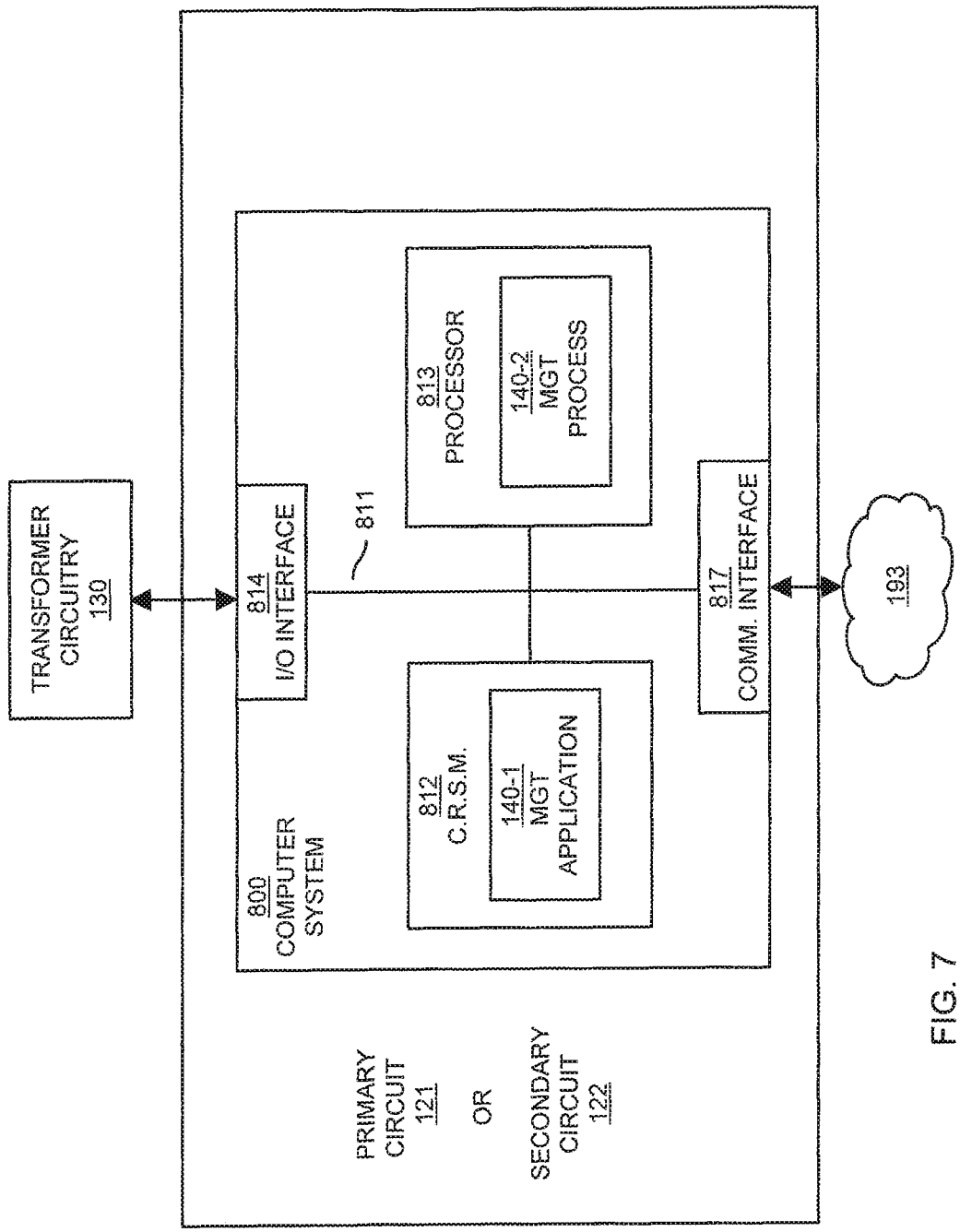
FIG. 7 is an example diagram illustrating computer processor hardware and related software to execute methods according to embodiments herein.

FIG. 7 is an example block diagram of a computer device for implementing any of the operations as discussed herein according to embodiments herein.

As shown, computer system 800 such as in primary circuit 121 and/or secondary circuit 122 of the present example includes an interconnect 811 that couples computer readable storage media 812 such as a non-transitory type of media (i.e., any type of hardware storage medium) in which digital information can be stored and retrieved, a processor 813 (e.g., computer processor hardware such as one or more processor devices), I/O interface 814, and a communications interface 817.

I/O interface 814 provides connectivity to any suitable circuitry such as primary winding 131, secondary winding 132, etc.

Computer readable storage medium 812 can be any hardware storage resource or device such as memory, optical storage, hard drive, floppy disk, etc. In one embodiment, the computer readable storage medium 812 stores instructions and/or data used by the management application 140-1 to perform any of the operations performed by primary circuit 121 or secondary circuit 122.

Further in this example embodiment, communications interface 817 enables the computer system 800 and processor 813 to communicate over a resource such as network 193 to retrieve information from remote sources and communicate with other computers.

As shown, computer readable storage media 812 is encoded with management application 140-1 (e.g., software, firmware, etc.) executed by processor 813. Management application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812.

Execution of the management application 140-1 produces processing functionality such as management process 140-2 in processor 813. In other words, the management process 140-2 associated with processor 813 represents one or more aspects of executing management application 140-1 within or upon the processor 813 in the computer system 150.

In accordance with different embodiments, note that computer system may be a micro-controller device configured to control a power supply and perform any of the operations as described herein.

Functionality supported by the different resources will now be discussed via flowcharts in FIGS. 8-10. Note that the steps in the flowcharts below can be executed in any suitable order.

Figure 8:
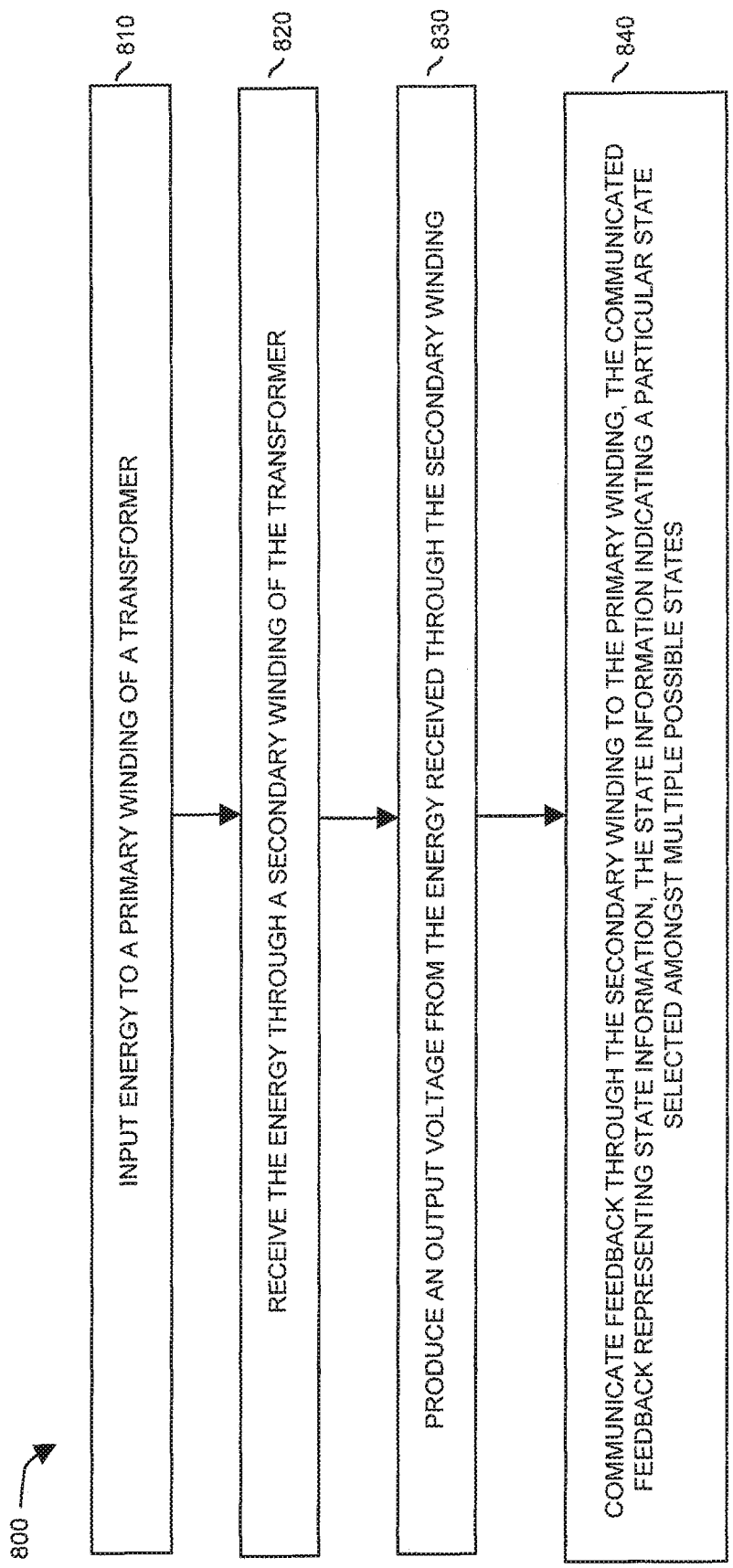
FIGS. 8-10 are example diagrams illustrating methods according to embodiments herein.

FIG. 8 is a flowchart 800 illustrating an example method according to embodiments. Note that there will be some overlap with respect to concepts as discussed above.

In processing operation 810, the primary circuit 121 inputs energy (via flow of current sourced from input voltage 120) to the primary winding 131 of transformer circuitry 130.

In processing operation 820, the secondary circuit 122 receives the energy through the secondary winding 132 of the transformer circuitry 130.

In processing operation 830, the secondary circuit 122 produces output voltage 190 from the energy received through the secondary winding 132.

In processing operation 840, the secondary circuit 122 communicates feedback 142 through the secondary winding (such as via controlling a flow of current sourced from the output voltage 120 or other source) to the primary winding 131. The communicated feedback 142 indicates a particular state selected by the secondary circuit 122 amongst multiple possible states. Accordingly, the secondary circuit 122 is able to convey multi-level information or multi-bit data back to the primary circuit 121 through the transformer circuitry 130.

Figure 9:
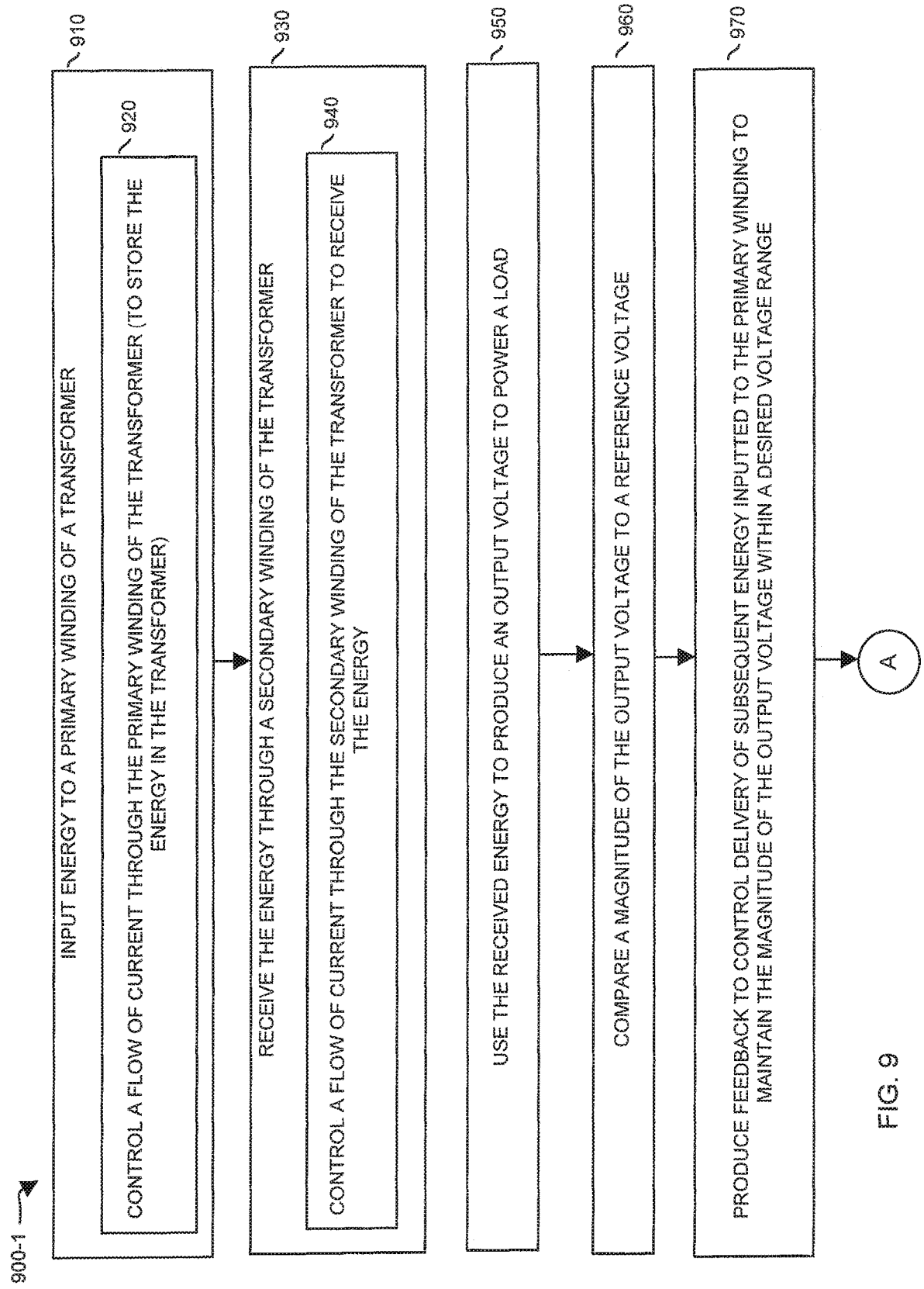

FIG. 9 is a flowchart 900-1 illustrating an example method according to embodiments herein. Note that there will be some overlap with respect to concepts as discussed above.

In processing operation 910, the primary circuit 121 inputs energy to primary winding 131 of transformer circuitry 130. In one embodiment, in sub-operation 920, the primary circuit 121 controls a flow of current through the primary winding 131 of the transformer circuitry 130 to store the energy in the transformer circuitry 130.

In processing operation 930, the primary circuit 121 receives the energy through the secondary winding 132 of the transformer circuitry 130. In sub-operation 940, the primary circuit 121 controls a flow of current through the secondary winding 132 of the transformer circuitry 132 to receive the energy.

In processing operation 950, the primary circuit 121 uses the received energy to produce an output voltage 190 to power dynamic load 118.

In processing operation 960, the monitor circuit 242 of primary circuit 121 compares a magnitude of the output voltage 190 to a reference voltage 252.

In processing operation 970, the primary circuit 121 produce feedback 142 to control delivery of subsequent energy inputted to the primary winding 131 to maintain the magnitude of the output voltage 190 within a desired voltage range.

Figure 10:
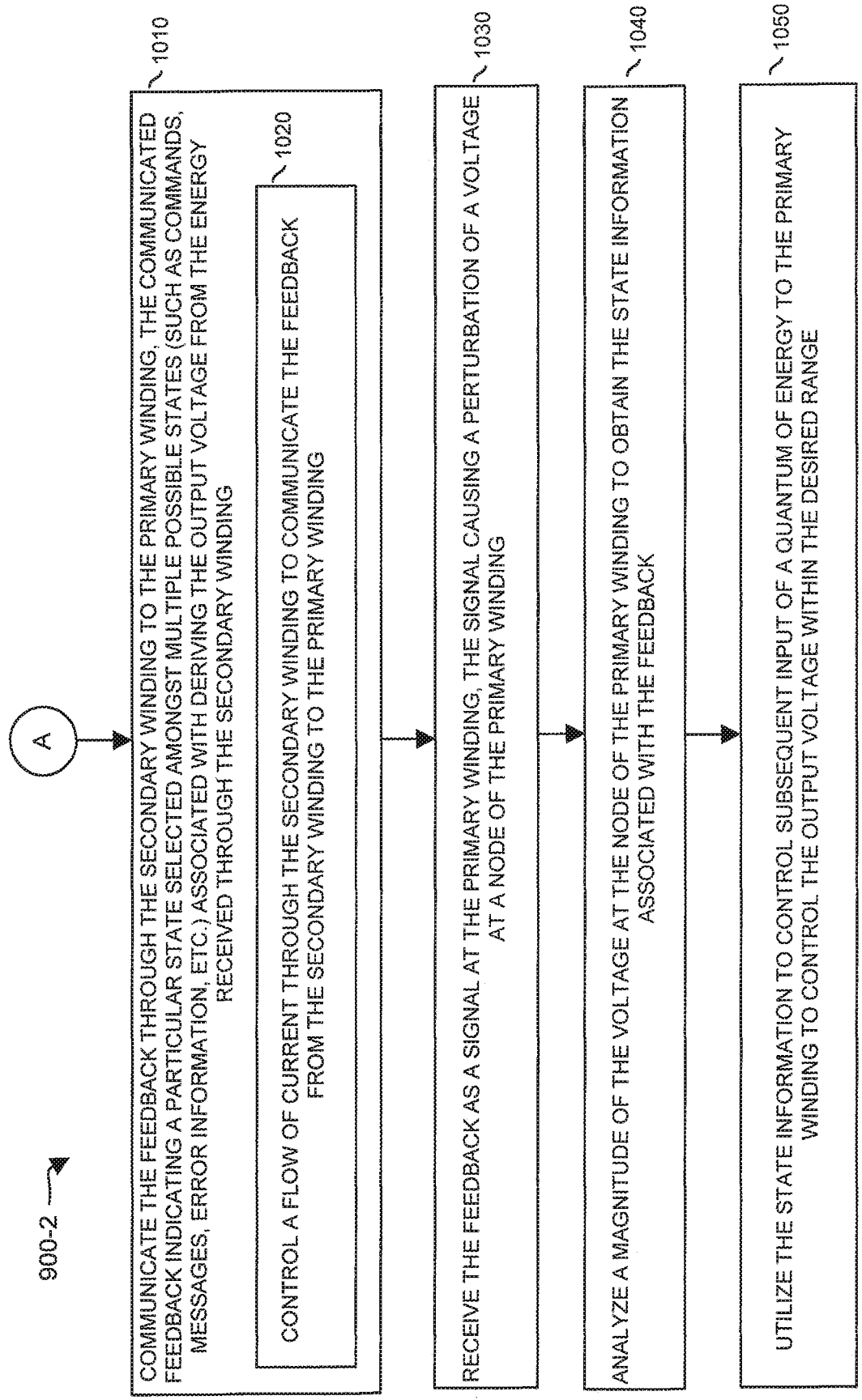

FIG. 10 is a flowchart 900-2 illustrating an example method according to embodiments. Note that there will be some overlap with respect to concepts as discussed above.

In processing operation 1010, the secondary circuit 122 communicates the feedback 142 through the secondary winding 132 to the primary winding 131. The communicated feedback 142 indicates a particular state selected amongst multiple possible states (such as commands, messages, error information, etc.) associated with deriving the output voltage 190 from the energy received through the secondary winding 132. In sub-processing operation 1020, the primary circuit 121 controls a flow of current through the secondary winding 132 to communicate the feedback 142 from the secondary winding 132 to the primary winding 131.

In processing operation 1030, the primary circuit 121 receives the feedback 142 as a signal at the primary winding 131. In one embodiment, the signal is a perturbation of voltage at a node 294 of the primary winding 131.

In processing operation 1040, the primary circuit 121 analyzes a magnitude of the voltage at the node 294 of the primary winding 131 to obtain the state information associated with the feedback 142.

In processing operation 1050, the primary circuit 121 utilizes the state information 139 received in the feedback 142 to control subsequent input of a quantum of energy to the primary winding 131 to control the output voltage 190 within the desired range.

Note again that techniques herein are well suited for use in power converter circuit applications such as those that implement a transformer. However, it should be noted that embodiments herein are not limited to use in such applications and that the techniques discussed herein are well suited for other applications as well.

For example, the feedback technique can also operate with analogue information where the output voltage error can be translated directly into corresponding NCRT (Negative Current Request Times) (linear or non-linear relation) or through a look-up table (LUT). The valley voltage detection on the primary side detection (through some form of voltage divider, e.g. resistive or capacitive) can then translate this into variable on-time, again this can be linear, non-linear or through LUT. In the analogue form of VFTT (Voltage Feedback Through Transformer), it can operate the full control of the transformer circuitry 130 without the VOT (Variable On Time) concept while still maintaining the fast reaction times and reduction in component counts. Note further that analogue or digital form of the voltage feedback through the transformer is not limited to use of a flyback; it may be used for other topologies such as 2-transistor flyback and may be combined with variable on-time control or constant on-time control respectively Multi-Modal Operation—Variable Frequency Vs. Fixed Frequency Embodiments herein further include switching modal operation of the power converter circuit 100 between a first mode (fixed frequency, variable pulse width) and a second mode (variable frequency, fixed pulse width) over a range of different magnitudes of power delivered by the output voltage 190 to a dynamic load 118.

As further discussed below, the power converter circuit 100 switches between the operational modes based on feedback 142 conveyed from the secondary winding 132 to the primary winding 131 over each of the multiple cycles. The secondary control circuit 222 initiates transmission of the feedback 142 when additional energy is needed to maintain the output voltage 190 within a desired range. In one embodiment, receipt of feedback 142 at the primary control circuit 221 indicates i) degradation of the magnitude of the output voltage 190 below a threshold value, and/or ii) a request for input of energy into the primary winding. As further described herein, if desired, the feedback 142 can include state information 139 (multi-level data) indicating a magnitude in which to modify subsequent input of energy to the primary winding 131.

Figure 11:
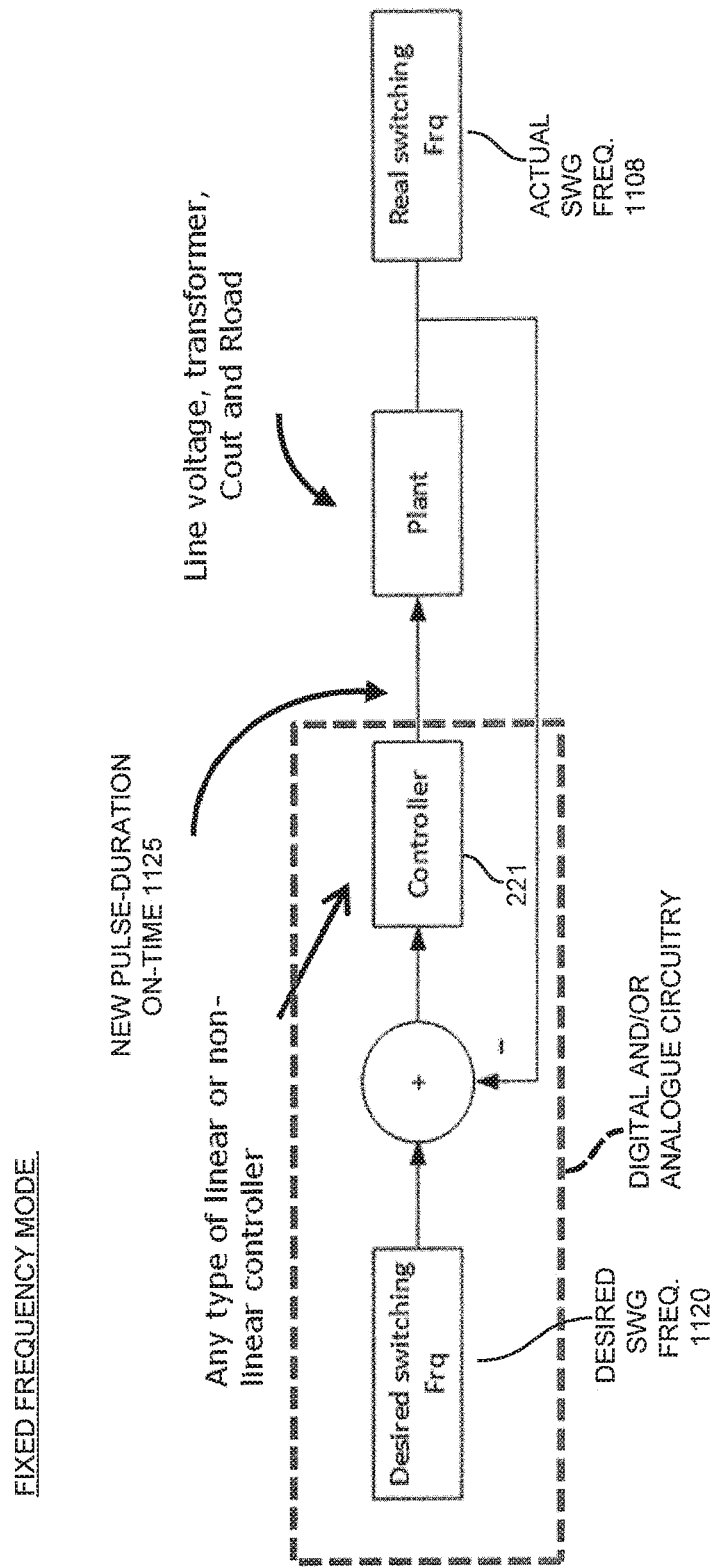
FIG. 11 is an example block diagram illustrating adjustment of a pulse duration of energizing a primary winding based on feedback to control a switching frequency of energizing the primary winding to a desired setpoint frequency according to embodiments herein.

More specifically, FIG. 11 is an example block diagram illustrating fixed frequency mode including adjustment of a pulse duration of energizing a primary winding based on feedback to control a switching frequency of energizing the primary winding to a desired setpoint frequency according to embodiments herein.

In this example embodiment including analog and/or digital circuitry, to control the switching frequency about a desired setpoint, the primary control circuit 221 compares the actual switching frequency 1108 of inputting energy into the primary winding 131 to a desired setpoint switching frequency 1120. In one embodiment, the desired (setpoint) switching frequency 1120 corresponds to a minimal frequency of energizing the primary winding 131.

To maintain the actual switching frequency 1110 at or above the desired setpoint switching frequency 1120, the primary control circuit 221 modifies the pulse width of energizing the primary winding 131 to increase or decrease the frequency as is needed to keep the frequency at or above the desired switching frequency 1120.

Figure 12:
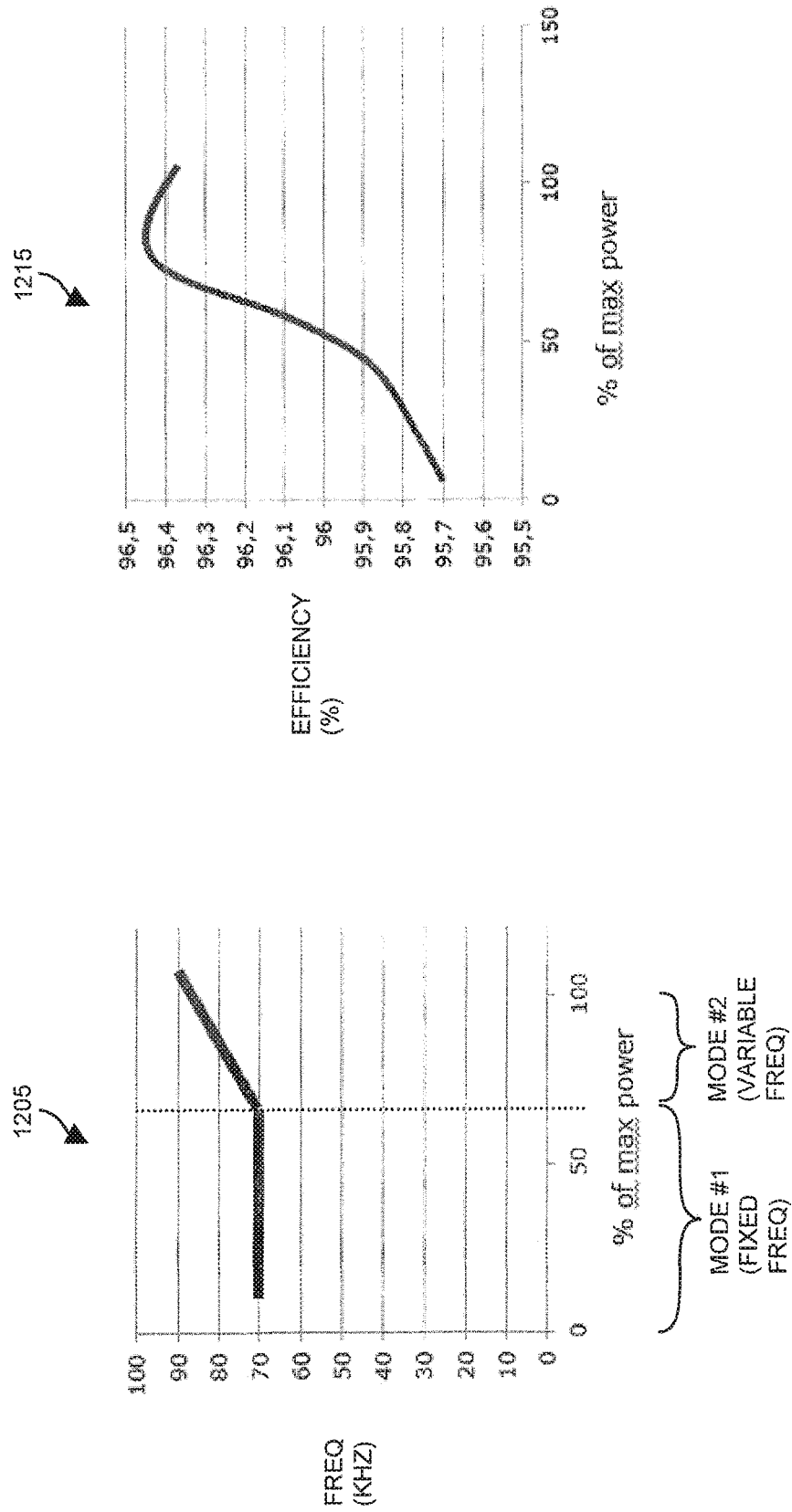
FIG. 12 is an example diagram illustrating switching frequency versus power consumption and efficiency versus power consumption according to embodiments herein.

FIG. 12 is an example diagram illustrating switching frequency versus power consumption and efficiency versus power consumption associated with multi-mode operation of the power converter circuit according to embodiments herein.

As previously discussed, the primary control circuit 221 of primary circuit 121 modifies the rate and/or duration of energizing the primary winding 131 over time to maintain the output voltage 190 within a desired range.

Graph 1205 indicates an example switching frequency profile of energizing the primary winding 131 over a range of consumption by the dynamic load 118. In general, operation of the power converter circuit 100 switches between the first mode (fixed frequency) and the second mode (variable frequency) depending on a timing of receiving the feedback 142 with respect to a reference time value over each of multiple cycles.

For this example profile, during conditions of operating between 0 and 60% of maximum power consumption, the primary circuit 121 makes one or more adjustments to the pulse duration of energizing the primary winding 131 to control a frequency of energizing the primary winding 131 to be around 70 KHz. Above 60% consumption levels, the power converter circuit 100 operates in a variable frequency mode (such as between 70 and 100 KHz) to maintain the output voltage 190 within a desired range.

Graph 1215 illustrates the efficiency of producing the output voltage 190 over the full range of different power consumption levels. As shown, the efficiency of operating the power converter circuit 100 is greater than 95%, regardless of whether the power converter circuit 100 is operated in a variable frequency mode or a fixed frequency mode.

As mentioned, the graphs 1205 and 1215 correspond a chosen profile in which the controller attempts to prevent the switching frequency to fall below a threshold value of 70 KHz for loads below 60%; the controller operates in a variable frequency mode above 60% of full load. In accordance with further embodiments, note that the profile of switching frequency versus power consumption can be modified to suit any desired application. For example, if desired, the controller can be configured to modify the pulse duration of energizing the primary winding 131 at higher power consumption levels, while operating in a variable frequency mode at lower power consumption levels.

Figure 13:
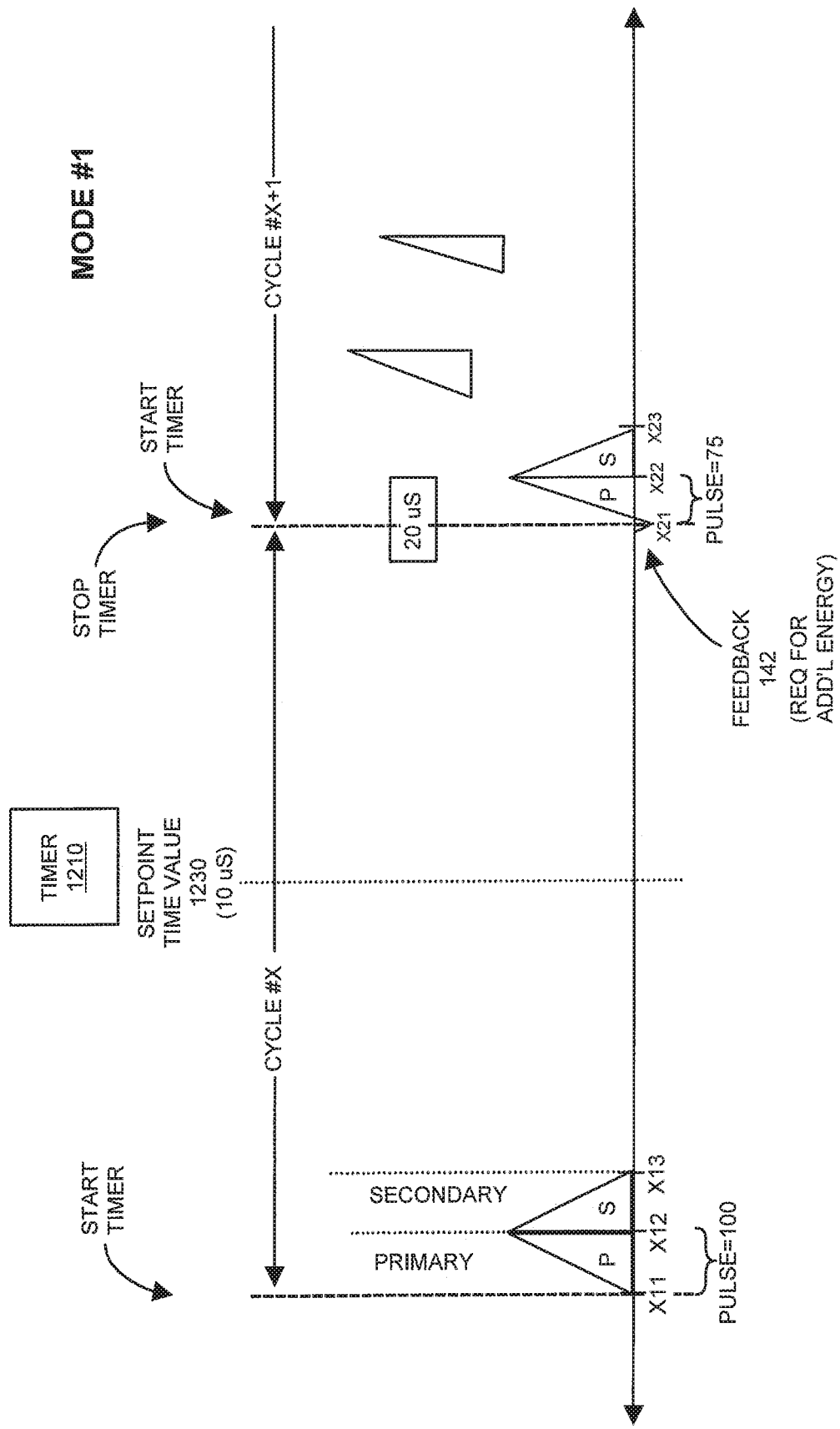
FIGS. 13 and 14 are example timing diagrams illustrating a first operational mode of adjusting pulse durations of energizing the primary winding based on feedback according to embodiments herein.
Figure 14:
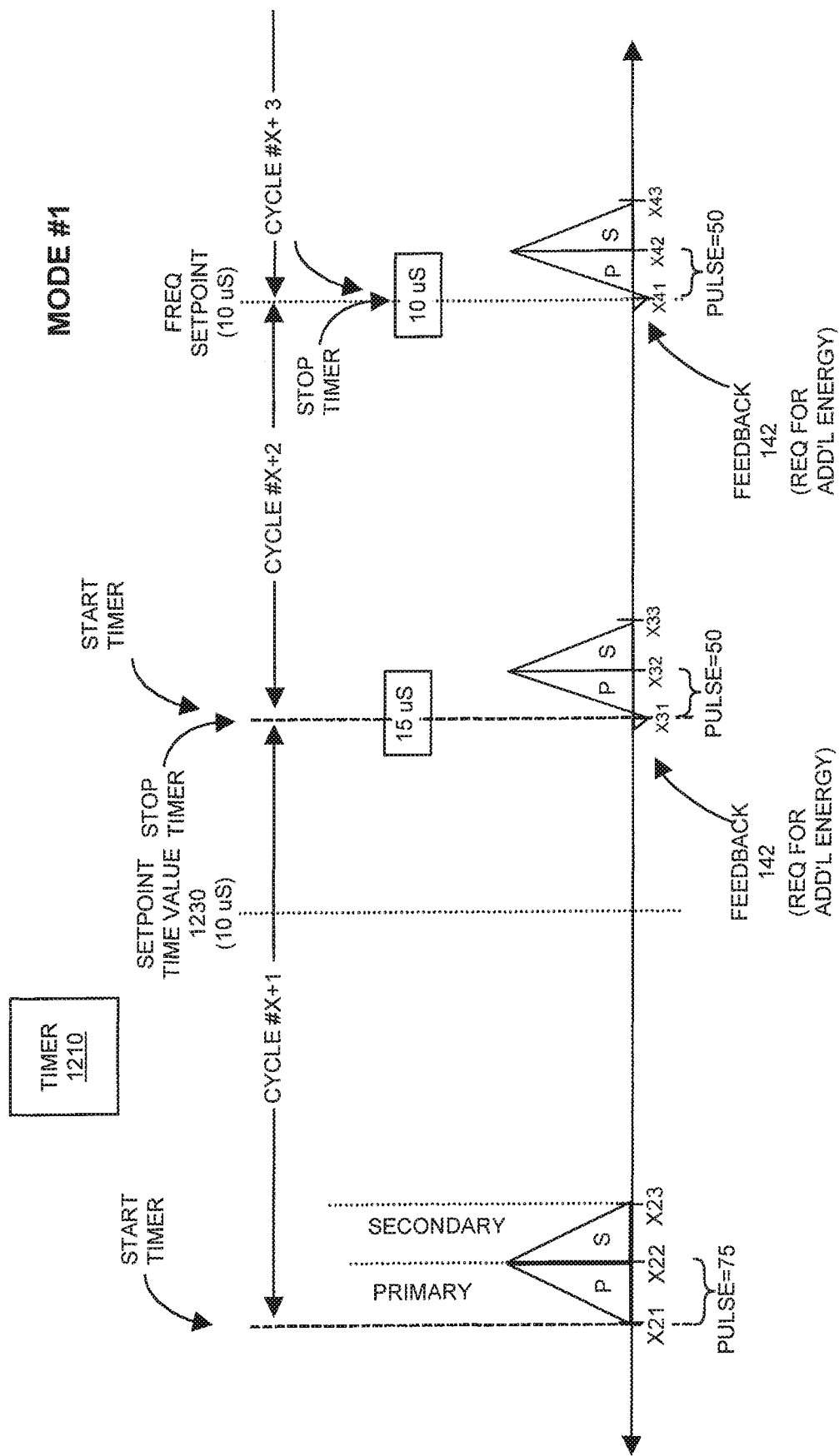

First Operational Mode of Multi-Modal Operation—Fixed Frequency, Variable Pulse Width FIGS. 13 and 14 are example timing diagrams illustrating a first operational mode of adjusting pulse durations of energizing the primary winding based on feedback to control a switching frequency according to embodiments herein.

As shown in the timing diagram of FIG. 13, the secondary control circuit 222 controls a timing of conveying feedback 142 through the secondary winding 131 to the primary winding 132 to maintain a magnitude of the output voltage 190 within a desired range. For example, when more energy is needed by the secondary control circuit 222 to produce the output voltage 190, the secondary control circuit 222 generates and conveys feedback 142 through the secondary winding 131 to the primary winding 132. The feedback 142 in the following figures indicates a request for more energy to be input to the primary winding 131. (Note that use of multi-level feedback 142 will be discussed in subsequent FIGS. 20-22.)

In accordance with further embodiments, the secondary control circuitry 222 monitors the output voltage 190. In response to detecting that the magnitude of the output voltage 190 has degraded with respect to a setpoint reference voltage such as above a threshold difference value, the secondary control circuitry 222 communicates the corresponding feedback 142 through the secondary winding 132 to the primary winding 131. Thus, rather than sending feedback 142 at pre-specified time intervals, the secondary control circuitry 222 delays and/or controls the timing of conveying the feedback 142 through the secondary winding 132 to the primary winding 131 until a time of detecting that additional energy is needed to produce the output voltage 190.

In one embodiment, the primary control circuit 221 includes timer 1210 to maintain the actual switching frequency 1108 to the desired switching frequency 1120. As shown in FIG. 12, the primary control circuit 221 starts the timer 1210 at time X11. Between time X11 and X12 (100 nanoseconds), the primary control circuit 221 activates switch circuitry 231 to energize the primary winding 131. In response to detecting the input of the energy into the primary winding 131, the secondary control circuitry 222 synchronously receives the energy via activation of the switch circuitry 232 between times X12 and X13 to control current through the secondary winding 132.

In this example, the secondary control circuit 222 inputs feedback 142 into the secondary winding 132 at around time X21. In response to detecting and receiving the feedback 142 at the primary winding 131 in a manner as previously discussed above, the primary control circuitry 221 stops the timer 1210. In this example embodiment, the timer value indicates an elapsed duration of 20 µs. This value is substantially larger than the 10 µs setpoint time value 1230 (which corresponds to 100 kHz).

In furtherance of maintaining the actual switching frequency 1108 to around the value of 100 KHz, the primary control circuitry 221 compares the time (20) captured by the timer 1210 to the setpoint (10). In one embodiment, the secondary control circuitry 221 determines a difference between the time of receiving the feedback 142 and the reference setpoint of 10 µs. In this example, the secondary control circuit 221 subtracts 10 µs from the 20 µs in timer 1210. Accordingly, the actual switching frequency 1110 is well below the desired switching frequency of 100 kHz.

To reduce the switching frequency on a subsequent demand cycle, the secondary control circuit 221 modifies the pulse width of energizing the primary winding 131 on a subsequent cycle. For example, in the cycle number X, the primary control circuit 221 sets the pulse width of activating the switch circuitry 231 to be 100 ns between times X11 and X12. To increase the actual frequency 1108, the primary control circuitry 221 reduces the pulse width of activating the primary winding 131 from 100 ns in cycle X to 75 ns in the subsequent cycle X+1. Assuming that power consumption by the load 118 is constant, decreasing the pulse width between times X21 and X22 to 75 nS reduces the time of receiving a subsequent request for additional energy as shown in FIG. 14 on a subsequent cycle X+1 because more energy will be needed sooner on a next cycle.

Referring now to FIG. 14, at time X21, the primary circuit control circuitry 221 resets and then starts the timer 1210 again. The primary control circuitry 221 stops the timer 1210 upon receipt of feedback 142 from the secondary control circuit 222 just prior to time X31. This corresponds to a duration of 15 µs, which is still substantially longer than the desired setpoint of 10 µs. Accordingly, on subsequent cycle X+2, in furtherance of maintaining the actual frequency 1108 to be nearer to the desired frequency 1120 (power converter circuit 100 KHz), the primary control circuitry 221 reduces the pulse duration of energizing the primary winding 131 on cycle X+2 to 50 nS between time X31 and X32. Thus, because the time of 15 uS is greater than the setpoint time value 1230, the primary control circuit 221 reduces the current pulse width from 75 nS to 50 nS.

In a similar manner as previously discussed, during cycle X+2, the primary control circuitry 221 resets and then starts timer 1210 at time X31. The primary switch circuitry 221 stops the timer 1210 upon receipt of feedback 142 just prior to time X41. This corresponds to a duration of 10 µs, which is still substantially equal to the desired setpoint of 10 µs. In response to detecting that the time of 10 µs as captured by the timer 1210 is substantially equal to the setpoint time value 1230, the primary control circuit 221 sets a magnitude of the pulse duration of energizing the primary winding 131 on the next cycle (X+3) between time X41 and X42 (50 nS) to be substantially the same as a pulse duration of energizing the primary winding on the cycle (X+2) between time X31 and X32 (50 nS).

Accordingly, embodiments herein include starting a timer 1210 to track passage of time; and using the timer 1210 to determine a time of receiving feedback at the primary winding 131. In the above example embodiment, the primary control circuit 221 decreases the pulse duration of energizing the primary winding 131 on a second cycle with respect to a magnitude of a pulse duration of energizing the primary winding 131 on the first cycle to maintain frequency operation of energizing the primary winding over multiple cycles to be above or equal to a frequency threshold value.

Note that the magnitude of adjustment applied to the pulse duration of energizing the primary winding 131 can vary depending upon the timing of receiving the feedback 142 in a given cycle. For example, the primary control circuitry 221 may receive the feedback 142 at a duration of 11 μs (instead of 20 μs) after starting the timer 1210. In such an instance, the difference is only one microsecond. Because the difference in this instance is very small, the primary control circuitry 221 may reduce a pulse width on this next cycle by 1% (instead of 33%) with respect to the pulse duration in the previous cycle.

Conversely, the primary control circuitry 221 may receive the feedback 142 at a duration of 30 μs after starting the timer 1210. In such an instance, the difference is 20 microseconds. Because the difference in this instance is very large, the primary control circuitry 221 may reduce the pulse width on the next cycle by 50% or more with respect to the pulse duration in the previous cycle.

Thus, embodiments herein can include generating a difference value indicating a time difference between the time of receiving the feedback in a cycle and the setpoint time value 1230. The primary control circuit 221 uses the difference value to proportionally adjust a magnitude of a pulse duration of energizing the primary winding 131 on a next cycle.

Note further that the primary control circuit 221 can be configured to make very small changes to the pulse width cycle over cycle. In such an instance, it may take longer for the primary control circuit 221 to control the switching frequency to a desired setpoint in response to large load changes in the load.

Accordingly, VOT (Variable On Time) control of the primary winding 131 can be used to control the switching frequency of operation of the power converter circuit 100 to be within a desired range.

Second Operational Mode of Multi-Modal Operation—Variable Frequency

FIGS. 15-18 are example timing diagrams illustrating a second operational mode of varying a frequency of energizing the primary winding based on feedback according to embodiments herein.

Recall that the second operational mode includes varying a frequency of inputting energy into the primary winding 131 based on feedback 142 from the secondary control circuit 222.

Figure 15:
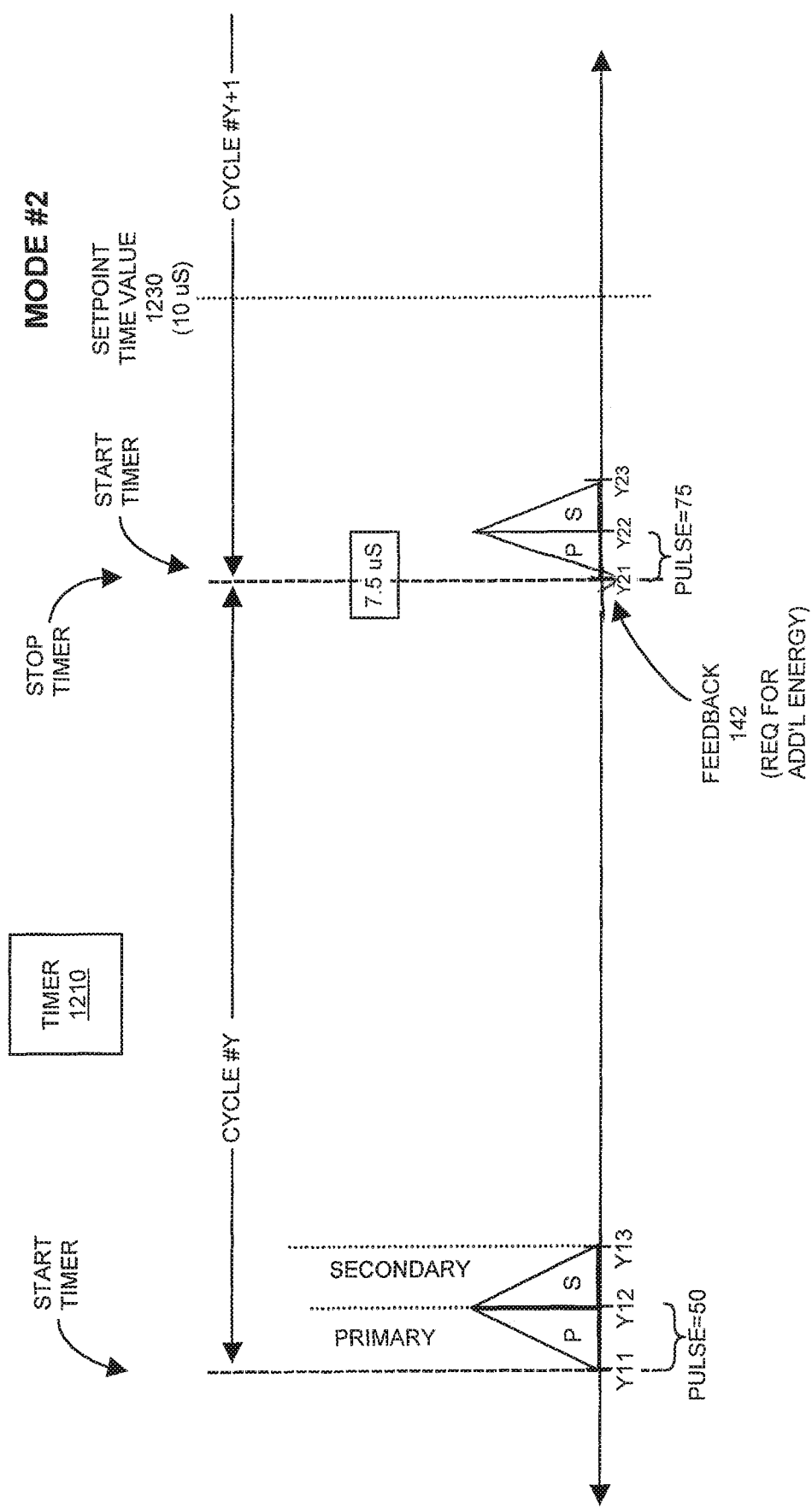
FIGS. 15-19 are example timing diagrams illustrating a second operational mode of varying a frequency of energizing the primary winding based on feedback according to embodiments herein.

As shown in the timing diagram of FIG. 15, and as previously discussed, the primary control circuit 221 includes timer 1210. The primary control circuit 221 starts the timer 1210 at time Y11. Between time Y11 and Y12 (i.e., for a duration of 50 nanoseconds), the primary control circuit 221 activates switch circuitry 231 to energize the primary winding 131. In response to detecting the input of energy into the primary winding 131, the secondary control circuit 222 synchronously receives the energy inputted to the primary winding 131 via activation of the switch circuitry 232 between times Y12 and Y13. The secondary control circuitry 222 delivers the energy to load 118 and/or output capacitor 210.

Further in this example embodiment, the primary control circuit 221 receives feedback 142 around time Y21. The feedback 142 is a request for additional energy.

In response to receiving the feedback 142 indicating that the secondary control circuitry 222 needs more energy to maintain the output voltage 190, the primary control circuit 221 stops the timer 1210 and compares the corresponding time value of 7.5 μs to the setpoint time value 1230 (10 μs). In this example embodiment, in response to detecting that the time 7.5 μs is less than the setpoint time value 1230, the primary control circuit 221 increases the pulse duration of energizing the primary winding 131 on the cycle Y+1 with respect to a magnitude of the pulse duration of energizing the primary winding on the cycle Y. More specifically, in response to receiving the feedback 142 just before time Y21, the primary control circuitry 221 energizes the primary winding 131 between time Y21 and time Y22 (75 nS) to accommodate, for example, an increased consumption of power by load 118.

Figure 16:
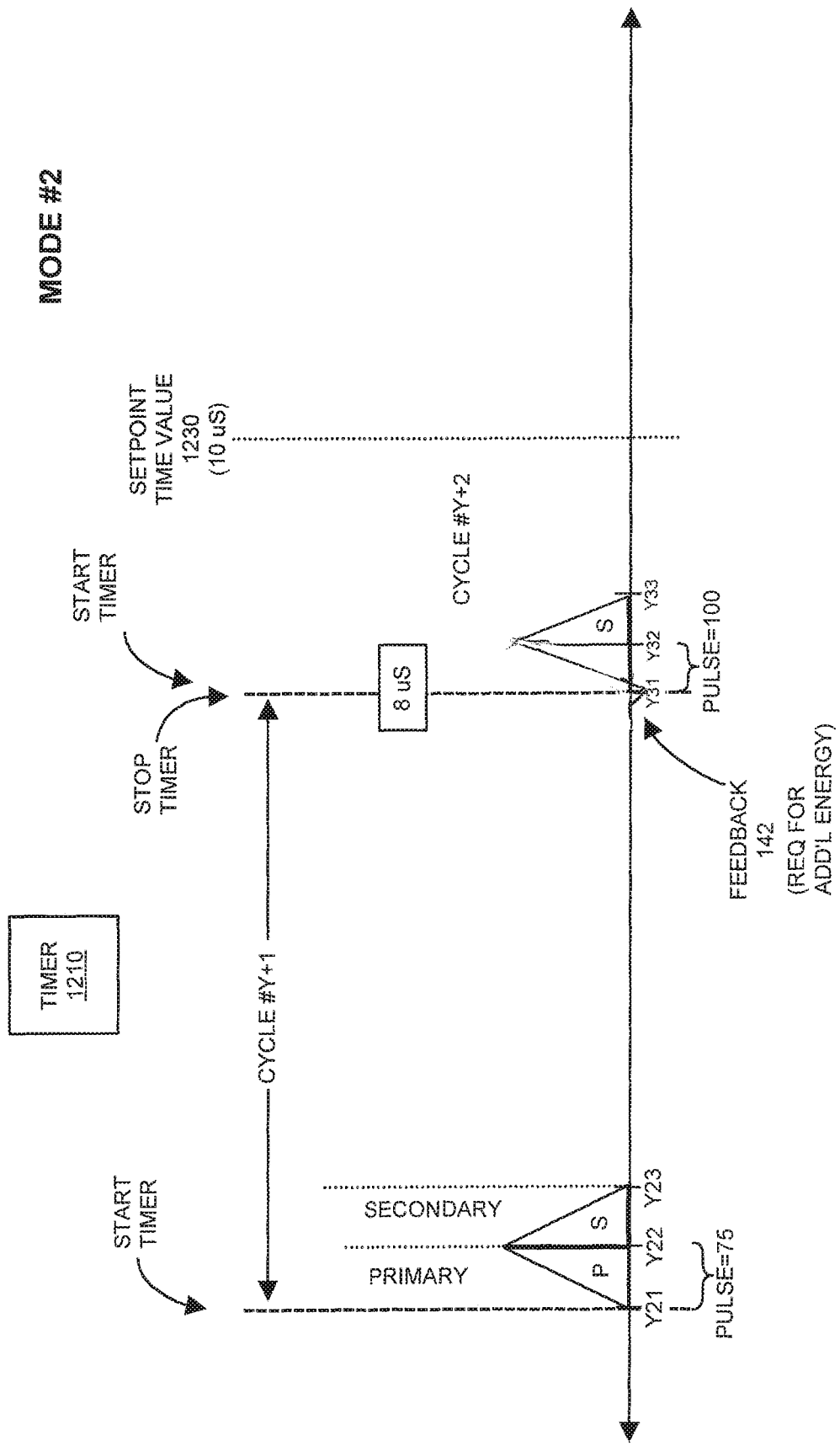

As shown in the timing diagram of FIG. 16, the primary control circuit 221 starts the timer 1210 at time Y21. Between time Y21 and Y22 (i.e., for a duration of 75 nanoseconds), the primary control circuit 221 activates switch circuitry 231 to energize the primary winding 131. In response to detecting the input of energy into the primary winding 131, the secondary control circuit 222 synchronously receives the energy inputted to the primary winding 131 via activation of the switch circuitry 232 between times Y22 and Y23. The secondary control circuitry 222 delivers the energy received through the secondary winding 132 to load 118 and/or output capacitor 210.

Further in this example embodiment, the primary control circuit 221 receives feedback 142 around time Y31. The feedback 142 is a request for additional energy.

In response to receiving the feedback 142 indicating that the secondary control circuitry 222 needs more energy to maintain the output voltage 190, the primary control circuit 221 stops the timer 1210 and compares the corresponding time value of 8.0 μs to the setpoint time value 1230 (10 μs). In this example embodiment, in response to detecting that the time 8.0 μs is still less than the setpoint time value 1230, the primary control circuit 221 increases the pulse duration of energizing the primary winding 131 on the cycle Y+2 with respect to a magnitude of the pulse duration of energizing the primary winding on the cycle Y+1. More specifically, in response to receiving the feedback 142 just before time Y31, the primary control circuitry 221 energizes the primary winding 131 between time Y31 and time Y32 (100 nS) to accommodate, for example, an increased consumption of power by load 118.

In this manner, the primary control circuit 221 can increase a duration of energizing the primary winding 131 cycle over cycle to accommodate power consumption by the dynamic load 118.

In one embodiment, note that the primary control circuit 221 can discontinue increasing a pulse duration of energizing the primary winding 131 and merely operate in a fixed pulse, variable frequency mode. In such an instance, the pulse duration of energizing the primary winding is set or increased to a maximum fixed value. The frequency of operation depends upon the timing of receiving feedback from the secondary control circuit 222 requesting additional energy. This is more particularly shown in FIG. 17.

Figure 17:
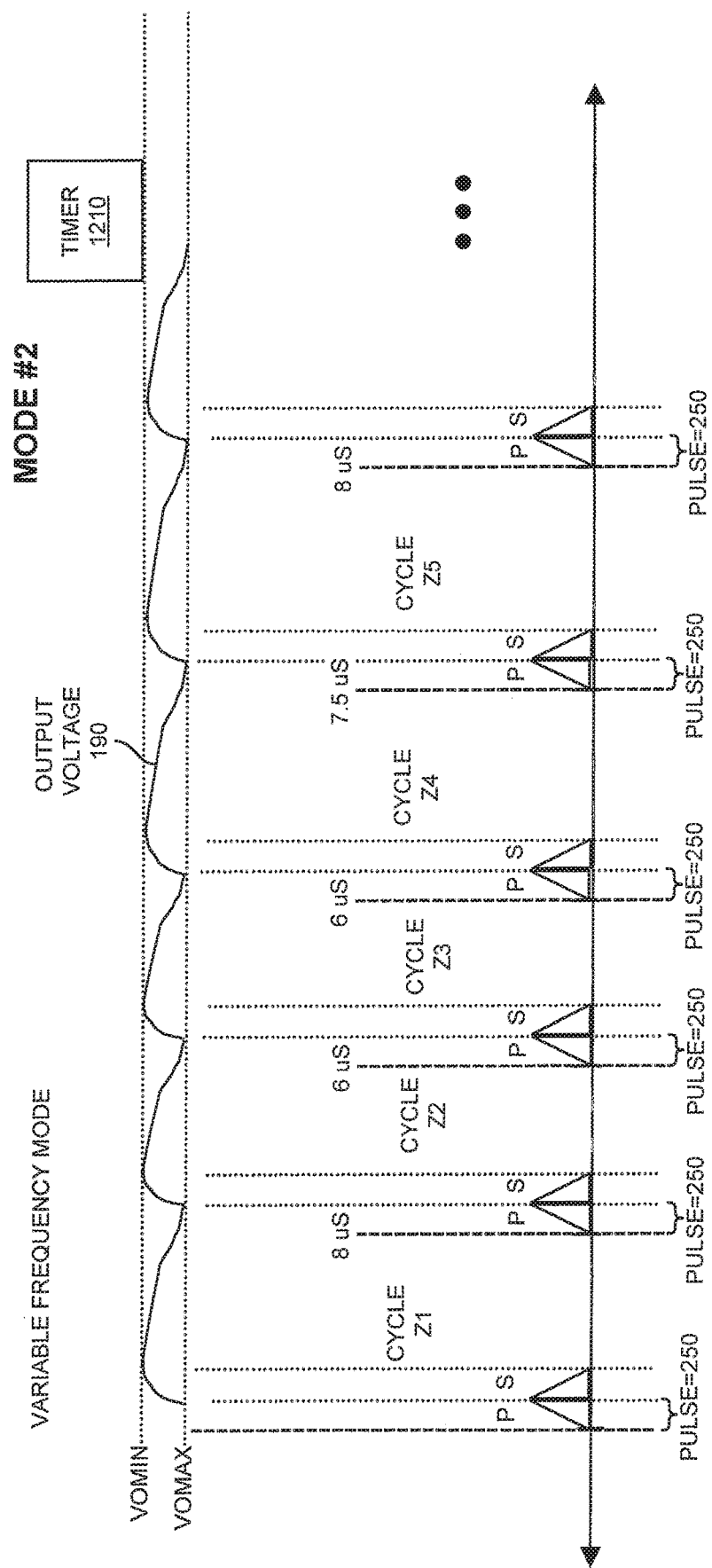

As shown in FIG. 17, for cycle Z1, the primary control circuit 221 activates the primary winding 131 for a duration of 250 ns. The primary control circuit 221 receives a feedback request for more energy through the primary winding 131 at a time of 8 μs after starting the timer 1210 at the beginning of cycle Z1. The secondary control circuit 221 generates the feedback 142 in response to detecting that the magnitude of the output voltage falls below a threshold value or that an error of the output voltage 190 with respect to a reference is greater than a threshold value.

In response to receiving such feedback at the end of cycle Z1 (8 µs later), the primary control circuit 221 immediately activates the primary winding 131 for 250 nanoseconds at the start of cycle Z2.

Subsequent to activating the primary winding 131 at the beginning of cycle Z2, the primary control circuit 221 receives feedback from secondary control circuit 222 for more energy 6 µs after starting the timer 1210 at the beginning of cycle Z2. The secondary control circuit 222 generates the feedback in response to detecting a trigger event such as that the magnitude of the output voltage 190 falls below a threshold value. In response to receiving the feedback at the end of cycle Z2 (6 µs), the primary control circuit 221 immediately activates the primary winding 131 for 250 nanoseconds at the start of cycle Z3.

Subsequent to activating the primary winding 131 at the beginning of cycle Z3, the primary control circuit 221 receives feedback from secondary control circuit 222 for more energy 6 µs after starting the timer 1210 at the beginning of cycle Z3. The secondary control circuit 222 generates the feedback in response to detecting that the magnitude of the output voltage 190 falls below a threshold value. In response to receiving the feedback at the end of cycle Z3 (6 µs), the primary control circuit 221 immediately activates the primary winding 131 for 250 nanoseconds at the start of cycle Z4.

Subsequent to activating the primary winding 131 at the beginning of cycle Z4, the primary control circuit 221 receives feedback from secondary control circuit 222 for more energy 7.5 µs after starting the timer 1210 at the beginning of cycle Z4. In response to receiving the feedback at the end of cycle Z4 (7.5 µs), the primary control circuit 221 immediately activates the primary winding 131 for 250 nanoseconds at the start of cycle Z5.

Subsequent to activating the primary winding 131 at the beginning of cycle Z5, the primary control circuit 221 receives feedback from secondary control circuit 222 for more energy 8 µs after starting the timer 1210 at the beginning of cycle Z5. In response to receiving the feedback at the end of cycle Z5 (8 µs), the primary control circuit 221 immediately activates the primary winding 131 for 250 nanoseconds at the start of cycle Z5.

Accordingly, while in the second mode (variable frequency mode), the primary control circuit 221 can be configured to set a pulse duration of energizing the primary winding 131 to be substantially constant. The primary control circuit 221 varies a frequency of energizing the primary winding 131 over each of the multiple cycles depending on times of receiving the feedback request for additional energy.

Figure 18:
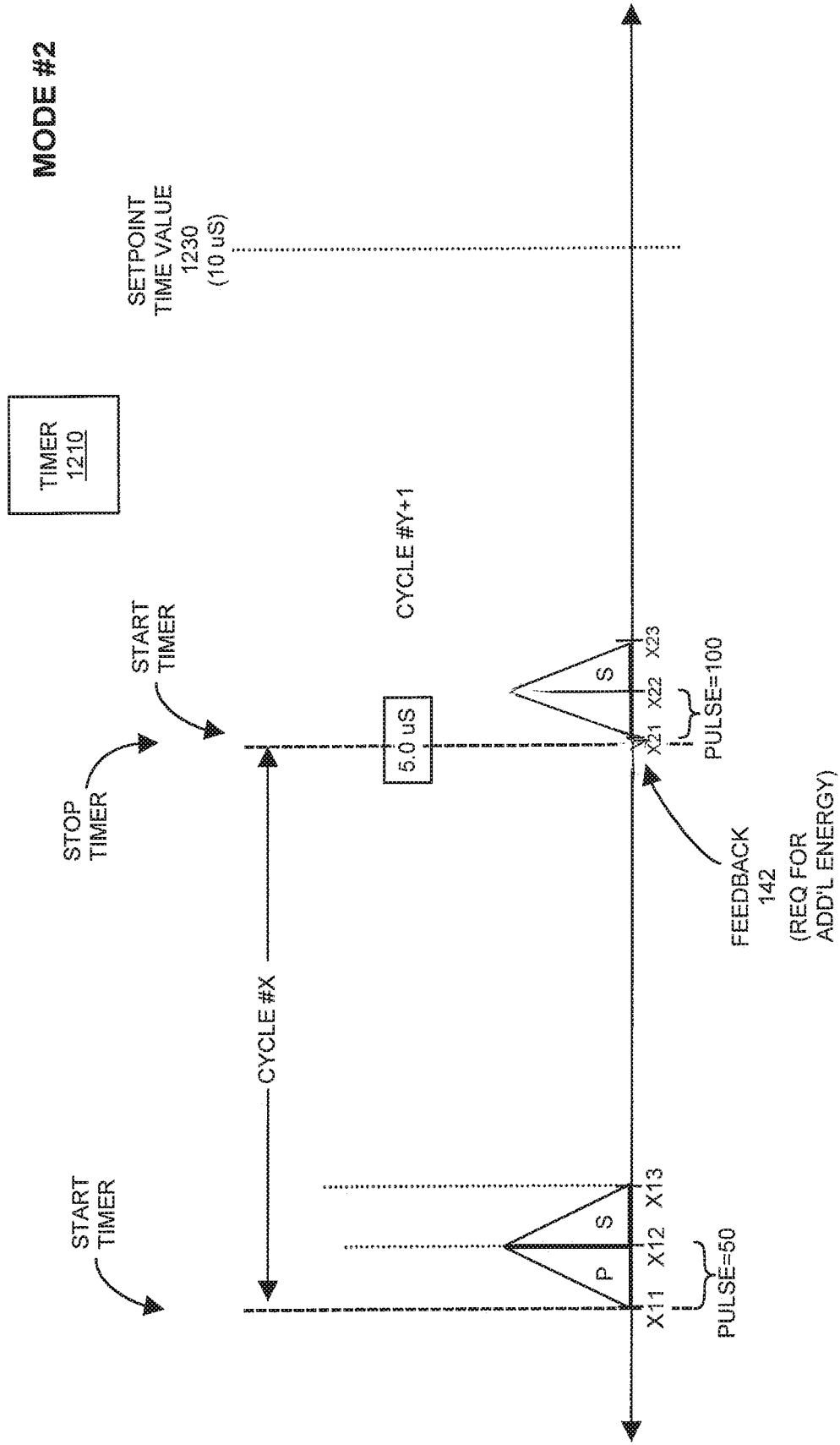

FIG. 18 is an example diagram illustrating modification of a pulse width in response to receiving feedback according to embodiments herein.

In this example embodiment, the secondary control circuit 222 provides feedback early in a respective cycle. In response to detecting the feedback 142 early in the cycle, the primary control circuit 221 substantially increases a pulse duration of activating the primary winding 131 on a subsequent cycle. For example, initially, the primary control circuit 221 sets the ON time of switch circuitry 231 to be 50 nS between time X11 and X12. In response to receiving feedback 142 so early in the cycle (such as at 5 uS instead of 10 uS), the primary control circuit 221 controls a pulse duration of energizing the primary winding 131 to be 100 nS.

Figure 19:
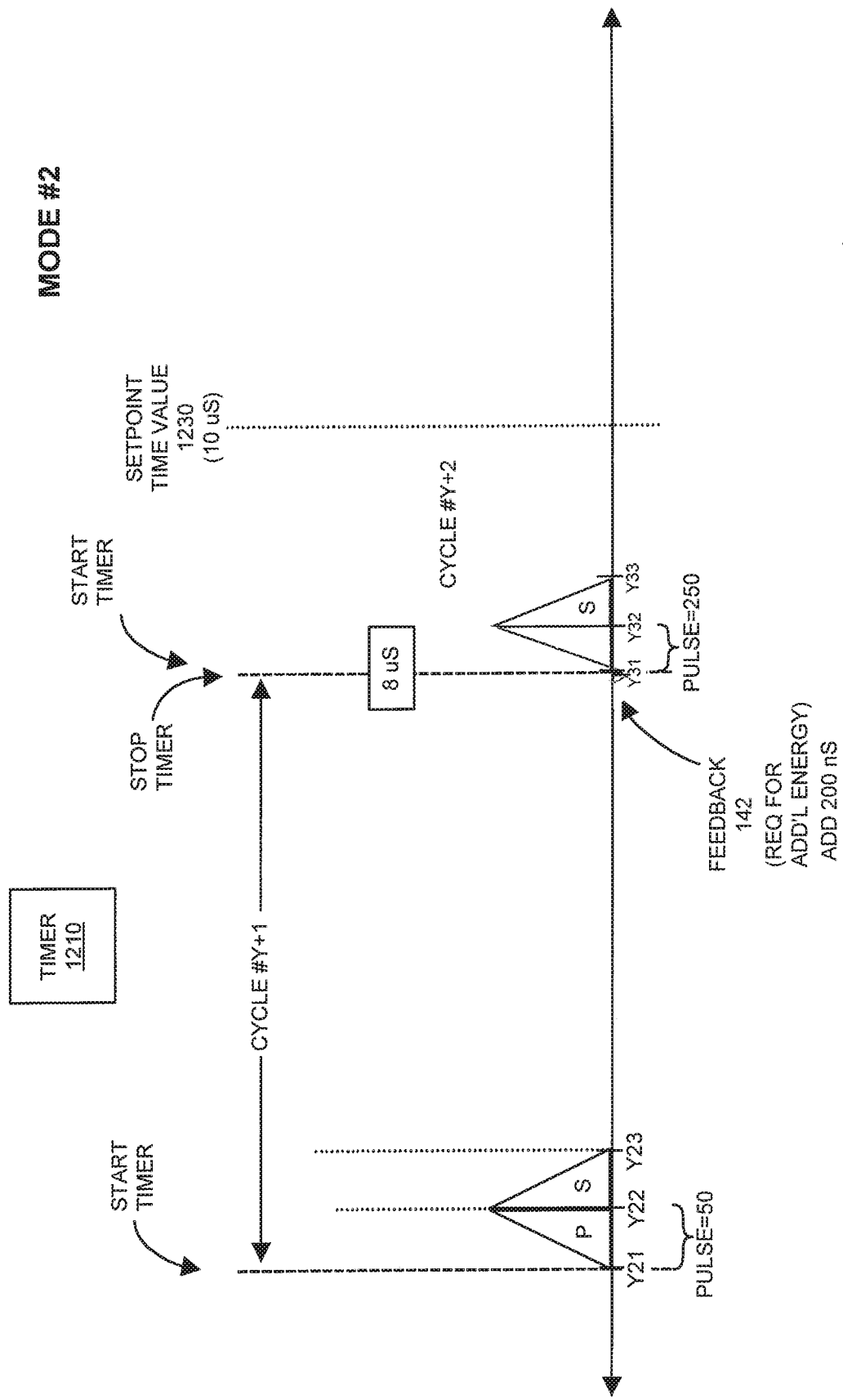

FIG. 19 is an example diagram illustrating modification of a pulse width in response to receiving feedback according to embodiments herein.

In this example embodiment, the secondary control circuit 222 provides feedback 142 including state information indicating one of multiple levels detected by the secondary control circuit 222. The feedback 142 can indicate any suitable information such as a magnitude of an error between the output voltage 190 and a reference voltage, an amount by which to increase a pulse duration of activating the primary winding 131, etc.

In response to receiving the feedback 142, and in accordance with the feedback 142, the primary control circuit 221 modifies the pulse duration for a subsequent cycle. For example, initially, the primary control circuit 221 sets the ON time of switch circuitry 231 to be 50 nS between time Y21 and Y22. In response to receiving feedback 142, and assuming that the feedback 142 indicates to add 200 nS to the pulse duration over a prior cycles pulse duration, the primary control circuit 221 adds 200 nS to 50 nS to set the pulse duration between Y31 and Y32 to be 250 nS.

Figure 20:
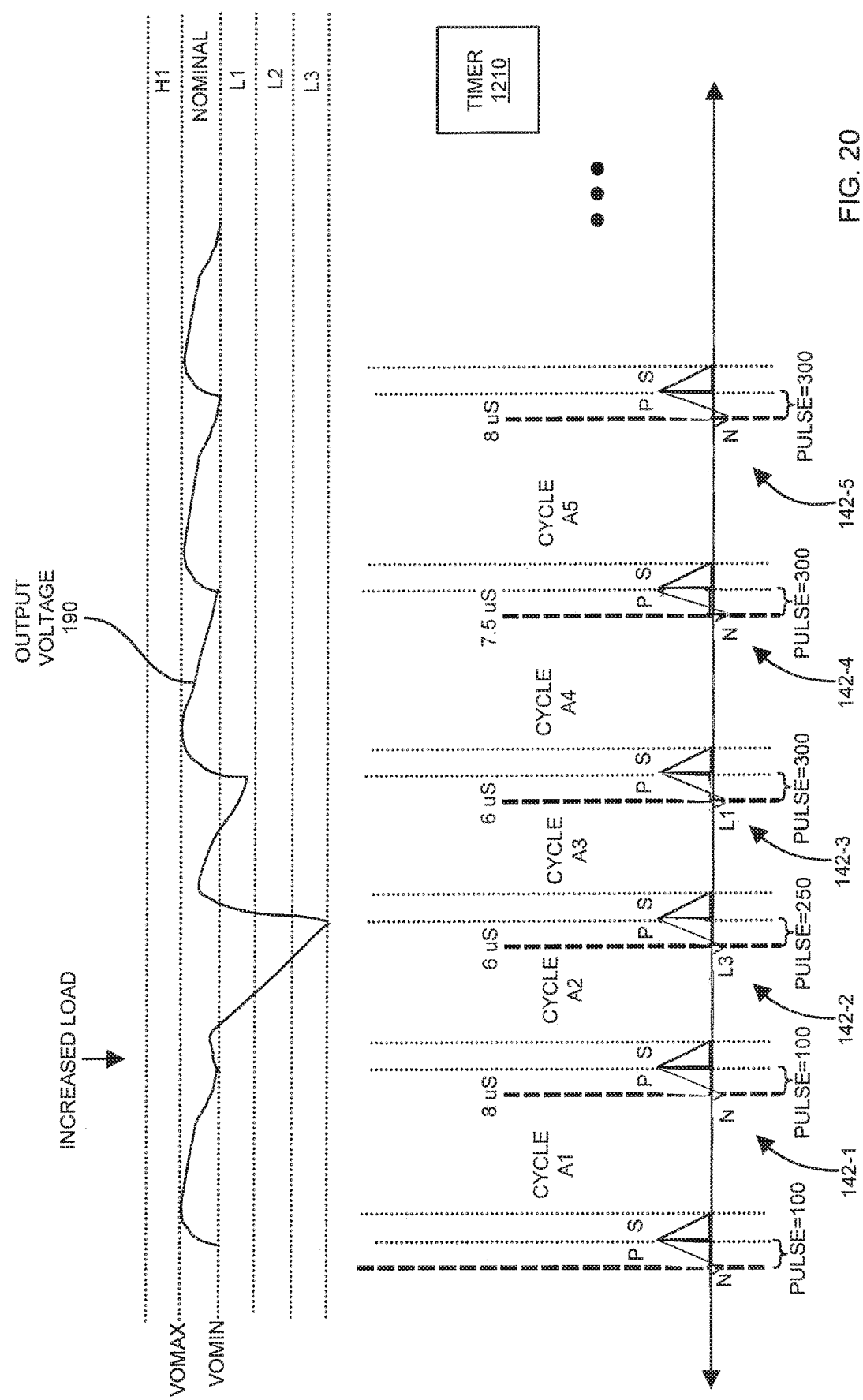

FIG. 20 is an example diagram illustrating use of multi-state feedback to control an output voltage according to embodiments herein.

In this example embodiment, the secondary control circuit 222 generates the feedback 142 to include state information (such as H3, H2, H1, N, L1, L2, or L3). In other words, for each respective cycle, the feedback 142 indicates a particular state selected amongst multiple possible states (such as H3, H2, H1, N, L1, L2, or L3); each of the states indicates a degree to which a measured magnitude of the output voltage 190 differs from a desired setpoint reference voltage.

As shown, in cycle A1, based on monitoring the output voltage 190, the secondary control circuit 222 generates feedback 142-1. Because the secondary control circuit 222 detects that the voltage falls within the nominal range at a respective sample time, the secondary control circuit 222 produces the feedback 142-1 to include state information N(ominal). This notifies the primary control circuit 221 to activate the primary winding 131 on cycle A2 using the same pulse width as a prior cycle. There is no need to increase the pulse width because the voltage is within the nominal range. Based on the received feedback 142-1, at the beginning of cycle A2, the primary control circuit 221 activates the primary winding 131 for 100 ns.

In cycle A2, based on monitoring the output voltage 190, the secondary control circuit 222 generates feedback 142-2. Because the secondary control circuit 222 detects that the voltage falls within the L3 range at a time of sampling (meaning that the magnitude of the output voltage 190 is very low due to a transient load condition), the secondary control circuit 222 produces the feedback 142-2 to include state information L3, notifying the primary control circuit to (that the magnitude of the output voltage 190 is too low and to) increase a pulse width of activating the primary winding 131 with respect to the previous cycle. The secondary control circuit 222 inputs the feedback 142-2 into the secondary winding 132 for receipt by the primary control circuit 221 over the primary winding 131.

In one embodiment, the primary control circuit 221 maps the state information L3 to a suitable adjustment value of 150 nS. Based on the received feedback 142-2, at the beginning of subsequent cycle A3, the primary control circuit 221 activates the primary winding 131 for and additional 150 nS over the prior cycle. In other words, the primary control circuit 221 activates the primary winding 135 for 250 nanoseconds at the beginning of cycle A3. This increased amount of energy inputted to the primary winding 131 at the beginning of cycle A3 helps to increase the magnitude of the output voltage 190 back to or near the nominal range.

In cycle A3, based on monitoring the output voltage 190, the secondary control circuit 222 generates feedback 142-3. Because the secondary control circuit 222 detects that the voltage falls within the L1 range at a time of sampling (meaning that the magnitude of the output voltage 190 is still low due to the transient load condition), the secondary control circuit 222 produces the feedback 142-3 to include state information L1, notifying the primary control circuit 221 to increase a pulse width of activating the primary winding 131 with respect to the previous cycle. The secondary control circuit 222 inputs the feedback 142-3 into the secondary winding 132 for receipt by the primary control circuit 221 over the primary winding 131.

In accordance with further embodiments, the primary control circuit 221 maps the state information L1 to a suitable adjustment value such as 50 nS. Based on the received feedback 142-3, at the beginning of cycle A4, the primary control circuit 221 activates the primary winding 131 for an additional 50 nS over the prior cycle. In other words, the primary control circuit 221 activates the primary winding 135 for 300 nanoseconds at the beginning of cycle A4. This increased amount of energy inputted to the primary winding 131 at the beginning of cycle A4 helps to increase the magnitude of the output voltage 190 back to or near the nominal range.

Further in cycle A4, based on monitoring the output voltage 190, the secondary control circuit 222 generates feedback 142-4. Because the secondary control circuit 222 detects that the voltage falls within the nominal range again, the secondary control circuit 222 produces the feedback 142-4 to include state information N(ominal), notifying the primary control circuit 221 to activate the primary winding 131 using the same pulse width as a prior cycle. In this instance, there is no need to increase the pulse width because the voltage is within the nominal range. Based on the received feedback 142-4, at the beginning of cycle A5, the primary control circuit 221 activates the primary winding 131 for 300 ns (no change from the last cycle).

In this manner, the multi-state information can be conveyed as feedback over the respective secondary winding 130 to the primary winding 131 to notify the primary control circuit 221 how to control a pulse width of activating the primary winding 131 on a subsequent cycle.

FIG. 21 is an example diagram illustrating use of multi-state feedback to control an output voltage according to embodiments herein.

In this example embodiment, the secondary control circuit 222 generates the feedback 142 to include state information (such as H3, H2, H1, N, L1, L2, or L3). In other words, for each respective cycle, the feedback 142 indicates a particular state selected amongst multiple possible states (such as H3, H2, H1, N, L1, L2, or L3); each of the states indicates a degree to which a measured magnitude of the output voltage 190 differs from a desired setpoint reference voltage.

As shown, in cycle B1, based on monitoring the output voltage 190, the secondary control circuit 222 generates feedback 142-1. Because the secondary control circuit 222 detects that the voltage falls within the nominal range at a respective sample time, the secondary control circuit 222 produces the feedback 142-1 to include state information N(ominal). This notifies the primary control circuit 221 to activate the primary winding 131 on cycle B2 using the same pulse width as a prior cycle. There is no need to increase the pulse width because the voltage is within the nominal range. Based on the received feedback 142-1, at the beginning of cycle B2, the primary control circuit 221 activates the primary winding 131 for 100 ns.

In cycle B2, based on monitoring the output voltage 190, the secondary control circuit 222 generates feedback 142-2. Because the secondary control circuit 222 detects that the voltage falls within the H3 range at a time of sampling (meaning that the magnitude of the output voltage 190 is very high due to a transient load condition), the secondary control circuit 222 produces the feedback 142-2 to include state information H3, notifying the primary control circuit to (that the magnitude of the output voltage 190 is too low and to) decrease a pulse width of activating the primary winding 131 with respect to the previous cycle. The secondary control circuit 222 inputs the feedback 142-2 into the secondary winding 132 for receipt by the primary control circuit 221 over the primary winding 131.

In one embodiment, the primary control circuit 221 maps the state information H3 to a suitable adjustment value of −150 nS. Based on the received feedback 142-2, at the beginning of subsequent cycle B3, the primary control circuit 221 activates the primary winding 131 for 150 nS less time over the prior cycle. In other words, the primary control circuit 221 activates the primary winding 135 for 150 nanoseconds at the beginning of cycle B3. This decreased amount of energy inputted to the primary winding 131 at the beginning of cycle B3 helps to increase the magnitude of the output voltage 190 back to or near the nominal range.

In cycle B3, based on monitoring the output voltage 190, the secondary control circuit 222 generates feedback 142-3. Because the secondary control circuit 222 detects that the voltage falls within the H1 range at a time of sampling (meaning that the magnitude of the output voltage 190 is still high due to the transient load condition), the secondary control circuit 222 produces the feedback 142-3 to include state information H1, notifying the primary control circuit 221 to increase a pulse width of activating the primary winding 131 with respect to the previous cycle. The secondary control circuit 222 inputs the feedback 142-3 into the secondary winding 132 for receipt by the primary control circuit 221 over the primary winding 131.

In accordance with further embodiments, the primary control circuit 221 maps the state information H1 to a suitable adjustment value such as −50 nS. Based on the received feedback 142-3, at the beginning of cycle B4, the primary control circuit 221 activates the primary winding 131 for 50 nS less than over the prior cycle. In other words, the primary control circuit 221 activates the primary winding 135 for 100 nanoseconds at the beginning of cycle B4. This decreased amount of energy inputted to the primary winding 131 at the beginning of cycle B4 helps to decrease the magnitude of the output voltage 190 back to or near the nominal range.

Further in cycle B4, based on monitoring the output voltage 190, the secondary control circuit 222 generates feedback 142-4. Because the secondary control circuit 222 detects that the output voltage 190 falls within the nominal range again, the secondary control circuit 222 produces the feedback 142-4 to include state information N(ominal), notifying the primary control circuit 221 to activate the primary winding 131 using the same pulse width as a prior cycle. In this instance, there is no need to adjust the pulse width because the voltage is within the nominal range. Based on the received feedback 142-4, at the beginning of cycle B5, the primary control circuit 221 activates the primary winding 131 for 100 ns (no change from the last cycle).

In this manner, the multi-state information can be conveyed as feedback over the respective secondary winding 130 to the primary winding 131 to notify the primary control circuit 221 how to control a pulse width of activating the primary winding 131 on a subsequent cycle.

Accordingly, the use of different levels of state information in the feedback 142 serves to provide a fast loop in which to modify the pulse duration to the appropriate value. In one embodiment, smaller modifications to the pulse duration over time (as previously discussed) based on comparison of the actual frequency 1108 to a desired frequency 1120 is a slower loop, that also makes adjustments to the pulse duration cycle after cycle to maintain the output voltage 190.

Figure 22:
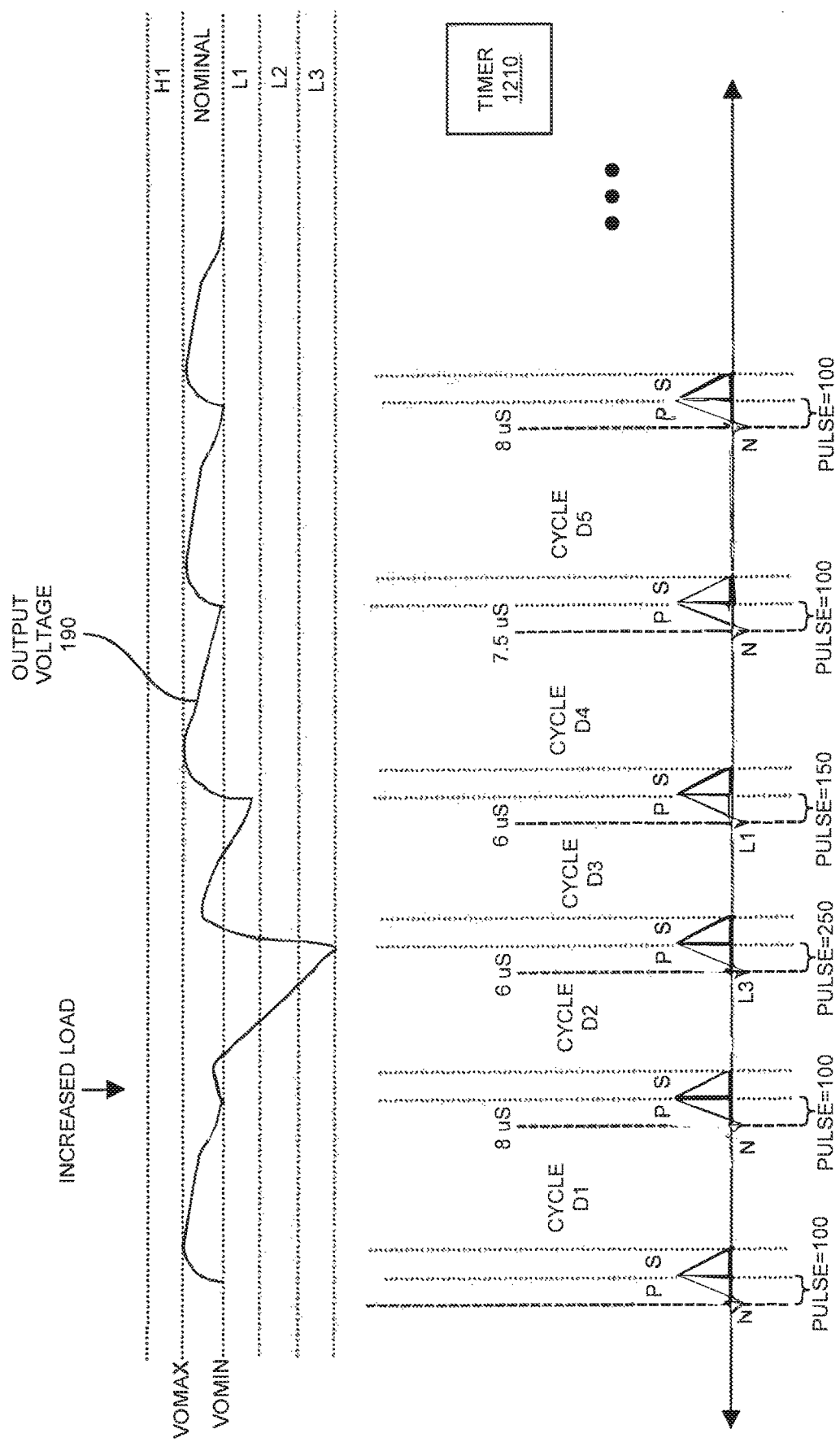

FIG. 22 is an example diagram illustrating of using multi-state feedback according to embodiments herein.

In this example embodiment, similar to as discussed above for FIGS. 20 and 21, the primary control circuit 221 receives level information in respective feedback 142. However, in this embodiment, the primary control circuit 221 uses the feedback to temporarily adjust the pulse duration of energizing the primary winding 131.

For example, in response to receiving state information L3 at the end of cycle D2, the primary control circuit 221 temporarily increases the pulse by a corresponding time duration of 150 nS. Accordingly, at the beginning of cycle D3, the primary control circuit 221 activates switch circuitry 231 for an additional 150 nS with respect to the last cycle. In other words, the primary control circuit 221 energizes the primary winding 131 for 250 nS.

In the following cycle Z3, in response to receiving state information L1 at the end of cycle D3, the primary control circuit 221 temporarily increases the pulse by a corresponding time duration of 50 nS. Accordingly, at the beginning of cycle D4, the primary control circuit 221 activates switch circuitry 231 for an additional 50 nS with respect to the original pulse time of power converter circuit 100 nS. In other words, the primary control circuit 221 energizes the primary winding 131 for 150 nS.

In the following cycle D4, in response to receiving state information N at the end of cycle Z4, the primary control circuit 221 makes no changes to the pulse duration f power converter circuit 100 nS. Accordingly, at the beginning of cycle D5, the primary control circuit 221 activates switch circuitry 231 for power converter circuit 100 nS.

Accordingly, the level information received in the feedback 142 can be used to indicate a temporary amount to modify the pulse durations of energizing the primary winding 131. As previously discussed, note that the slow loop adjustments continue to operate in a background to modify the rate and/or duration of energizing the primary winding 135.

Functionality supported by the different resources will now be discussed via flowcharts in FIGS. 23-26. Note that the steps in the flowcharts below can be executed in any suitable order.

Figure 23:
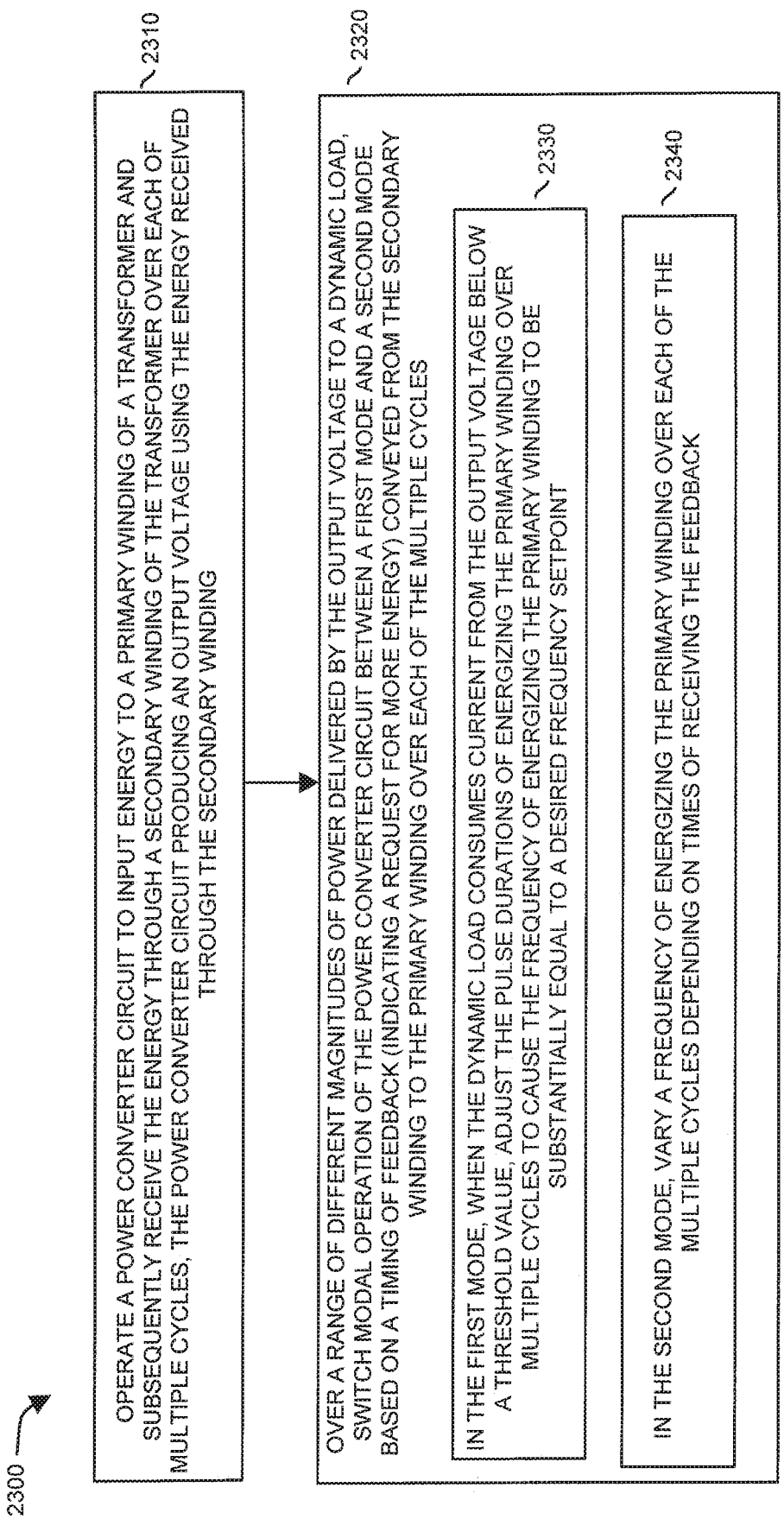
FIGS. 23-26 are example diagrams illustrating methods according to embodiments herein.

FIG. 23 is a flowchart 2300 illustrating an example method according to embodiments. Note that there will be some overlap with respect to concepts as discussed above.

In processing operation 2310, the primary circuit 121 operates power converter circuit 100 to input energy to primary winding 131 of a transformer circuitry 130 and subsequently receive the energy through a secondary winding 132 of the transformer circuitry 130 over each of multiple cycles. The power converter circuit 100 produces an output voltage 190 using the energy received through the secondary winding 132.

In processing operation 2320, over a range of different magnitudes of power delivered by the output voltage 190 to a dynamic load 118, the power converter circuit 100 switches modal operation between a first mode and a second mode based on a timing of receiving feedback 142 (indicating a request for more energy) conveyed from the secondary winding 132 to the primary winding 131 over each of multiple cycles.

In sub-processing operation 2330, in the first mode, when the dynamic load consumes current from the output voltage 190 below a threshold value, the primary circuit 121 adjusts the pulse durations of energizing the primary winding 131 over multiple cycles to cause the frequency of energizing the primary winding 131 to be substantially equal to a desired frequency setpoint.

In sub-processing operation 2340, in the second mode, the primary circuit 121 varies a frequency of energizing the primary winding 131 over each of the multiple cycles depending on times of receiving the feedback 142.

Figure 24:
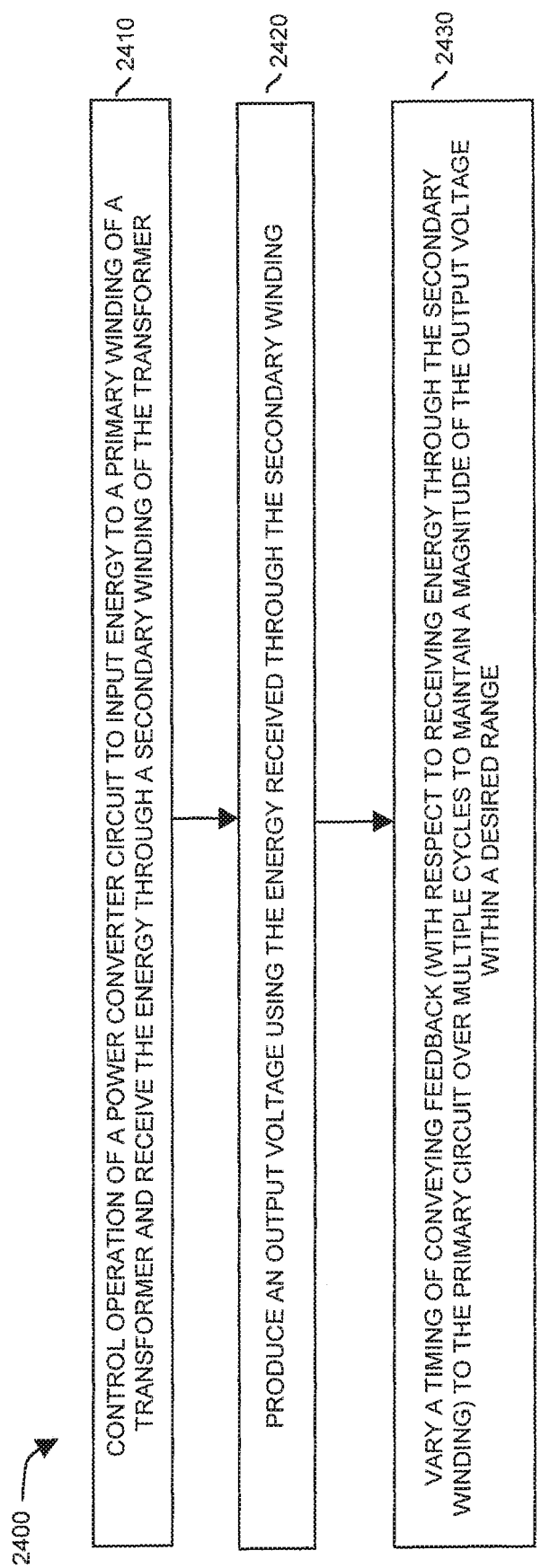

FIG. 24 is a flowchart 2400 illustrating an example method according to embodiments herein. Note that there will be some overlap with respect to concepts as discussed above.

In processing operation 2410, the primary circuit 121 controls input of energy to a primary winding 131 of the transformer circuitry 130. The secondary circuit 122 controls receipt of energy through the secondary winding 132 of the transformer circuitry 130.

In processing operation 2420, the primary circuit 121 produces an output voltage 190 using the energy received through the secondary winding 132.

In processing operation 2430, the secondary circuit 121 varies a timing of conveying feedback 142 (with respect to times of receiving energy through the secondary winding 132) to the primary circuit 121 over multiple cycles to maintain a magnitude of the output voltage 190 within a desired range.

Figure 25:
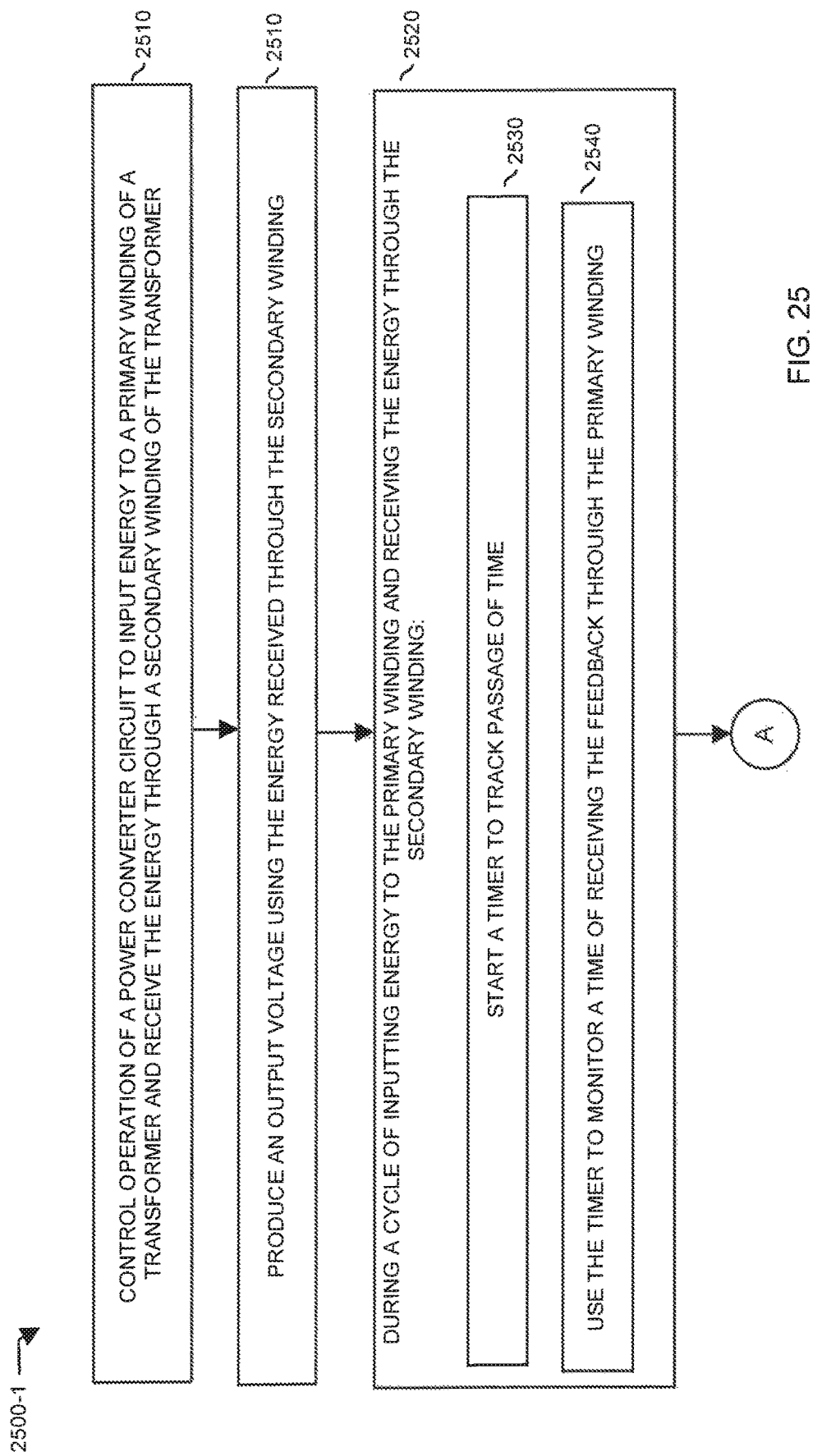
Figure 26:
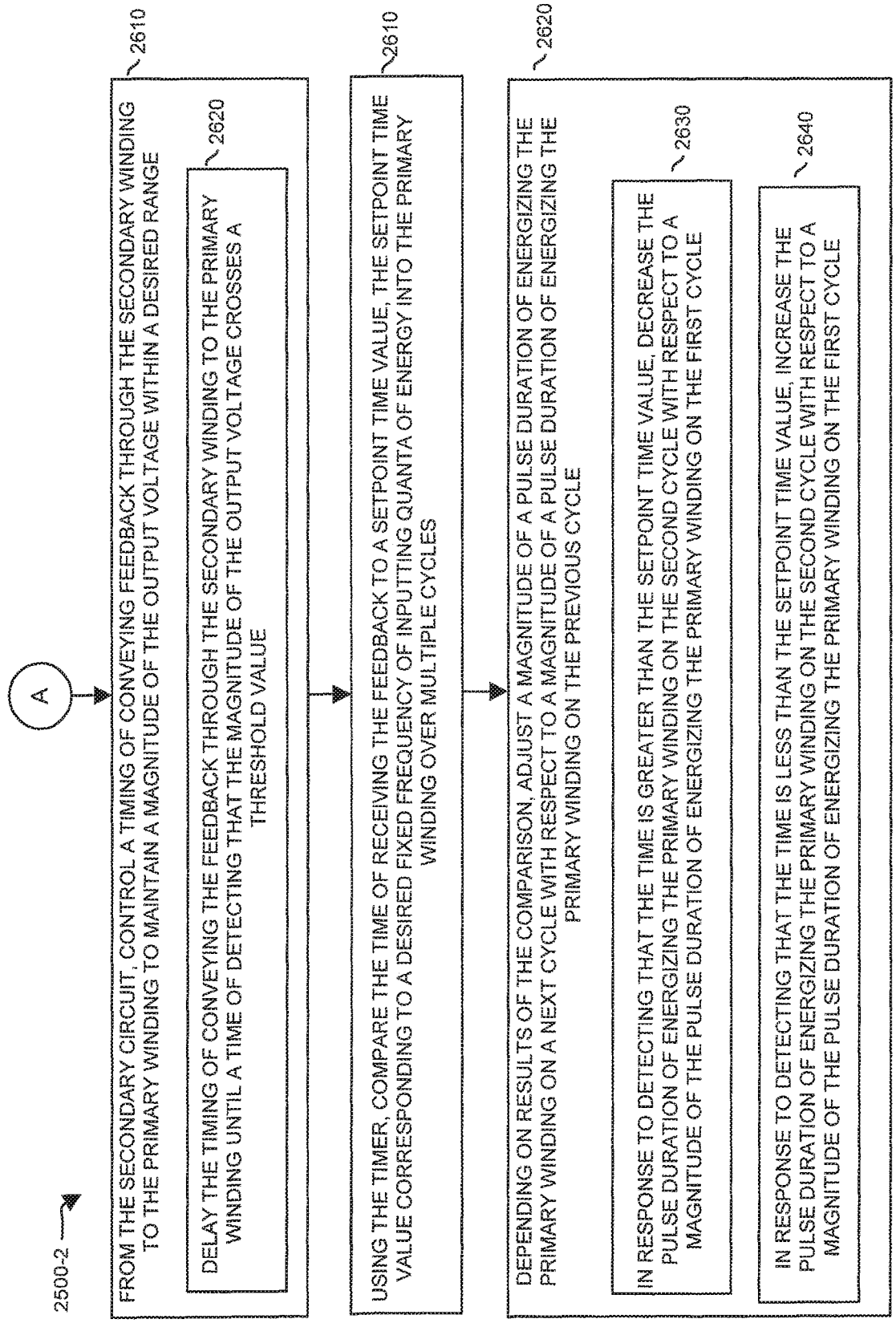

FIGS. 25 and 26 combine to form a flowchart 2500 (e.g., 2500-1 and 2500-2) illustrating an example method according to embodiments. Note that there will be some overlap with respect to concepts as discussed above.

In processing operation 2510 of FIG. 25, the primary circuit 121 controls input of energy to the primary winding 131 of a transformer circuitry 130. The secondary circuit 122 controls receipt of energy through the secondary winding 132 of the transformer circuitry 130.

In processing operation 2520, the secondary circuit 122 produces an output voltage 190 using the energy received through the secondary winding 132.

In processing operation 2530, during a cycle of inputting energy to the primary winding and receiving the energy through the secondary winding: i) the primary circuit 121 starts a timer to track passage of time in operation 1540, ii) the primary circuit 121 uses the timer to monitor a time of receiving the feedback 142 through the primary winding 131 in sub-operation 2550.

In processing operation 2610 of FIG. 26, the secondary circuit 122 controls a timing of conveying feedback 142 through the secondary winding 132 to the primary winding 131 to maintain a magnitude of the output voltage 190 within a desired range. In one embodiment, in processing operation 1620, the secondary circuit 122 delays a timing of conveying the feedback 142 through the secondary winding 132 to the primary winding 131 until a time of detecting that the magnitude of the output voltage 190 crosses (such as falls below) a threshold value.

In processing operation 2630, using the timer, the primary circuit 121 compares the time of receiving the feedback 142 to a setpoint time value. The setpoint time value corresponds to a desired fixed frequency of inputting quanta of energy into the primary winding over multiple cycles.

In processing operation 2640, depending on results of the comparison, the primary circuit 121 adjusts a magnitude of a pulse duration of energizing the primary winding 131 on a next cycle with respect to a magnitude of a pulse duration of energizing the primary winding 131 on the previous cycle.

In sub-processing operation 2650, in response to detecting that the time is greater than the setpoint time value, the primary circuit 121 decreases the pulse duration of energizing the primary winding 131 on the second cycle with respect to a magnitude of the pulse duration of energizing the primary winding 131 on the first cycle.

In processing operation 2660, in response to detecting that the time is less than the setpoint time value, the primary circuit 121 increases the pulse duration of energizing the primary winding 131 on the second cycle with respect to a magnitude of the pulse duration of energizing the primary winding 131 on the first cycle.

Figure 27:
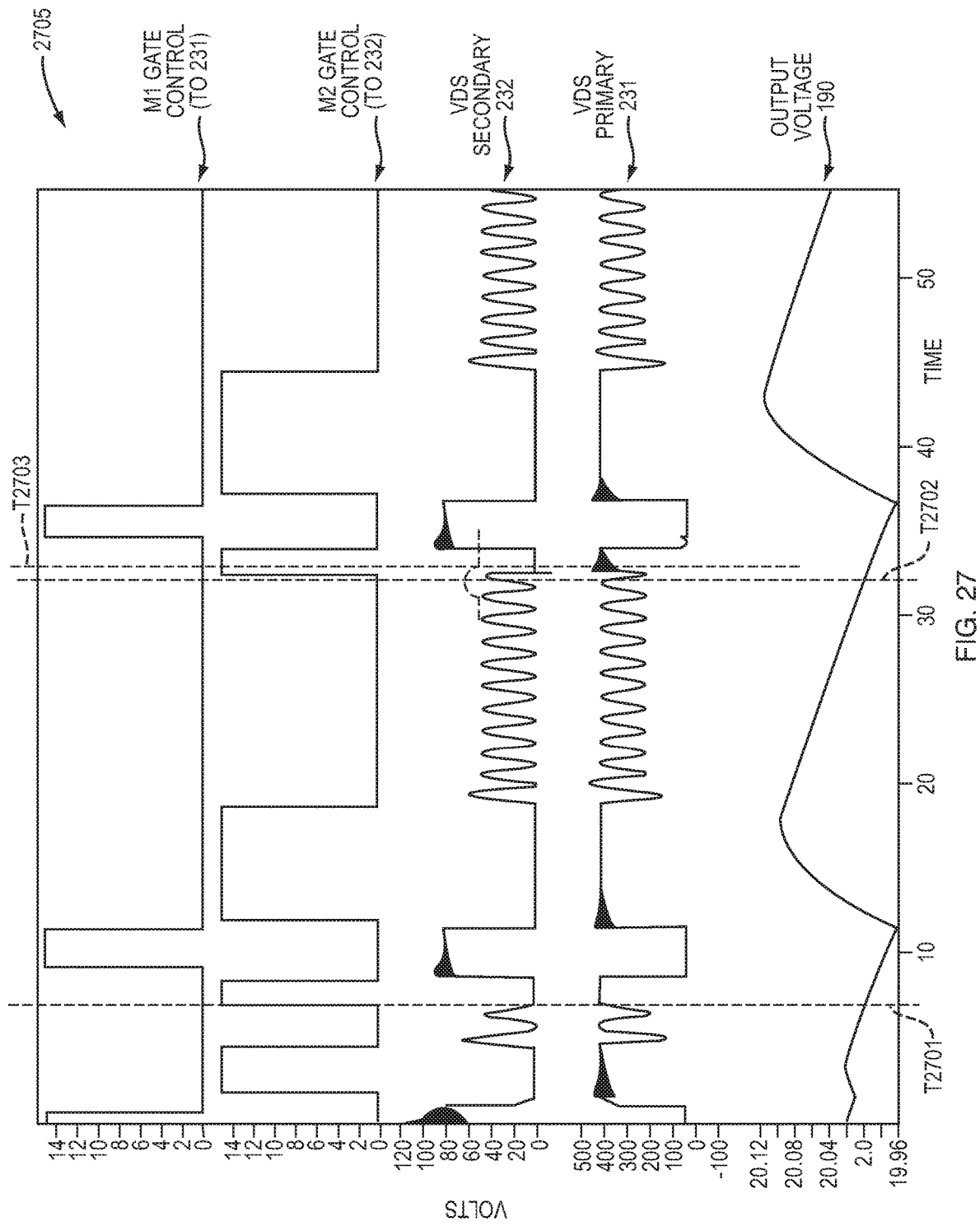
FIG. 27 is an example timing diagram illustrating control of providing feedback through the secondary winding to the primary winding according to embodiments herein.

FIG. 27 is an example timing diagram illustrating control of providing feedback through the secondary winding to the primary winding according to embodiments herein.

As shown in timing diagram 2705, further embodiments herein can include implementing QZVS (Quasi Zero Voltage Switching) or ZVS (Zero Voltage Switching) in the secondary circuit 122 when providing feedback to the primary controller 221.

For example, as previously discussed, the secondary controller 222 controls switch circuitry 132 to convey communications (via a request pulse through the secondary winding 132 and, consequently, the primary winding 131) to the primary controller 221. The feedback can include any suitable information. In one embodiment, the feedback indicates the secondary controller 222 needs more energy to maintain the output voltage 190 within regulation.

As shown in timing diagram 2705, at time T2702, the secondary controller 222 can initiate activation of switch circuitry 232 to communicate with the primary controller 221. If the time of activating the switch circuitry 232 is random, at time T2701, the respective voltage of the drain node of switch circuitry 232 may be substantially greater than 10 Volts. In such an instance, this results in extra unnecessary power consumption over time. In other words, activating the switch circuitry 232 to an ON state when the voltage of the drain node is substantially above 5-10 volts to provide feedback causes the switch circuitry 232 to consume this energy.

To provide better efficiency, embodiments herein include adding a resource such as comparator 2710 to the secondary circuit 122 to monitor the voltage (i.e., voltage VDS) at the drain node across the switch circuitry 232. In one embodiment, when the voltage VDS is below a respective chosen threshold value, for instance 3 or 7 volts, and the secondary controller 222 needs to generate feedback such as to request more power in the forward direction from primary winding 131 to secondary winding 132, the secondary controller 222 activates switch circuitry 232 to create the request pulse (feedback) at the appropriate time. Note that if the voltage VDS is above the threshold value, the controller circuitry 222 can be configured to delay when the request pulse is generated. In other words, in accordance with yet further embodiments, as previously discussed, it is possible that the voltage at the drain node of the switch circuitry 232 is above the comparator threshold voltage value when (such as at time T2702) the secondary controller 222 attempts to communicate the feedback to the primary controller 221. In such an instance, the secondary controller 222 can be configured to delay timing of conveying the feedback through the secondary winding 132 to the primary winding 131 until a time (such as until time T2703) which corresponds to detecting that the magnitude of the monitored voltage (such as VDS of switch circuitry 232) is below a threshold value. Thus, the comparator 2710 can be used to determine an appropriate time to activate switch circuitry 232 to an ON state to provide feedback.

Note that the delay of activating the switch circuitry 232 to create the corresponding feedback may be substantially shorter when the load 118 consumes a higher amount of current. Conversely, the delay of activating the switch circuitry 232 to create corresponding feedback may be substantially longer when the load 118 consumes less current.

In accordance with further embodiments, the operations of communicating the feedback through the secondary winding 132 to the primary winding 131 can include: comparing a voltage level of a node of the secondary winding 132 (such as the node of the secondary winding 132 connected to the drain node of the switch circuitry 232) to a threshold value; and controlling timing of conveying the feedback through the secondary winding 132 to the primary winding 131 to occur when the voltage level of the node of the secondary winding is below the threshold value (such as a threshold value setting of between 0-7 volts). In this manner, embodiments herein include ZVS operation and/or quasi-ZVS operation when communicating feedback in a reverse direction through transformer circuitry 130 back to the primary controller 221.

Figure 28:
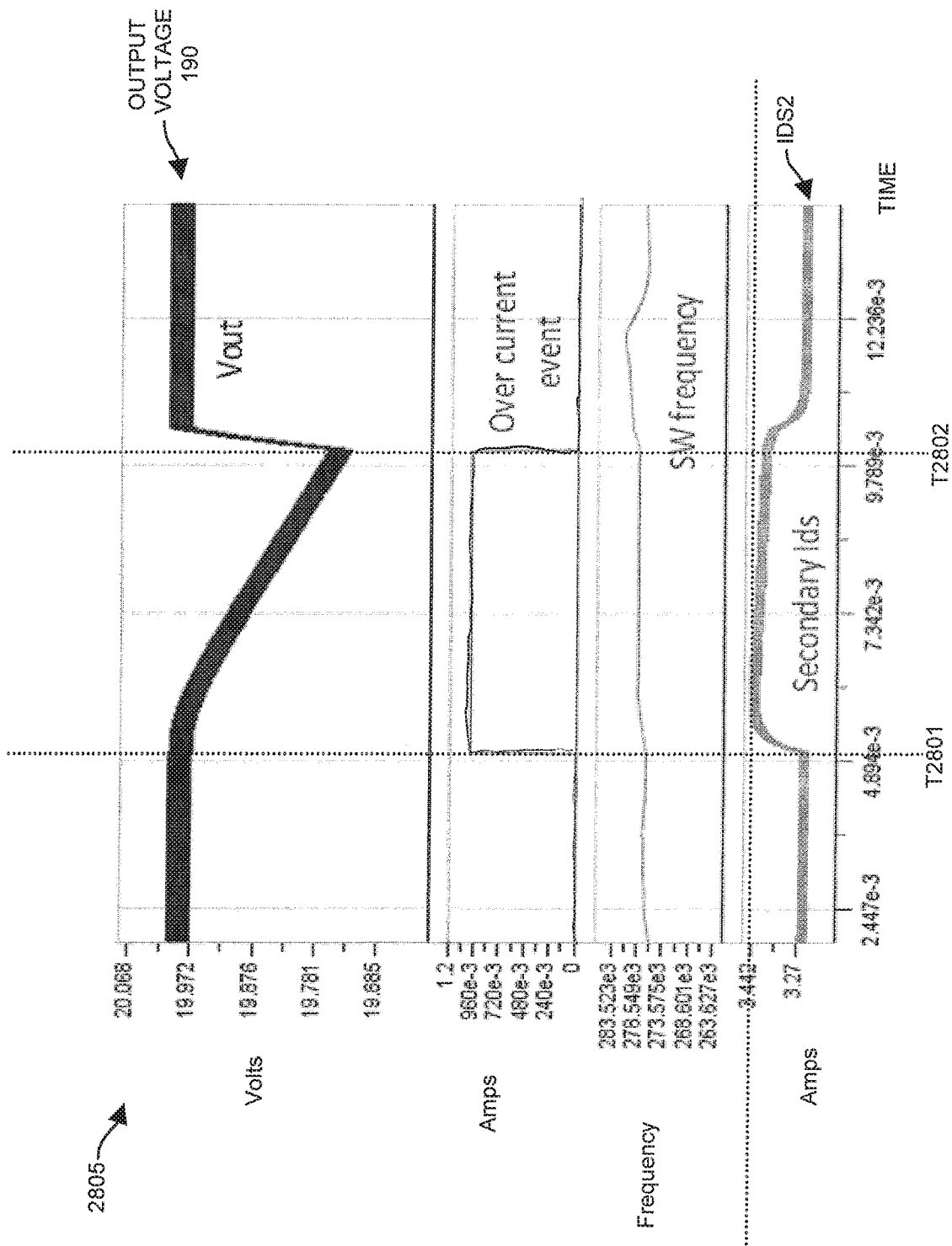
FIG. 28 is an example timing diagram illustrating overcurrent control according to embodiments herein.

FIG. 28 is a timing diagram illustrating overcurrent protection provided by the power converter circuit 100 according to embodiments herein.

As previously discussed, FIGS. 11-26 and corresponding text discuss variable ON-time control via power converter circuit 100 to provide different feedback through the windings of the transformer circuitry 130 back to the primary controller 221.

In accordance with further embodiments herein, the primary controller 221 is configured to limit how much power is conveyed from the primary winding 131 to the secondary winding 132. Limiting a rate of forwarding energy through the primary winding 131 to the secondary winding 132 to produce the output voltage 190 prevents damage to the power converter circuit 100 and potentially prevents damage to the load 118.

In this example embodiment, at time T2801 of timing diagram 2805, assume that an overcurrent event occurs during which the load 118 (or other entity) consumes more power than the primary controller 221 is able to convey from the primary winding 131 through the secondary winding 132. In such an instance, when operating at maximum load, as previously discussed with respect to FIG. 12, the power converter circuit 100 operates in mode #2 (variable frequency mode) because the load 118 consumes maximum power.

Further in this example, assume that the maximum load current consumption is 3.2 Amperes and that the overcurrent protection provided by the power converter circuit 100 limits the current through the secondary winding 132 such that the output voltage 190 provides a maximum of 3.4

Amperes to a respective load 118. In other words, as previously discussed, the primary controller 221 is limited as to a rate at which it can input energy into the primary winding 131 to the secondary winding 132 to power the load 118. As shown in timing diagram 2805, because the current consumed by the load 118 is over a maximum current limit between time T2801 and time T2802, the magnitude of the output voltage 190 droops. During the overcurrent condition, such as between time T2801 and time T2802, the switching frequency (rate at which the primary controller 221 inputs energy into the primary winding 131) is relatively constant. Additionally, as shown, between time T 2801 and time T 2802, the magnitude of current IDS2 through the secondary winding 132 and provided to the respective load 118 reaches a maximum current limit of 3.4 Amperes.

Subsequent to time T2802, the output voltage 190 recovers to approximately a regulated output of 20 VDC again.

If desired, the maximum current limit provided by the power converter circuit 100 can be programmed by an outside resource. For example, power converter circuit 100 can be programmed to control a rate of inputting energy (over multiple delivery or switching cycles) into the primary winding 131 to be below a threshold value to limit an amount of current that the output voltage 190 is able to supply to a respective load. Thus, the power converter circuit 100 is protected from being damaged during unusually heavy load conditions caused by failures.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

FURTHER SUMMARY AND PERMUTATIONS OF EMBODIMENTS

Clause A1. A method comprising:
inputting energy to a primary winding of a transformer;
receiving the energy through a secondary winding of the transformer;
producing an output voltage from the energy received through the secondary winding; and
communicating feedback through the secondary winding to the primary winding, the communicated feedback representing state information, the state information indicating a particular state selected amongst multiple possible states.

Clause A2. The method as in any of one or more clauses A1, A3-A16, wherein inputting the energy includes controlling a flow of current through the primary winding of the transformer to store the energy in the transformer;
wherein receiving the energy includes controlling a flow of current through the secondary winding of the transformer to receive the energy and produce the output voltage.

Clause A3. The method as in any of one or more clauses A1-A2, A4-A16 further comprising:
comparing a magnitude of the output voltage to a reference voltage; and
producing the feedback to control delivery of subsequent energy inputted to the primary winding to maintain the magnitude of the output voltage within a desired voltage range.

Clause A4. The method as in any of one or more clauses A1-A3, A5-A16 further comprising:
controlling a flow of current through the secondary winding to communicate the feedback from the primary winding to the secondary winding; and
monitoring a magnitude of voltage at a node of the primary winding to receive the feedback.

Clause A5. The method as in any of one or more clauses A1-A4, A6-A16 further comprising: controlling a duration of energizing the secondary winding to produce the feedback.

Clause A6. The method as in any of one or more clauses A1-A5, A7-A16 further comprising:
selecting a length of the duration from multiple durations, each of the multiple durations corresponding to a different respective state of the multiple possible states.

Clause A7. The method as in any of one or more clauses A1-A6, A8-A16 further comprising:
communicating the feedback through the secondary winding to the primary winding after conveyance of the energy from the primary winding to the secondary winding of the transformer.

Clause A8. The method as in any of one or more clauses A1-A7, A9-A16 further comprising:
monitoring a magnitude of voltage on a node of the primary winding to receive the feedback, the magnitude of the monitored voltage indicating the state information associated with deriving the output voltage.

Clause A9. The method as in any of one or more clauses A1-A8, A10-A16 further comprising:
controlling a magnitude of subsequent energy inputted to the primary winding to the transformer depending on the magnitude of the monitored voltage indicating the state information.

Clause A10. The method as in any of one or more clauses A1-A9, A11-A16, wherein the magnitude of the voltage at the node of the primary winding represents a detected peak transition or valley transition of the voltage at the node occurring within a monitored window of time.

Clause A11. The method as in any of one or more clauses A1-A10, A12-A16 further comprising:

utilizing the feedback to determine how to adjust an amount of subsequent energy inputted to the primary winding to control a magnitude of the output voltage to be within a desired range.

Clause A12. The method as in any of one or more clauses A1-A11, A13-A16, further comprising: utilizing the feedback to determine an incremental amount of additional energy to input to the primary winding on a subsequent cycle.

Clause A13. The method as in any of one or more clauses A1-A12, A14-A16 further comprising:

over time, repeatedly receiving feedback communications inputted through the secondary winding to the primary winding, the feedback communications indicating a different one of the multiple possible states; and repeatedly adjusting an amount of subsequently inputted energy to the primary winding over multiple successive delivery cycles depending on the received feedback communications to control a magnitude of the output voltage to be within a desired range.

Clause A14. The method as in any of one or more clauses A1-A13, A15-A16 wherein the multiple possible states are selectable commands; and wherein the state information is a particular command selected from the selectable commands.

Clause A15. The method as in any of one or more clauses A1-A14, A15 further comprising:

analyzing the feedback to obtain an error signal associated with producing the output voltage, the error signal indicating a difference between a magnitude of the output voltage and a desired setting of the output voltage; and utilizing the error signal to determine an amount of subsequent energy to input to the primary winding to control a magnitude of the output voltage to be within a desired range.

Clause A16. The method as in any of one or more clauses A1-15, wherein the energy inputted to the primary winding is a first quantum of energy inputted to the primary winding of the transformer, the method further comprising:

generating the state information to represent multiple bits of data, the feedback communicated through the secondary winding to the primary winding subsequent to receiving the first quantum of energy through the secondary winding and prior to input of a next quantum of energy into the primary winding.

Clause A17. An apparatus comprising:

a transformer including a primary winding and a secondary winding;

a primary circuit to control input of energy to the primary winding of the transformer;

a secondary circuit to control receiving the energy through the secondary winding of the transformer and derive an output voltage from the received energy; and the secondary circuit operable to communicate feedback through the secondary winding to the primary winding, the communicated feedback including state information indicating a particular state selected amongst multiple possible states.

Clause A18. The apparatus as in any of one or more clauses A17, A19-A33, wherein the primary circuit includes a primary switch, the primary circuit controlling an ON/OFF state of the primary switch to control a flow of current through the primary winding of the transformer to store the energy in the transformer; and wherein the secondary circuit includes a secondary switch, the secondary circuit controlling an ON/OFF state of the secondary switch to control a flow of current through the secondary winding of the transformer to receive the energy.

Clause A19. The apparatus as in any of one or more clauses A17-A18, A20-A33, wherein the primary circuit includes a monitor circuit to:

compare a magnitude of the output voltage to a reference voltage; and produce the feedback to control delivery of subsequent energy inputted to the primary winding to maintain the magnitude of the output voltage within a desired voltage range.

Clause A20. The apparatus as in any of one or more clauses A17-A19, A21-A33, wherein the secondary circuit includes control circuitry to control a flow of current through the secondary winding to communicate the feedback from the secondary winding to the primary winding; and wherein the primary circuit includes a monitor circuit to monitor a magnitude of voltage at a node of the primary winding to receive the feedback.

Clause A21. The apparatus as in any of one or more clauses A17-A20, A22-A33, wherein the secondary circuit includes control circuitry to control a duration of a flow of current through the secondary winding to produce the state information included in the feedback.

Clause A22. The apparatus as in any of one or more clauses A17-A21, A23-A33, wherein the secondary circuit includes control circuitry to:

select a length of the duration from multiple durations, each of the multiple durations corresponding to a different respective one of the multiple possible states.

Clause A23. The apparatus as in any of one or more clauses A17-A22, A24-A33, wherein the secondary circuit utilizes a portion of the received energy to communicate the feedback through the secondary winding to the primary winding.

Clause A24. The apparatus as in any of one or more clauses A17-A23, A25-A33, wherein the primary circuit includes control circuitry to monitor a magnitude of voltage on a node of the primary winding to receive the feedback, the magnitude of the monitored voltage indicating the particular state associated with deriving the output voltage.

Clause A25. The apparatus as in any of one or more clauses A17-A24, A26-A33, wherein the primary circuit includes control circuitry to:

control input of subsequent energy inputted through the primary winding to the transformer depending on the magnitude of the monitored voltage indicating the particular state.

Clause A26. The apparatus as in any of one or more clauses A17-A25, A27-A33, wherein the magnitude of the voltage at the node of the primary winding represents a detected peak transition or valley transition of the voltage at the node occurring within a monitored window of time.

Clause A27. The apparatus as in any of one or more clauses A17-A26, A28-A33, wherein the primary circuit includes control circuitry to utilize the feedback to adjust an amount of subsequent energy inputted to the primary winding to control a magnitude of the output voltage to be within a desired range.

Clause A28. The apparatus as in any of one or more clauses A17-A27, A29-A33, wherein the control circuit is operable to utilize the feedback to determine an incremental amount of additional energy to input to the primary winding on a subsequent cycle.

Clause A29. The apparatus as in any of one or more clauses A17-A28, A30-A33, wherein the primary circuit includes control circuitry to:

over time, repeatedly receive feedback communications inputted through the secondary winding, the feedback communications indicating a different one of the multiple possible states; and repeatedly adjust an amount of subsequently inputted energy to the primary winding over multiple successive delivery cycles depending on the received feedback communications to control a magnitude of the output voltage to be within a desired range.

Clause A30. The apparatus as in any of one or more clauses A17-A29, A31-A33, wherein the multiple possible states are selectable commands; and wherein the particular state captured by the feedback is a particular command selected from the multiple selectable commands.

Clause A31. The apparatus as in any of one or more clauses A17-A31, A32-A33, wherein the secondary circuit is further operable to:

analyze the feedback to obtain an error signal associated with producing the output voltage; and utilize the error signal to determine an amount of subsequent energy to input to the primary winding to control a magnitude of the output voltage to be within a desired range.

Clause A32. The apparatus as in any of one or more clauses A17-A31, A33, wherein the energy inputted to the primary winding is a first quantum of energy inputted to the primary winding of the transformer; and wherein the state information in the feedback is encoded to represent multiple bits of data, the feedback communicated through the secondary winding to the primary winding subsequent to receiving the first quantum of energy through the secondary winding and prior to input of a next quantum of energy into the primary winding.

Clause A33. The apparatus as in any of one or more clauses A17-A32, wherein the primary circuit is powered with respect to a first ground reference voltage; and wherein the secondary circuit is powered with respect to a second ground reference voltage, the primary circuit electrically isolated from the secondary circuit via the transformer.

Clause A34. Computer-readable storage media having instructions stored thereon for processing data information, such that the instructions, when carried out by computer processor hardware, cause the computer processor hardware to perform operations of:

controlling input of energy to a primary winding of a transformer;

controlling receipt of the energy through a secondary winding of the transformer to produce an output voltage; and communicating feedback through the secondary winding to the primary winding, the communicated feedback representing state information, the state information indicating a particular state amongst multiple possible states.

Clause A35. The method as in any of clauses A1-A16, wherein communicating the feedback through the secondary winding to the primary winding includes:

comparing a voltage level of a node of the secondary winding to a threshold value; and controlling timing of conveying the feedback through the secondary winding to the primary winding to occur when the voltage level of the node of the secondary winding is below the threshold value.

Clause A36. The method as in any of clauses A1-A16, wherein communicating the feedback through the secondary winding to the primary winding includes:

delaying timing of conveying the feedback through the secondary winding to the primary winding until a time of detecting that the magnitude of a monitored voltage is below a threshold value.

Clause A37. The apparatus as in any of clauses A17-A33, wherein the primary circuit is operable to control a rate of inputting energy into the primary winding to be below a threshold value to limit an amount of current that the output voltage supplies to a respective load.

Clause B1. A method comprising:

controlling operation of a power converter circuit to input energy to a primary winding of a transformer and receive the energy through a secondary winding of the transformer;

producing an output voltage using the energy received through the secondary winding; and controlling a timing of conveying feedback through the secondary winding to the primary winding to maintain a magnitude of the output voltage within a desired range.

Clause B2. The method as in any of one or more clauses B1, B3-B15, wherein controlling the timing includes:

delaying the timing of conveying the feedback through the secondary winding to the primary winding until a time of detecting that the magnitude of the output voltage crosses a threshold value.

Clause B3. The method as in any of one or more clauses B1-B2, B4-B15, wherein controlling the timing includes:

monitoring the magnitude of the output voltage; and in response to detecting that the magnitude of the output voltage differs with respect to a setpoint reference voltage above a threshold difference value, communicating the feedback through the secondary winding to the primary winding.

Clause B4. The method as in any of one or more clauses B1-B3, B5-B15 further comprising:

in response to receiving the feedback, adjusting a pulse duration of energizing the primary winding on a subsequent cycle.

Clause B5. The method as in any of one or more clauses B1-B4, B6-B15, wherein controlling operation of the power converter circuit further comprises:

controlling a flow of current through the primary winding of the transformer to store the energy in the transformer; and subsequent to completion of inputting the energy through the primary winding, controlling a flow of current through the secondary winding of the transformer to receive the energy and produce the output voltage.

Clause B6. The method as in any of one or more clauses B1-B5, B7-B15 further comprising:

adjusting a frequency of inputting energy into the primary winding over multiple cycles depending on times of receiving the feedback; and in response to detecting the input of the energy into the primary winding, synchronously receiving the energy via control of current through the secondary winding.

Clause B7. The method as in any of one or more clauses B1-B6, B8-B15 further comprising:

during a first cycle of inputting energy to the primary winding and receiving the energy through the secondary winding:

starting a timer to track passage of time; and using the timer to determine a time of receiving the feedback at the primary winding.

Clause B8. The method as in any of one or more clauses B1-B7, B9-B15 further comprising:

decreasing the pulse duration of energizing the primary winding on a second cycle with respect to a magnitude of a pulse duration of energizing the primary winding on the first cycle to maintain frequency operation of energizing the primary winding over multiple cycles to be above a frequency threshold value.

Clause B9. The method as in any of one or more clauses B1-B8, B10-B15 further comprising:

comparing the time to a setpoint time value, the setpoint time value corresponding to a desired fixed frequency of inputting energy into the primary winding over multiple cycles; and depending on the comparison, adjusting a magnitude of a pulse duration of energizing the primary winding on a second cycle with respect to a magnitude of a pulse duration of energizing the primary winding on the first cycle.

Clause B10. The method as in any of one or more clauses B1-B9, B11-B15, wherein adjusting the magnitude further comprises:

in response to detecting that the time is less than the setpoint time value, increasing the pulse duration of energizing the primary winding on the second cycle with respect to a magnitude of the pulse duration of energizing the primary winding on the first cycle.

Clause B11. The method as in any of one or more clauses B1-B10, B12-B15, wherein adjusting the magnitude further comprises:

in response to detecting that the time is greater than the setpoint time value, decreasing the pulse duration of energizing the primary winding on the second cycle with respect to a magnitude of the pulse duration of energizing the primary winding on the first cycle.

Clause B12. The method as in any of one or more clauses B1-B11, B13-B15 further comprising:

comparing the time of receiving the feedback at the primary winding to a setpoint time value, the setpoint time value corresponding to a desired fixed frequency of inputting energy into the primary winding over multiple cycles; and in response to detecting that the time is substantially equal to the setpoint time value, setting a magnitude of the pulse duration of energizing the primary winding on the second cycle to be substantially the same as a pulse duration of energizing the primary winding on the first cycle.

Clause B13. The method as in any of one or more clauses B1-B12, B14-B15, wherein the feedback includes state information indicating a particular state selected amongst multiple possible states, the feedback varying depending on a magnitude of error between the output voltage and a desired setpoint.

Clause B14. The method as in any of one or more clauses B1-B13, B15 further comprising:

utilizing the feedback to determine a magnitude in which to adjust a pulse duration of energizing the primary winding for a subsequent cycle of energizing the primary winding.

Clause B15. The method as in any of one or more clauses B1-B14 further comprising:

producing a difference value indicating a time difference between the time of receiving the feedback and a setpoint time value, the setpoint time value corresponding to a desired fixed frequency of inputting energy into the primary winding over multiple cycles; and using the difference value to proportionally adjust a magnitude of a pulse duration of energizing the primary winding on a second cycle with respect to a magnitude of a pulse duration of energizing the primary winding on the first cycle.

Clause B16. An apparatus comprising:

a transformer including a primary winding and a secondary winding;

a primary circuit to control input of energy to the primary winding of the transformer;

a secondary circuit to control receiving the energy through the secondary winding of the transformer and produce an output voltage from the received energy; and the secondary circuit operable to control a timing of conveying feedback through the secondary winding to the primary winding to maintain a magnitude of the output voltage within a desired range.

Clause B17. The apparatus as in any of one or more clauses B16, B18-B30, wherein the secondary circuit delays the timing of conveying the feedback through the secondary winding to the primary winding until a time of detecting that the magnitude of the output voltage crosses a threshold value.

Clause B18. The apparatus as in any of one or more clauses B16-17, B19-B30, wherein the secondary circuit is operable to:

monitor the magnitude of the output voltage; and in response to detecting that the magnitude of the output voltage differs with respect to a setpoint reference voltage above a threshold difference value, communicate the feedback through the secondary winding to the primary winding.

Clause B19. The apparatus as in any of one or more clauses B16-18, B20-B30, wherein the primary circuit adjusts a pulse duration of energizing the primary winding on a subsequent cycle in response to receiving the feedback.

Clause B20. The apparatus as in any of one or more clauses B16-19, B21-B30, wherein the primary circuit is operable to control a flow of current through the primary winding of the transformer to store the energy in the transformer; and wherein the secondary circuit is operable to control a flow of current through the secondary winding of the transformer to receive the energy and produce the output voltage subsequent to completion of inputting the energy through the primary winding.

Clause B21. The apparatus as in any of one or more clauses B16-20, B22-B30, wherein the primary circuit is operable to adjust a frequency of inputting energy into the primary winding over multiple cycles depending on times of receiving the feedback; and wherein the secondary circuit is operable to, in response to detecting the input of the energy into the primary winding, synchronously receive the energy via control of current through the secondary winding.

Clause B22. The apparatus as in any of one or more clauses B16-21, B23-B30, wherein the primary circuit includes a timer, the primary circuit further operable to:

during a first cycle of inputting energy to the primary winding and receiving the energy through the secondary winding:

start a timer to track passage of time; and use the timer to determine a time of receiving the feedback at the primary winding.

Clause B23. The apparatus as in any of one or more clauses B16-22, B24-B30, wherein the primary circuit is further operable to decrease the pulse duration of energizing the primary winding on a second cycle with respect to a magnitude of a pulse duration of energizing the primary winding on the first cycle to maintain frequency operation of energizing the primary winding over multiple cycles to be above a frequency threshold value.

Clause B24. The apparatus as in any of one or more clauses B16-23, B25-B30, wherein the primary circuit is further operable to:

compare the time to a setpoint time value, the setpoint time value corresponding to a desired fixed frequency of inputting energy into the primary winding over multiple cycles; and depending on the comparison, adjust a magnitude of a pulse duration of energizing the primary winding on a second cycle with respect to a magnitude of a pulse duration of energizing the primary winding on the first cycle.

Clause B25. The apparatus as in any of one or more clauses B16-24, B26-B30, wherein the primary circuit is further operable to:

in response to detecting that the time is less than the setpoint time value, increase the pulse duration of energizing the primary winding on the second cycle with respect to a magnitude of the pulse duration of energizing the primary winding on the first cycle.

Clause B26. The apparatus as in any of one or more clauses B16-25, B27-B30, wherein the primary circuit is further operable to:

in response to detecting that the time is greater than the setpoint time value, decrease the pulse duration of energizing the primary winding on the second cycle with respect to a magnitude of the pulse duration of energizing the primary winding on the first cycle.

Clause B27. The apparatus as in any of one or more clauses B16-26, B28-B30, wherein the primary circuit is further operable to:

compare the time of receiving the feedback at the primary winding to a setpoint time value, the setpoint time value corresponding to a desired fixed frequency of inputting energy into the primary winding over multiple cycles; and in response to detecting that the time is substantially equal to the setpoint time value, set a magnitude of the pulse duration of energizing the primary winding on the second cycle to be substantially the same as a pulse duration of energizing the primary winding on the first cycle.

Clause B28. The apparatus as in any of one or more clauses B16-27, B29-B30, wherein the feedback includes state information indicating a particular state selected amongst multiple possible states, the feedback varying depending on a magnitude of error between the output voltage and a desired setpoint.

Clause B29. The apparatus as in any of one or more clauses B16-28, B30, wherein the primary circuit is further operable to utilize the feedback to determine a magnitude in which to adjust a pulse duration of energizing the primary winding for a subsequent cycle of energizing the primary winding.

Clause B30. The apparatus as in any of one or more clauses B16-29, wherein the primary circuit is further operable to:

produce a difference value indicating a time difference between the time of receiving the feedback and a setpoint time value, the setpoint time value corresponding to a desired fixed frequency of inputting energy into the primary winding over multiple cycles; and use the difference value to proportionally adjust a magnitude of a pulse duration of energizing the primary winding on a second cycle with respect to a magnitude of a pulse duration of energizing the primary winding on the first cycle.

Clause B31. Computer-readable storage media having instructions stored thereon for processing data information, such that the instructions, when carried out by computer processor hardware, cause the computer processor hardware to perform operations of:

controlling operation of a power converter circuit to input energy to a primary winding of a transformer and receive the energy through a secondary winding of the transformer;

producing an output voltage using the energy received through the secondary winding; and controlling a timing of conveying feedback through the secondary winding to the primary winding to maintain a magnitude of the output voltage within a desired range.

Clause C1. A method comprising:

operating a power converter circuit to input energy to a primary winding of a transformer and subsequently receive the energy through a secondary winding of the transformer over multiple cycles, the power converter circuit producing an output voltage using the energy received through the secondary winding; and switching modal operation of the power converter circuit between a first mode and a second mode over a range of different magnitudes of power delivered by the output voltage to a dynamic load.

Clause C2. The method as in any of one or more clauses C1, C3-C14 further comprising:

switching the modal operation of the power converter circuit based on feedback conveyed from the secondary winding to the primary winding over the multiple cycles.

Clause C3. The method as in any of one or more clauses C1-C2, C4-C14, wherein the feedback includes state information indicating a particular state selected amongst multiple possible states, the feedback varying depending on a magnitude of error between the output voltage and a desired setpoint.

Clause C4. The method as in any of one or more clauses C1-C3, C5-C14, further comprising:

utilizing state information in the feedback to determine a magnitude in which to adjust a pulse duration of energizing the primary winding for a subsequent cycle of energizing the primary winding.

Clause C5. The method as in any of one or more clauses C1-C4, C6-C14, wherein operation of the first mode includes controlling a frequency of energizing the primary winding over multiple cycles to be substantially constant; and wherein operation of the second mode includes varying a frequency of energizing the primary winding.

Clause C6. The method as in any of one or more clauses C1-C5, C7-C14, further comprising:

for each of the multiple cycles, receiving the energy and providing feedback through the secondary winding to the primary winding subsequent to completion of inputting the energy to the primary winding of the transformer.

Clause C7. The method as in any of one or more clauses C1-C6, C8-C14, further comprising:

while in the first mode, adjusting pulse durations of energizing the primary winding over multiple cycles; and while in the second mode, setting a pulse duration of energizing the primary winding to be substantially constant over multiple cycles.

Clause C8. The method as in any of one or more clauses C1-C7, C9-C14, wherein the first mode includes dynamically adjusting pulse durations of energizing the primary winding over the multiple cycles to modify a subsequent frequency of energizing the primary winding; and wherein the second mode includes varying a frequency of energizing the primary winding over the multiple cycles depending on times of receiving the feedback.

Clause C9. The method as in any of one or more clauses C1-C8, C10-C14, further comprising:

in the first mode, adjusting the pulse durations of energizing the primary winding over multiple cycles to control the frequency of energizing the primary winding to be substantially equal to a desired frequency setpoint.

Clause C10. The method as in any of one or more clauses C1-C9, C11-C14, further comprising:

when operating in both the first mode and the second mode:

subsequent to receiving a quantum of energy through the secondary winding to produce the output voltage, delaying a time of conveying a feedback message for a respective cycle through the secondary winding to the primary winding until a time of detecting that the magnitude of the output voltage crosses a threshold value.

Clause C11. The method as in any of one or more clauses C1-C10, C12-C14, wherein the feedback message indicates: i) degradation of the magnitude of the output voltage, and ii) a request for input of energy into the primary winding.

Clause C12. The method as in any of one or more clauses C1-C11, C13-C14, further comprising:

switching between the first mode and the second mode depending on a timing of receiving the feedback with respect to a reference time value in each of the multiple cycles.

Clause C13. The method as in any of one or more clauses C1-C12, C14, further comprising:

during a first cycle of inputting energy to the primary winding and receiving the energy through the secondary winding:

starting a timer to track passage of time; and using the timer to determine a time corresponding to receipt of the feedback at the primary winding.

Clause C14. The method as in any of one or more clauses C1-C13 further comprising:

comparing the time to a setpoint time value, the setpoint time value corresponding to a minimum desired frequency of inputting energy into the primary winding over multiple cycles; and to prevent operation below the minimum desired frequency, while in the first mode, using results of the comparison to adjust a magnitude of a pulse duration of energizing the primary winding on a second cycle with respect to a magnitude of a pulse duration of energizing the primary winding on the first cycle.

Clause C15. An apparatus comprising:

a transformer including a primary winding and a secondary winding;

a primary circuit to control input of energy to the primary winding of the transformer;

a secondary circuit to control receiving the energy through the secondary winding of the transformer and produce an output voltage from the received energy; and the primary circuit operable to switch modal operation of the power converter circuit between a first mode and a second mode over a range of different magnitudes of power delivered by the output voltage to a dynamic load.

Clause C16. The apparatus as in clauses C15, C17-C28, wherein the primary circuit is operable to:

switch the modal operation of the power converter circuit based on feedback conveyed from the secondary winding to the primary winding over the multiple cycles.

Clause C17. The apparatus as in any of one or more clauses C15-C16, C18-C28, wherein the feedback includes state information indicating a particular state selected amongst multiple possible states, the feedback varying depending on a magnitude of error between the output voltage and a desired setpoint.

Clause C18. The apparatus as in any of one or more clauses C15-C17, C19-C28, wherein the primary circuit is operable to: utilize state information in the feedback to determine a magnitude in which to adjust a pulse duration of energizing the primary winding for a subsequent cycle of energizing the primary winding.

Clause C19. The apparatus as in any of one or more clauses C15-C18, C20-C28, wherein operation of the first mode includes controlling a frequency of energizing the primary winding over multiple cycles to be substantially constant; and wherein operation of the second mode includes varying a frequency of energizing the primary winding.

Clause C20. The apparatus as in any of one or more clauses C15-C19, C21-C28, wherein the secondary circuit is further operable to:

for each of the multiple cycles, receive the energy and providing feedback through the secondary winding to the primary winding subsequent to completion of inputting the energy to the primary winding of the transformer.

Clause C21. The apparatus as in any of one or more clauses C15-C20, C22-C28, wherein the primary circuit is further operable to:

while in the first mode, adjust pulse durations of energizing the primary winding over multiple cycles; and while in the second mode, set a pulse duration of energizing the primary winding to be substantially constant over multiple cycles.

Clause C22. The apparatus as in any of one or more clauses C15-C21, C23-C28, wherein the first mode includes dynamically adjusting pulse durations of energizing the primary winding over the multiple cycles to modify a subsequent frequency of energizing the primary winding; and wherein the second mode includes varying a frequency of energizing the primary winding over each of the multiple cycles depending on times of receiving the feedback.

Clause C23. The apparatus as in any of one or more clauses C15-C22, C24-C28, wherein the primary circuit is further operable to:

in the first mode, adjust the pulse durations of energizing the primary winding over multiple cycles to control the frequency of energizing the primary winding to be substantially equal to a desired frequency setpoint.

Clause C24. The apparatus as in any of one or more clauses C15-C23, C25-C28, wherein the secondary circuit is further operable to:

when operating in both the first mode and the second mode:

subsequent to receiving energy through the secondary winding to produce the output voltage, delay a time of conveying a feedback message for a respective cycle through the secondary winding to the primary winding until a time of detecting that the magnitude of the output voltage crosses a threshold value.

Clause C25. The apparatus as in any of one or more clauses C15-C24, C26-C28, wherein the feedback message indicates: i) degradation of the magnitude of the output voltage, and ii) a request for input of energy into the primary winding.

Clause C26. The apparatus as in any of one or more clauses C15-C25, C27-C28, wherein the primary circuit is further operable to:
switch between the first mode and the second mode depending on a timing of receiving the feedback with respect to a reference time value in each of the multiple cycles.

Clause C27. The apparatus as in any of one or more clauses C15-C26, C28, wherein the primary circuit is further operable to:
during a first cycle of inputting energy to the primary winding and receiving the energy through the secondary winding:
start a timer to track passage of time; and
use the timer to determine a time corresponding to receipt of the feedback at the primary winding.

Clause C28. The apparatus as in any of one or more clauses C15-C27, wherein the primary circuit is further operable to:
compare the time to a setpoint time value, the setpoint time value corresponding to a minimum desired frequency of inputting energy into the primary winding over multiple cycles; and
to prevent operation below the minimum desired frequency, while in the first mode, use results of the comparison to adjust a magnitude of a pulse duration of energizing the primary winding on a second cycle with respect to a magnitude of a pulse duration of energizing the primary winding on the first cycle.

Clause C29. Computer-readable storage media having instructions stored thereon for processing data information, such that the instructions, when carried out by computer processor hardware, cause the computer processor hardware to perform operations of:
operating a power converter circuit to input energy to a primary winding of a transformer and subsequently receive the energy through a secondary winding of the transformer over multiple cycles, the power converter circuit producing an output voltage using the energy received through the secondary winding; and
switching modal operation of the power converter circuit between a first mode and a second mode over a range of different magnitudes of power delivered by the output voltage to a dynamic load.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
operating a power converter circuit to input energy to a primary winding of a transformer and subsequently receive the energy through a secondary winding of the transformer over multiple cycles, the power converter circuit producing an output voltage using the energy received through the secondary winding;
switching modal operation of the power converter circuit between a first mode and a second mode over a range of different magnitudes of power delivered by the output voltage to a dynamic load;
wherein operation of the first mode includes controlling a frequency of energizing the primary winding over multiple cycles to be substantially constant;
wherein operation of the second mode includes varying a frequency of energizing the primary winding, the method further comprising:
switching the modal operation of the power converter circuit between the first mode and the second mode based on feedback conveyed from the secondary winding to the primary winding over the multiple cycles; and
comparing a time associated with receiving the feedback to a setpoint time value, the setpoint time value corresponding to a minimum desired frequency of inputting energy into the primary winding over multiple cycles.

2. The method as in claim 1, wherein the feedback includes state information indicating a particular state selected amongst multiple possible states, the feedback varying depending on a magnitude of error between the output voltage and a desired setpoint voltage.

3. The method as in claim 1 further comprising:
while in the first mode, adjusting pulse durations of energizing the primary winding over multiple cycles; and
while in the second mode, setting a pulse duration of energizing the primary winding to be substantially constant over multiple cycles.

4. The method as in claim 1, wherein the first mode includes dynamically adjusting pulse durations of energizing the primary winding over the multiple cycles to modify the frequency of energizing the primary winding; and
wherein the second mode includes varying the frequency of energizing the primary winding over the multiple cycles depending on times of receiving the feedback.

5. The method as in claim 4 further comprising:
in the first mode, adjusting the pulse durations of energizing the primary winding over the multiple cycles, the adjusted pulse durations controlling the frequency of energizing the primary winding to be substantially equal to a desired frequency setpoint.

6. The method as in claim 1 further comprising:
when operating in both the first mode and the second mode:
subsequent to receiving a quantum of energy through the secondary winding to produce the output voltage, delaying a time of conveying a feedback message for a respective cycle through the secondary winding to the primary winding until a time of detecting that a magnitude of the output voltage crosses a threshold value.

7. The method as in claim 6, wherein the feedback message indicates: i) degradation of the magnitude of the output voltage, and ii) a request for input of energy into the primary winding.

8. The method as in claim 1 further comprising:
switching between the first mode and the second mode depending on a timing of the primary winding receiving the feedback with respect to a reference time value in a respective cycle of the multiple cycles.

9. The method as in claim 1 further comprising:
during a first cycle of inputting energy to the primary winding and receiving the energy through the secondary winding:
starting a timer to track passage of time; and
using the timer to determine the time, the time corresponding to receipt of the feedback at the primary winding.

10. The method as in claim 9 further comprising:
to prevent operation below the minimum desired frequency, while in the first mode, using results of the comparison to adjust a magnitude of a pulse duration of energizing the primary winding on a second cycle with respect to a magnitude of a pulse duration of energizing the primary winding on the first cycle.

11. The method as in claim 1 further comprising:
communicating control information from secondary winding to the primary winding, the control information adjusting pulse durations of energizing the primary winding, the adjusted pulse durations controlling the frequency of energizing the primary winding to a desired frequency setpoint.

12. The method as in claim 1 further comprising:
controlling the frequency of energizing the primary winding based on feedback conveyed from the secondary winding to the primary winding over each of the multiple cycles.

13. The method as in claim 1 further comprising:
via a timer at a primary side controller of the power converter circuit, determining a timing of receiving the feedback; and
via the determined timing of receiving the feedback, detecting a state selected by a secondary side controller of the power converter circuit deriving the output voltage from the energy, the secondary side controller communicating the feedback through the secondary winding and the primary winding to the primary side controller of the power converter circuit.

14. The method as in claim 13 further comprising:
via the state selected by the secondary side controller, controlling input of subsequent energy conveyed from the primary winding through the secondary winding to the secondary side controller.

15. The method as in claim 13 further comprising:
based at least in part on the state selected by the secondary side controller, controlling the modal operation of the power converter circuit.

16. The method as in claim 1 further comprising:
delaying a timing of conveying the feedback from the secondary winding through the primary winding to a controller of the power converter circuit, the delayed timing of the feedback indicating a selected state of multiple possible states.

17. The method as in claim 16, wherein the selected state is control information, the method further comprising:
controlling input of subsequent energy to the primary winding based on the control information.

18. The method as in claim 1, wherein switching modal operation of the power converter circuit includes:
operating the power converter circuit in the first mode in response to detecting that power consumption by the dynamic load is less than a power consumption threshold value; and
operating the power converter circuit in the second mode in response to detecting that power consumption by the dynamic load is greater than the power consumption threshold value.

19. An apparatus comprising:
a transformer including a primary winding and a secondary winding;
a primary circuit to control input of energy to the primary winding of the transformer;
a secondary circuit to control receiving the energy through the secondary winding of the transformer and produce an output voltage from the received energy; and
the primary circuit operable to switch modal operation of the power converter circuit between a first frequency mode and a second frequency mode over a range of different magnitudes of power delivered by the output voltage to a dynamic load, the primary circuit further operable to control a frequency of energizing the primary winding in the first frequency mode and the second frequency mode based on feedback conveyed from the secondary winding through the primary winding to the primary circuit over each of multiple control cycles;
wherein the primary circuit is further operable to: compare a time associated with the feedback to a setpoint time value, the setpoint time value corresponding to a minimum desired frequency of inputting energy into the primary winding over the multiple control cycles.

20. The apparatus as in claim 19, wherein the feedback includes state information indicating a particular state selected amongst multiple possible states, the feedback varying depending on a magnitude of error between the output voltage and a desired setpoint voltage.

21. The apparatus as in claim 19, wherein the primary circuit is operable to: utilize state information in the feedback to determine a magnitude in which to adjust a pulse duration of energizing the primary winding for a subsequent cycle of energizing the primary winding.

22. The apparatus as in claim 19, wherein operation of the first frequency mode includes controlling the frequency of energizing the primary winding over the multiple control cycles to be substantially constant; and
wherein operation of the second frequency mode includes varying the frequency of energizing the primary winding.

23. The apparatus as in claim 19, wherein the first frequency mode includes dynamically adjusting pulse durations of energizing the primary winding over the multiple control cycles to modify the frequency of energizing the primary winding; and
wherein the second frequency mode includes varying the frequency of energizing the primary winding over the multiple control cycles depending on times of receiving the feedback.

24. The apparatus as in claim 23, wherein the primary circuit is further operable to:
in the first frequency mode, adjust the pulse durations of energizing the primary winding over the multiple control cycles to control the frequency of energizing the primary winding to be substantially equal to a desired frequency setpoint.

25. The apparatus as in claim 19, wherein the secondary circuit is further operable to:
when operating in both the first frequency mode and the second frequency mode:
subsequent to receiving energy through the secondary winding to produce the output voltage, delay a time of conveying a feedback message for a respective cycle through the secondary winding to the primary winding until a time of detecting that a magnitude of the output voltage crosses a threshold value.

26. The apparatus as in claim 25, wherein the feedback message indicates: i) degradation of the magnitude of the output voltage, and ii) a request for input of energy into the primary winding.

27. The apparatus as in claim 19, wherein the primary circuit is further operable to:
switch between the first frequency mode and the second frequency mode depending on a timing of receiving the feedback with respect to a reference time value in each of the multiple cycles.

28. The apparatus as in claim 19, wherein the primary circuit is further operable to:
during a first cycle of inputting energy to the primary winding and receiving the energy through the secondary winding:
start a timer to track passage of time; and
use the timer to determine the time, the time corresponding to receipt of the feedback at the primary winding.

29. The apparatus as in claim 28, wherein the primary circuit is further operable to:
to prevent operation below the minimum desired frequency, while in the first frequency mode, use results of the comparison to adjust a magnitude of a pulse duration of energizing the primary winding on a second cycle with respect to a magnitude of a pulse duration of energizing the primary winding on the first cycle.

30. The apparatus as in claim 19, wherein the secondary circuit is operable to control a magnitude of the frequency depending on an amount of power consumed by the dynamic load.

31. The apparatus as in claim 19, wherein operation of the first frequency mode includes: i) controlling the frequency of energizing the primary winding over the multiple control cycles to be substantially constant, and varying a pulse width of energizing the primary winding to control a magnitude of the output voltage; and
wherein operation of the second frequency mode includes: i) setting a pulse width of energizing the primary winding to a fixed value, and ii) varying the frequency of energizing the primary winding to control the magnitude of the output voltage.

* * * * *